(12) United States Patent
Sasaki et al.

(10) Patent No.: US 9,659,588 B2
(45) Date of Patent: May 23, 2017

(54) THERMALLY-ASSISTED MAGNETIC RECORDING HEAD INCLUDING A MAIN POLE AND A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Hideo Mamiya, Milpitas, CA (US)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Hideo Mamiya, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/825,020

(22) Filed: Aug. 12, 2015

(65) Prior Publication Data

US 2017/0047087 A1 Feb. 16, 2017

(51) Int. Cl.
*G11B 5/127* (2006.01)
*G11B 5/48* (2006.01)
(Continued)

(52) U.S. Cl.
CPC .......... *G11B 5/4866* (2013.01); *G11B 5/11* (2013.01); *G11B 5/127* (2013.01); *G11B 5/187* (2013.01); *G11B 5/313* (2013.01); *G11B 5/314* (2013.01); *G11B 5/012* (2013.01); *G11B 5/1278* (2013.01); *G11B 5/3133* (2013.01);
(Continued)

(58) Field of Classification Search
None
See application file for complete search history.

(56) References Cited

U.S. PATENT DOCUMENTS

| 7,068,453 B2 | 6/2006 | Terris et al. |
| 8,400,884 B1 | 3/2013 | Araki et al. |

(Continued)

OTHER PUBLICATIONS

U.S. Appl. No. 14/720,319 in the name of Sasaki filed on May 22, 2015.

(Continued)

*Primary Examiner* — Brian Butcher
(74) *Attorney, Agent, or Firm* — Oliff PLC

(57) ABSTRACT

A main pole has a front end face including a first end face portion and a second end face portion. A plasmon generator has a near-field light generating surface. A surrounding layer has a first surrounding layer end face and a second surrounding layer end face located on opposite sides of the first end face portion in the track width direction. A gap film has a first gap film end face and a second gap film end face located on opposite sides of the near-field light generating surface in the track width direction. Each of the first and second gap film end faces includes a portion located between the first and second surrounding layer end faces, but does not include any portion interposed between the first surrounding layer end face and the first end face portion or between the second surrounding layer end face and the first end face portion.

15 Claims, 44 Drawing Sheets

(51) Int. Cl.
*G11B 5/31* (2006.01)
*G11B 5/187* (2006.01)
*G11B 5/11* (2006.01)
G11B 5/00 (2006.01)
G11B 5/60 (2006.01)
G11B 5/012 (2006.01)

(52) U.S. Cl.
CPC .............. *G11B 5/3163* (2013.01); *G11B 5/60* (2013.01); *G11B 5/6088* (2013.01); *G11B 2005/0021* (2013.01)

(56) References Cited

U.S. PATENT DOCUMENTS

| | | |
|---|---|---|
| 8,456,968 B1 | 6/2013 | Sasaki et al. |
| 8,482,879 B1 | 7/2013 | Sasaki et al. |
| 8,493,821 B1 | 7/2013 | Sasaki et al. |
| 8,614,932 B1 | 12/2013 | Sasaki et al. |
| 8,705,327 B2 * | 4/2014 | Matsumoto .......... G11B 5/1278 369/30.03 |
| 8,760,809 B1 | 6/2014 | Sasaki et al. |
| 8,792,207 B1 | 7/2014 | Sasaki et al. |
| 9,218,827 B1 | 12/2015 | Sasaki et al. |
| 9,218,835 B1 | 12/2015 | Sasaki et al. |
| 2011/0170381 A1 | 7/2011 | Matsumoto |
| 2012/0257304 A1 | 10/2012 | Sasaki et al. |
| 2014/0247706 A1 | 9/2014 | Sasaki et al. |
| 2014/0269237 A1 | 9/2014 | Sasaki et al. |
| 2015/0071044 A1 | 3/2015 | Sasaki et al. |
| 2015/0124575 A1 | 5/2015 | Sasaki et al. |
| 2015/0255096 A1 | 9/2015 | Sasaki et al. |
| 2015/0262593 A1 | 9/2015 | Sasaki et al. |
| 2015/0332717 A1 | 11/2015 | Hara et al. |
| 2016/0343391 A1 | 11/2016 | Sasaki et al. |

OTHER PUBLICATIONS

Apr. 29, 2016 Office Action Issued in U.S. Appl. No. 14/720,319.
Jul. 18, 2016 Office Action Issued in U.S. Appl. No. 15/051,321.
U.S. Appl. No. 15/051,321, filed Feb. 23, 2016 in the name of Sasaki, et al.
Dec. 2, 2016 Office Action issued in U.S. Appl. No. 15/051,321.

* cited by examiner

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To eliminate this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication No. 2011/0170381 A1 discloses a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that occurs on the surface of the core based on the light propagating through the core, and to cause near-field light to be generated from the end face of the plasmon generator based on the excited surface plasmons.

To achieve higher recording density, it is necessary to make the track width smaller by reducing at least one of the width of the end face of the plasmon generator in the medium facing surface and the width of the end face of the main pole in the medium facing surface. As the track width is reduced, it becomes more important to bring the end face of the plasmon generator and the end face of the main pole into precise alignment with each other.

U.S. Patent Application Publication No. 2011/0170381 A1 discloses a technique to form a plasmon generator by etching a metal layer using either the main pole or a mask for use to etch the main pole. This technique allows for precise alignment of the end face of the plasmon generator and the end face of the main pole with each other. When employing this technique, however, any attempts to reduce the track width would result in a reduction in the width of the end face of the main pole, and this would cause the main pole to become unable to pass much magnetic flux and thus unable to produce a write magnetic field of sufficient magnitude from its end face. A further problem with the aforementioned technique is that it is difficult to permit a desired sizing of the width of the end face of the main pole without limitations imposed by the width of the end face of the plasmon generator.

OBJECT AND SUMMARY OF THE INVENTION

It is an object of the present invention to provide a thermally-assisted magnetic recording head that allows for precise alignment of an end face of a plasmon generator and an end face of a main pole with each other in the medium facing surface, and also allows for a desired sizing of the width of the end face of the main pole without limitations imposed by the width of the end face of the plasmon generator.

A thermally-assisted magnetic recording head of the present invention includes: a medium facing surface configured to face a recording medium; a coil for producing a magnetic field corresponding to data to be written on the recording medium; a main pole; a waveguide; a plasmon generator; a surrounding layer; and a gap film. The main pole has a front end face located in the medium facing surface. The waveguide includes a core and a cladding, the core allowing light to propagate therethrough, the cladding being provided around the core. The plasmon generator has a near-field light generating surface located in the medium facing surface. The gap film separates the plasmon generator from the surrounding layer.

The main pole is configured to pass a magnetic flux corresponding to the magnetic field produced by the coil, and to produce from the front end face a write magnetic field for use to write data on the recording medium. The plasmon generator is configured to excite a surface plasmon on the plasmon generator based on the light propagating through the core, and to generate near-field light from the near-field light generating surface based on the surface plasmon. The front end face of the main pole includes a first end face portion, and a second end face portion contiguous with the first end face portion. The second end face portion is greater than the first end face portion in width in the track width direction. The near-field light generating surface, the first end face portion and the second end face portion are arranged in this order along the direction of travel of the recording medium. The main pole includes a first portion and a second portion, the first portion including the first end face portion, the second portion including the second end face portion.

The surrounding layer has a first surrounding layer end face and a second surrounding layer end face, both located in the medium facing surface. The first surrounding layer end face and the second surrounding layer end face are located on opposite sides of at least part of the first end face portion in the track width direction so that the at least part of the first end face portion is interposed between the first and second surrounding layer end faces. The gap film has a first gap film end face and a second gap film end face, both located in the medium facing surface. The first gap film end face and the second gap film end face are located on opposite sides of at least part of the near-field light generating surface in the track width direction so that the at least part of the near-field light generating surface is interposed between the first and second gap film end faces. Each of the first and second gap film end faces includes a portion located between the first and second surrounding layer end faces, but does not include any portion interposed between the first surrounding layer end face and the first end face portion or between the second surrounding layer end face and the first end face portion.

The thermally-assisted magnetic recording head of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

In the thermally-assisted magnetic recording head of the present invention, the surrounding layer may be formed of a nonmagnetic metal material.

In the thermally-assisted magnetic recording head of the present invention, the surrounding layer may include a first side shield and a second side shield each formed of a magnetic material. The first side shield has a first side shield end face constituting at least part of the first surrounding layer end face. The second side shield has a second side shield end face constituting at least part of the second surrounding layer end face.

In the thermally-assisted magnetic recording head of the present invention, the first end face portion may have a first edge closest to the near-field light generating surface, and a second edge located at the boundary between the first end face portion and the second end face portion. The second edge may be longer than the first edge.

In the thermally-assisted magnetic recording head of the present invention, the core may have an evanescent light generating surface for generating evanescent light based on the light propagating through the core, and the plasmon generator may have a plasmon exciting section located at a predetermined distance from the evanescent light generating surface and facing the evanescent light generating surface. In this case, in the plasmon generator, a surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

In the thermally-assisted magnetic recording head of the present invention, the front end face of the main pole may be located on the front side in the direction of travel of the recording medium relative to the near-field light generating surface.

A manufacturing method for the thermally-assisted magnetic recording head of the present invention includes the steps of forming the wave guide; forming the plasmon generator; forming the surrounding layer and the gap film after the plasmon generator is formed; forming the main pole after the surrounding layer and the gap film are formed; and forming the coil.

The step of forming the plasmon generator includes the steps of forming an initial plasmon generator; forming an etching mask for use to pattern the initial plasmon generator; and etching the initial plasmon generator by using the etching mask so that the initial plasmon generator becomes the plasmon generator.

The step of forming the surrounding layer and the gap film includes: the step of forming an initial gap film to cover the plasmon generator and the etching mask after the step of etching the initial plasmon generator; the step of forming the surrounding layer after the initial gap film is formed; and the removal step of removing a portion of the initial gap film and at least a portion of the etching mask after the surrounding layer is formed. The removal step makes the initial gap film into the gap film and results in the formation of a structure having a recess, the structure including the plasmon generator, the surrounding layer and the gap film. The main pole is formed such that at least part of the first portion is received in the recess.

The thermally-assisted magnetic recording head manufactured by the manufacturing method of the present invention may further include a separating film for separating the main pole from the surrounding layer. The separating film is a single continuous film, and at least part of the separating film is interposed between the main pole and the plasmon generator, between the main pole and the surrounding layer, and between the main pole and the gap film.

Where the thermally-assisted magnetic recording head includes the separating film, the manufacturing method of the present invention may further include the step of forming the separating film on the structure after the removal step such that the separating film forms a receiving section corresponding to the recess. In this case, the main pole is formed on the separating film such that the first portion is received in the receiving section after the step of forming the separating film.

In the manufacturing method of the present invention, the removal step may employ wet etching to remove the portion of the initial gap film.

In the manufacturing method of the present invention, the step of forming the surrounding layer may include the steps of: forming an initial surrounding layer to cover the initial gap film; and polishing the initial surrounding layer until the etching mask is exposed. In this case, the step of forming the surrounding layer may further include the step of etching a portion of the initial surrounding layer after the step of polishing the initial surrounding layer.

The present invention makes it possible that the space between the first and second surrounding layer end faces in which at least part of the first end face portion lies can be adjusted by the width of the portion of each of the first and second gap film end faces located between the first surrounding layer end face and the second surrounding layer end face. The present invention thus allows for precise alignment of the near-field light generating surface and the first end face portion with each other, and also allows for a desired sizing of the width of the first end face portion without limitations imposed by the width of the near-field light generating surface.

Other and further objects, features and advantages of the present invention will appear more fully from the following description.

DETAILED DESCRIPTION OF THE PREFERRED EMBODIMENTS

First Embodiment

Figure 1:
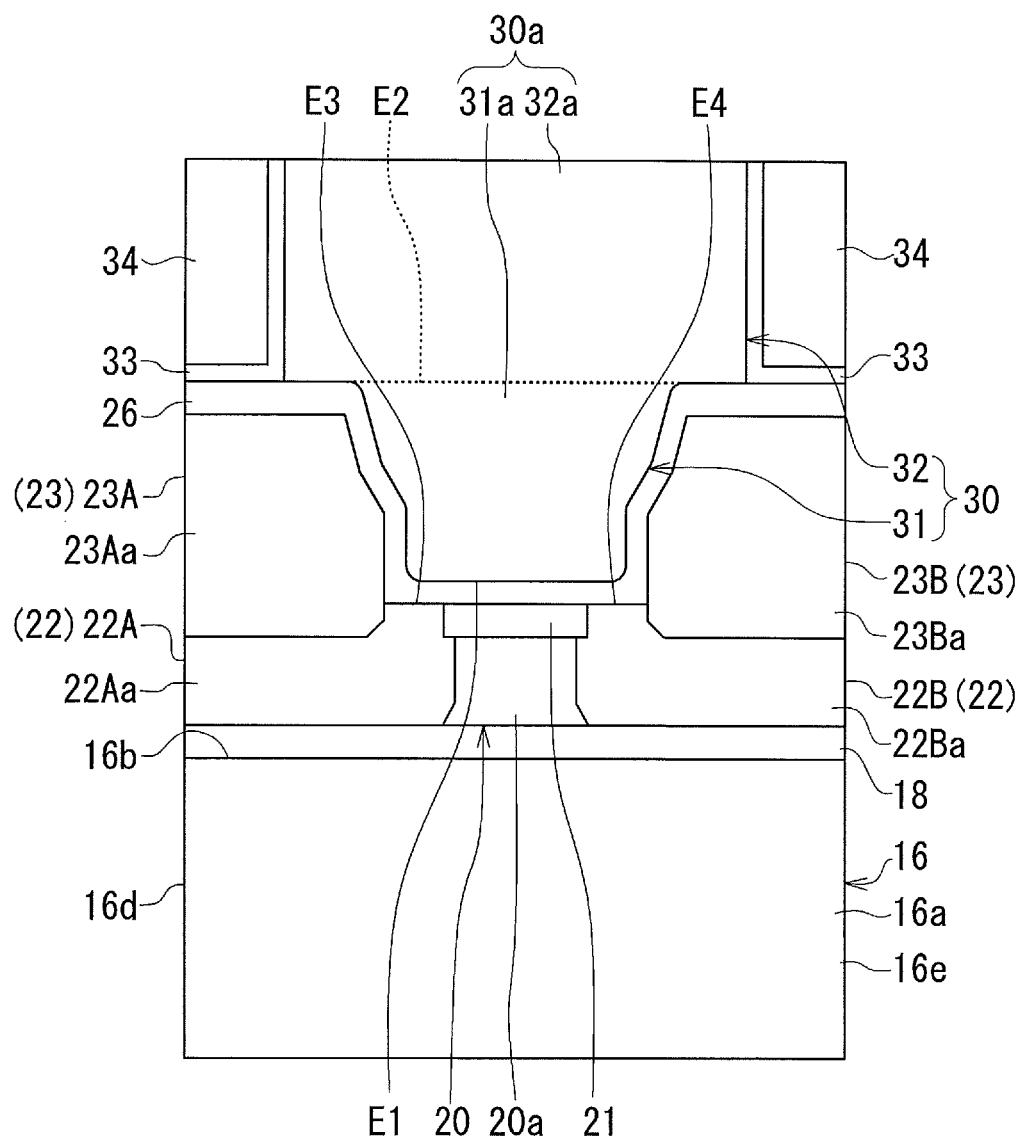
FIG. 1 is a front view showing the main part of a thermally-assisted magnetic recording head according to a first embodiment of the invention.
Figure 2:
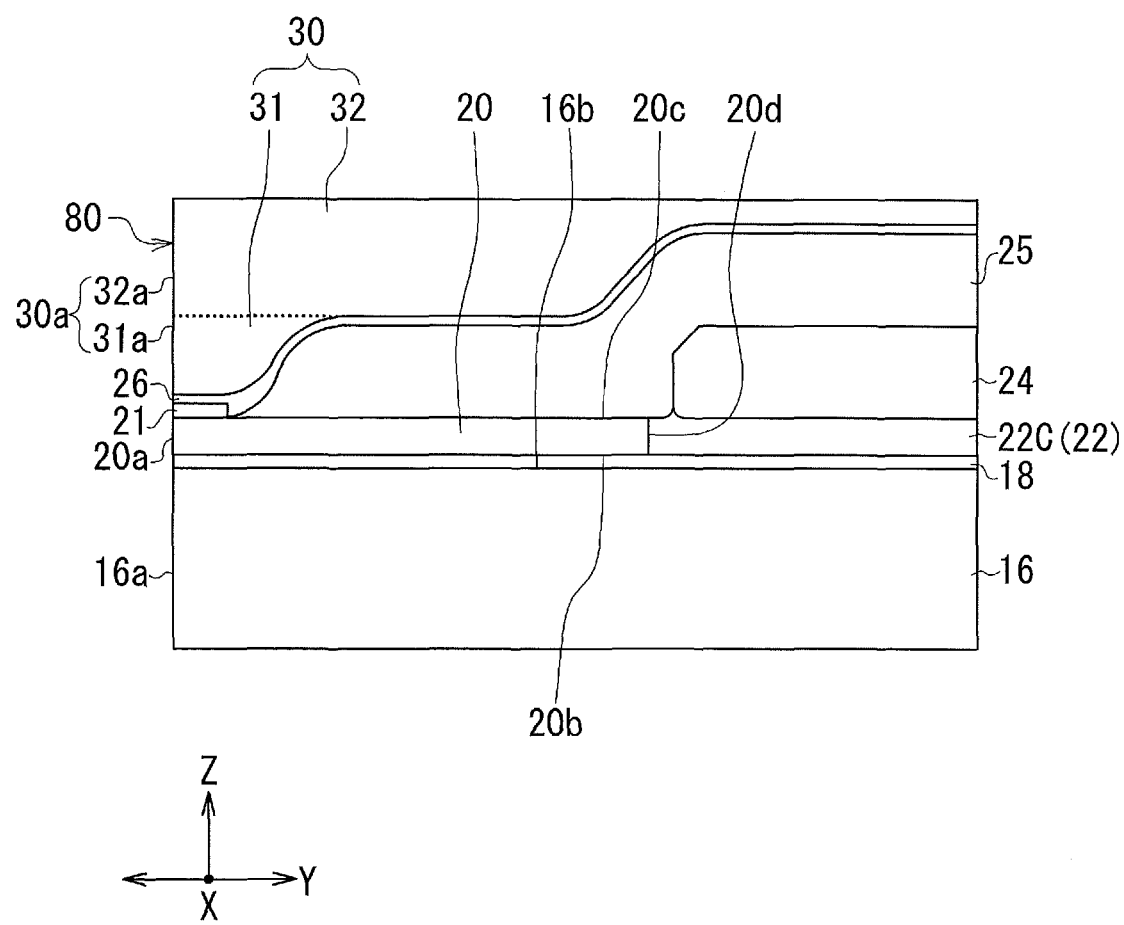
FIG. 2 is a cross-sectional view showing the main part of the thermally-assisted magnetic recording head according to the first embodiment of the invention.
Figure 3:
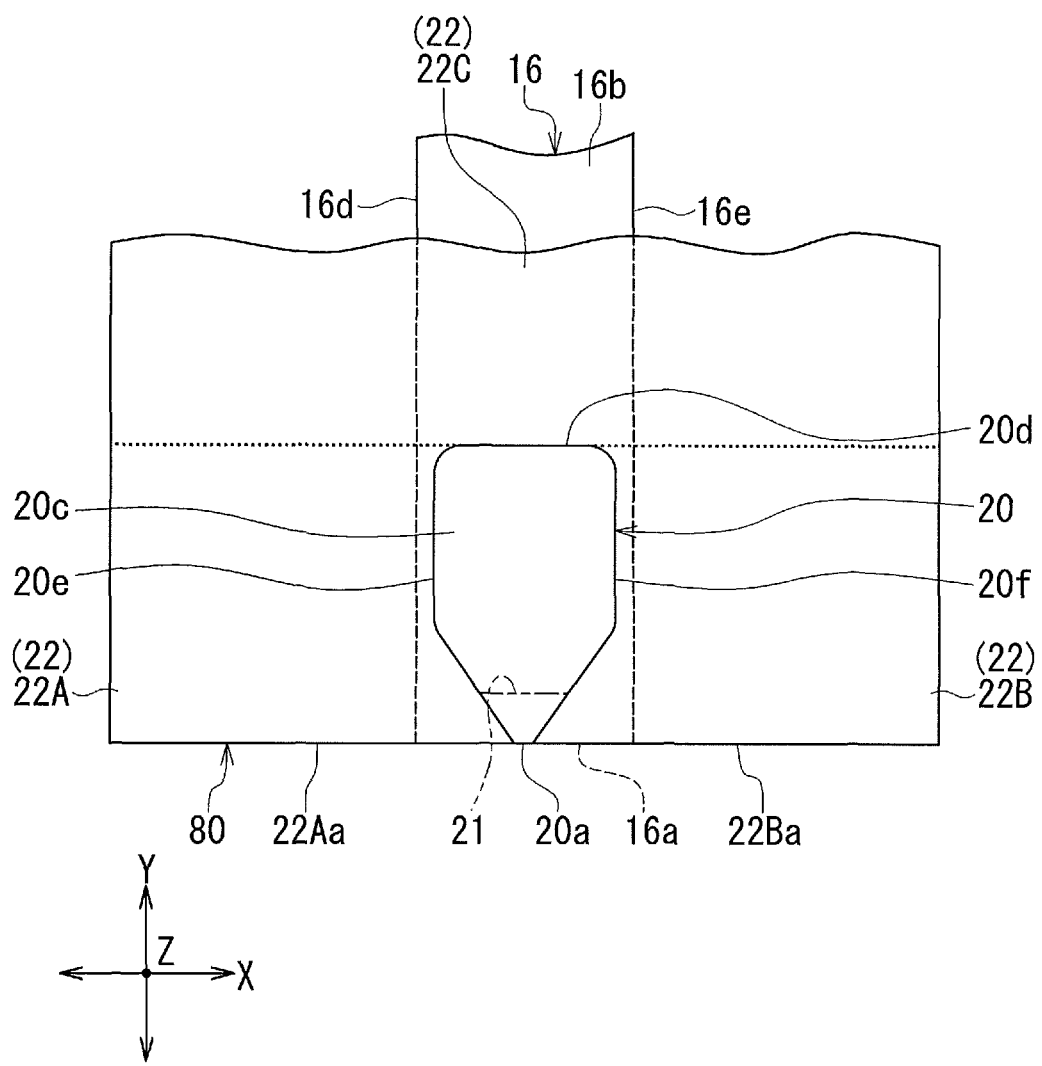
FIG. 3 is a plan view showing a core, a plasmon generator, and a gap film of the first embodiment of the invention.
Figure 4:
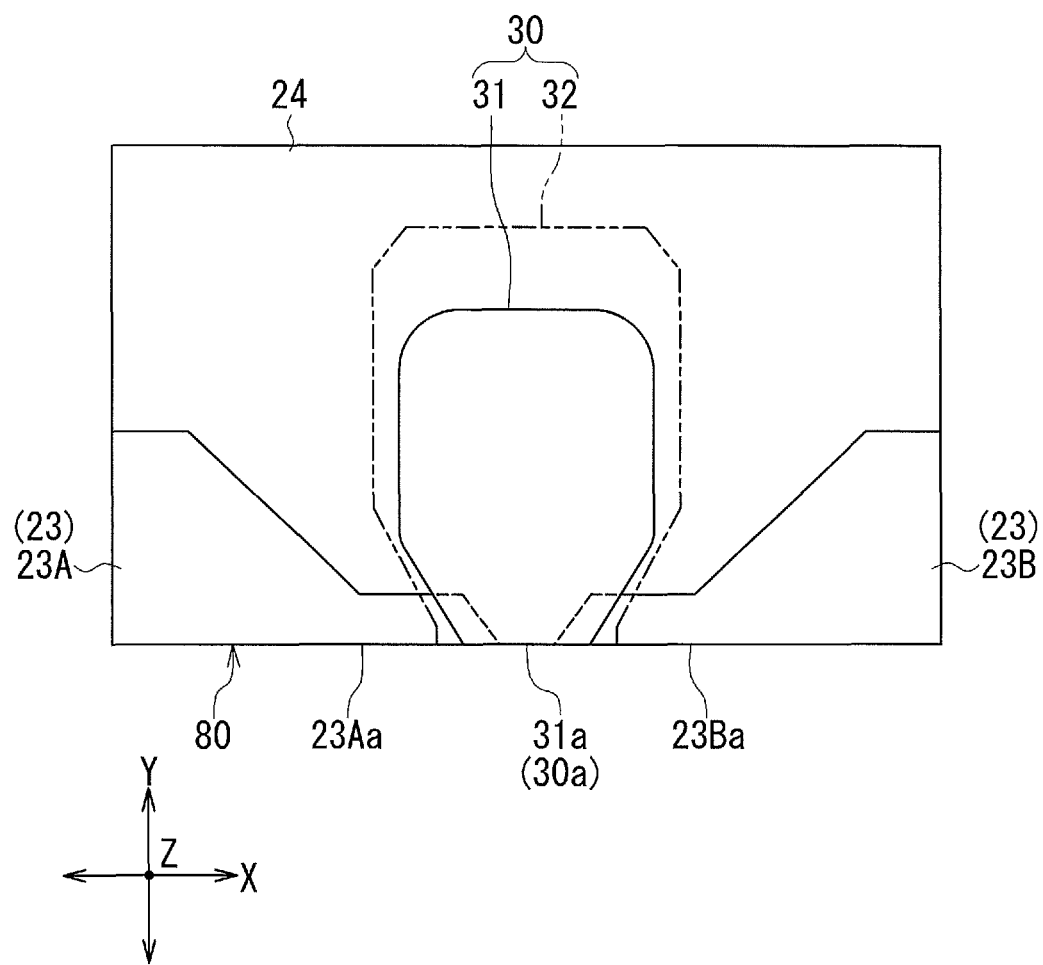
FIG. 4 is a plan view showing a main pole, a surrounding layer, and a first heat sink of the first embodiment of the invention.
Figure 5:
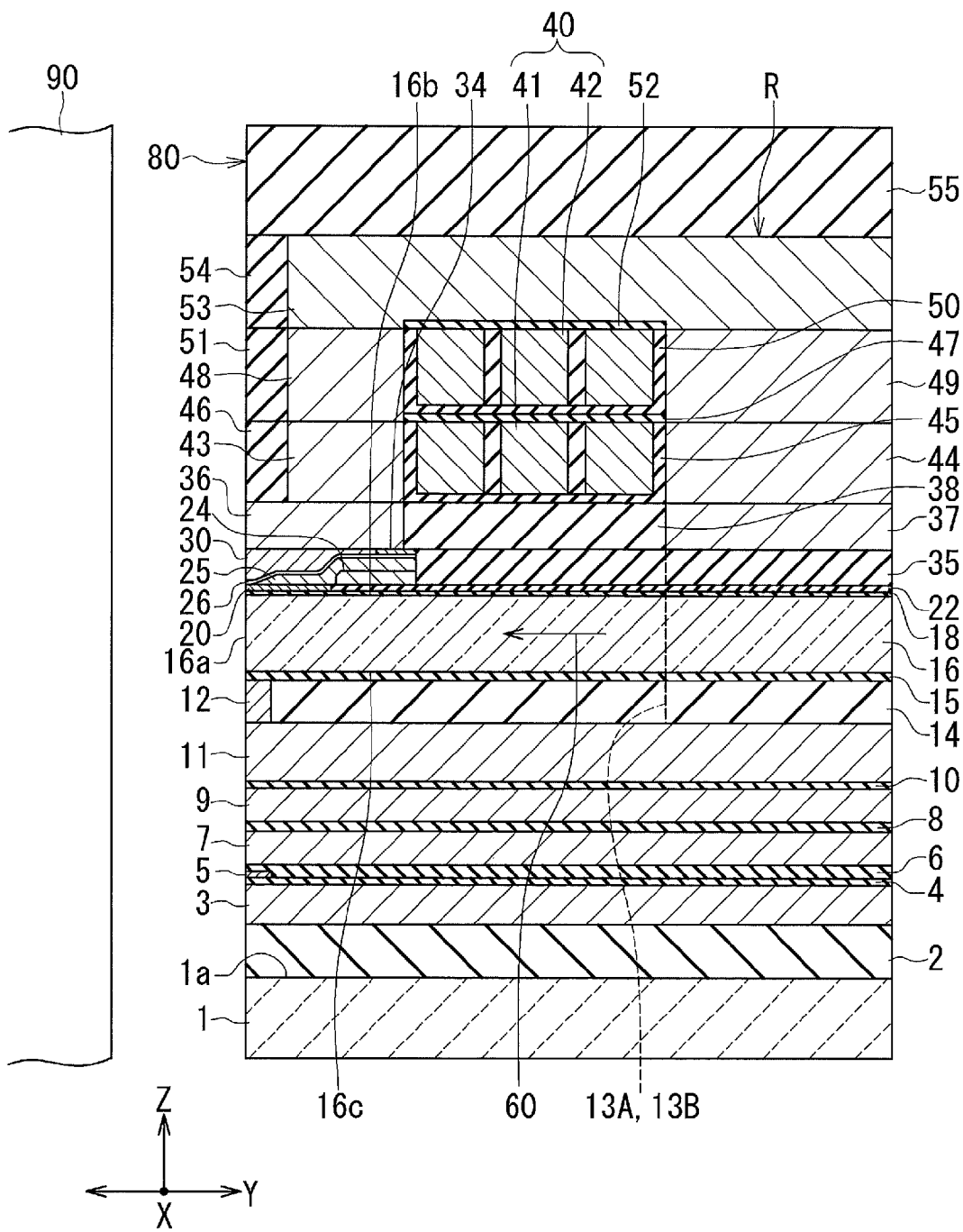
FIG. 5 is a cross-sectional view showing the configuration of the thermally-assisted magnetic recording head according to the first embodiment of the invention.
Figure 6:
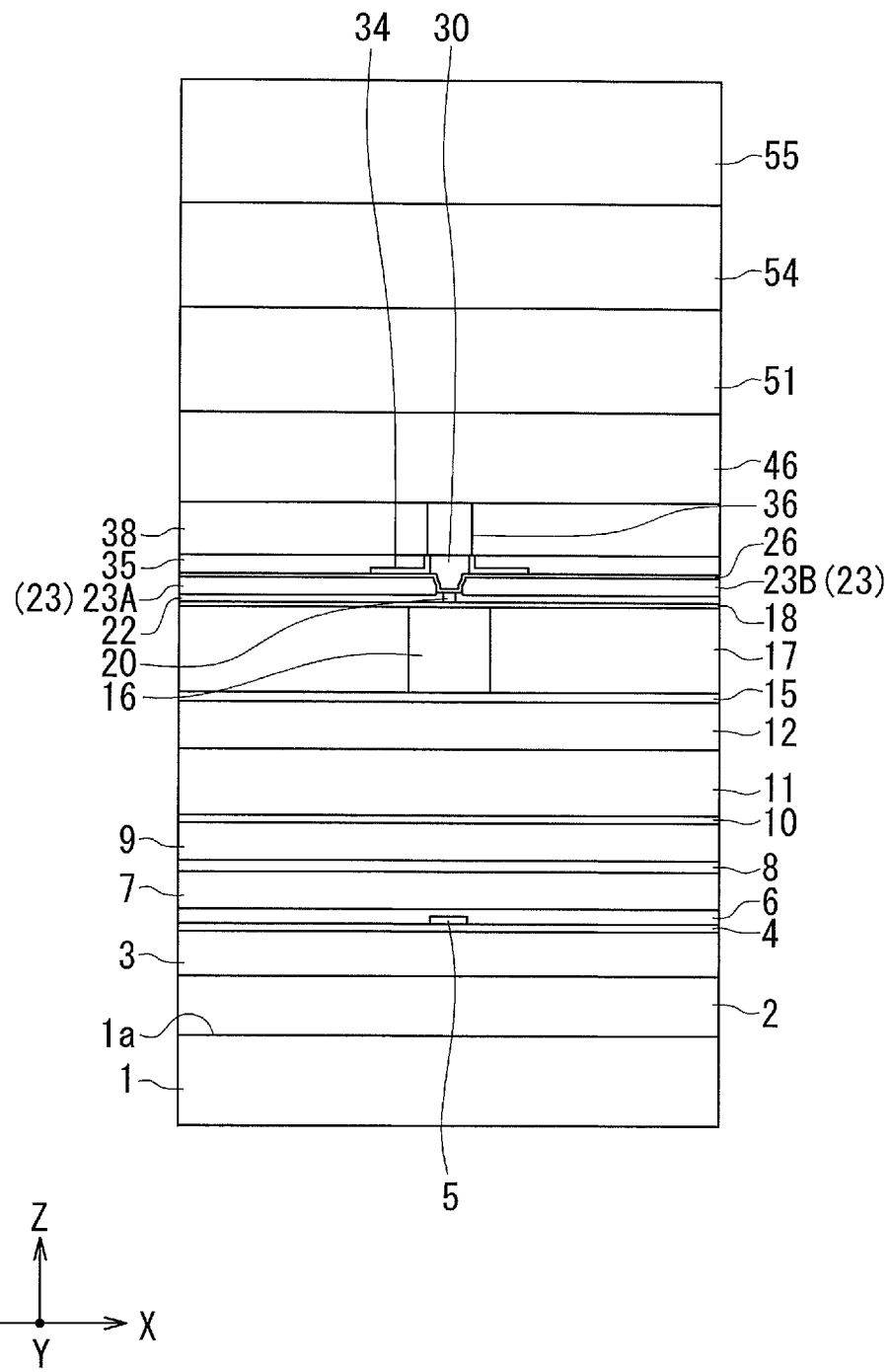
FIG. 6 is a front view showing the medium facing surface of the thermally-assisted magnetic recording head according to the first embodiment of the invention.
Figure 7:
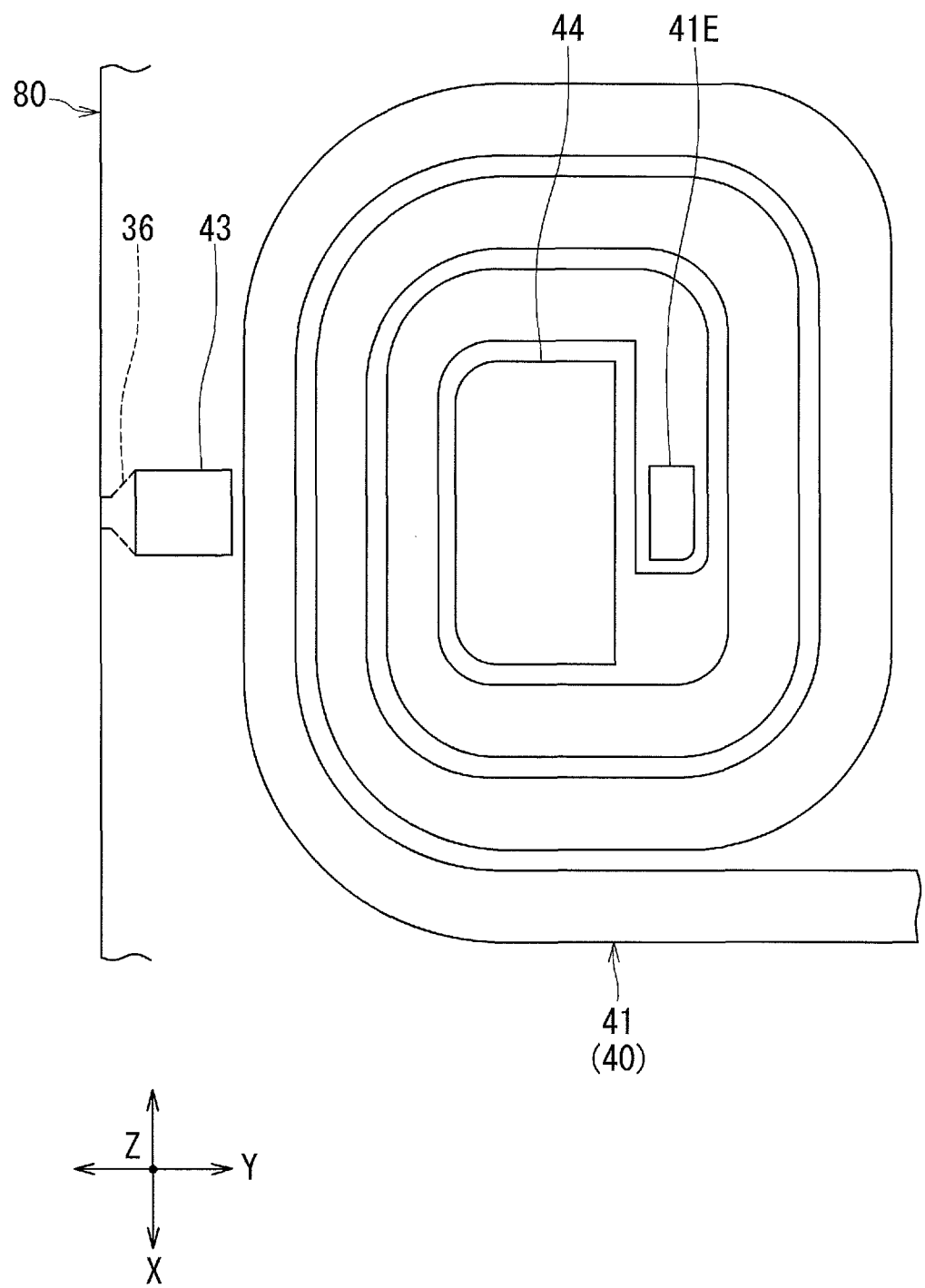
FIG. 7 is a plan view showing a first layer of a coil of the first embodiment of the invention.
Figure 8:
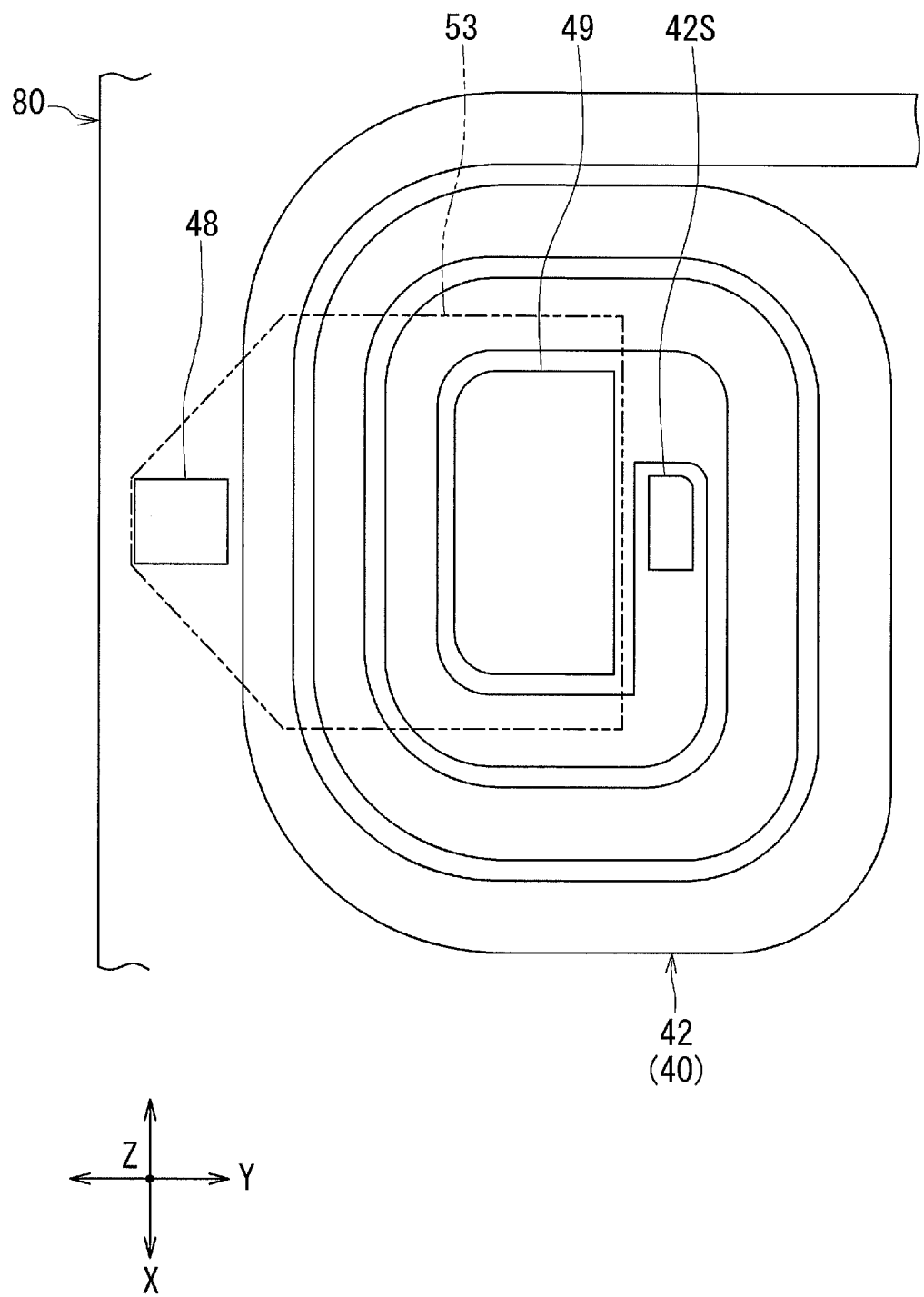
FIG. 8 is a plan view showing a second layer of the coil of the first embodiment of the invention.

Preferred embodiments of the present invention will now be described in detail with reference to the drawings. First, reference is made to FIG. 1 to FIG. 8 to describe the configuration of a thermally-assisted magnetic recording head according to a first embodiment of the invention. FIG. 1 is a front view showing the main part of the thermally-assisted magnetic recording head. FIG. 2 is a cross-sectional view showing the main part of the thermally-assisted magnetic recording head. FIG. 3 is a plan view showing a core, a plasmon generator, and a gap film. FIG. 4 is a plan view showing a main pole, a surrounding layer, and a first heat sink. FIG. 5 is a cross-sectional view showing the configuration of the thermally-assisted magnetic recording head. FIG. 6 is a front view showing the medium facing surface of the thermally-assisted magnetic recording head. FIG. 7 is a plan view showing a first layer of a coil of the present embodiment. FIG. 8 is a plan view showing a second layer of the coil of the present embodiment.

The thermally-assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 5, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$-TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 40 and a main pole 30. The coil 40 produces a magnetic field corresponding to data to be written on the recording medium 90. As shown in FIG. 1, FIG. 2 and FIG. 4, the main pole 30 has a front end face 30a located in the medium facing surface 80. The main pole 30 is configured to pass a magnetic flux corresponding to the magnetic field produced by the coil 40, and to produce from the front end face 30a a write magnetic field for use to write data on the recording medium 90 by means of a perpendicular magnetic recording system. The coil 40 is formed of a conductive material such as copper.

The write head unit further includes a shield 12 formed of a magnetic material, and a return path section R formed of a magnetic material. The shield 12 has an end face located in the medium facing surface 80. The return path section R connects the main pole 30 and the shield 12 to each other, and passes a magnetic flux corresponding to the magnetic field produced by the coil 40.

The return path section R includes a return pole layer 11, two coupling sections 13A and 13B, coupling layers 36, 37, 43, 44, 48 and 49, and a yoke layer 53. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The shield 12 is located on a first portion of the top surface of the return pole layer 11, the first portion being near the medium facing surface 80. The two coupling sections 13A and 13B are located on two second portions of the top surface of the return pole layer 11, the two second portions being located away from the medium facing surface 80. Each of the coupling sections 13A and 13B includes a first layer lying on the return pole layer 11, and a second and a third layer stacked in this order on the first layer. The first layer of the coupling section 13A and the first layer of the coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the coupling sections 13A and 13B are embedded in the insulating layer 14. The insulating layer 14 is formed of alumina, for example.

The write head unit further includes a waveguide including a core 16 and a cladding, the core 16 allowing light to propagate therethrough, the cladding being provided around the core 16. As shown in FIGS. 1 to 3 and FIG. 5 in particular, the core 16 has a front end face 16a facing toward the medium facing surface 80, an evanescent light generating surface 16b which is a top surface, a bottom surface 16c, and two side surfaces 16d and 16e. The front end face 16a may be located in the medium facing surface 80 or at a distance from the medium facing surface 80. FIGS. 1 to 3, FIG. 5, and FIG. 6 show an example in which the front end face 16a is located in the medium facing surface 80.

The cladding includes cladding layers 15, 17 and 18. The cladding layer 15 lies on the shield 12 and the insulating layer 14. The core 16 lies on the cladding layer 15. The cladding layer 17 lies on the cladding layer 15 and surrounds the core 16. The cladding layer 18 is disposed over the evanescent light generating surface 16b of the core 16 and the top surface of the cladding layer 17.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

The second layers of the coupling sections 13A and 13B are embedded in the cladding layers 15 and 17. The second layer of the coupling section 13A and the second layer of the coupling section 13B are located on opposite sides of the core 16 in the track width direction (the X direction) and spaced from the core 16.

The write head unit further includes a plasmon generator 20 lying on the cladding layer 18 in the vicinity of the medium facing surface 80, and an insulating film 21 lying on a portion of the plasmon generator 20 in the vicinity of the medium facing surface 80. FIGS. 5 and 6 omit the illustration of the insulating film 21. The plasmon generator 20 is configured to excite surface plasmons on the principle to be described later. The plasmon generator 20 is formed of, for example, one of Au, Ag, Al, Cu, Pd, Pt, Rh and Ir, or an alloy composed of two or more of these elements. The insulating film 21 is formed of silicon oxide, for example. The shape of the plasmon generator 20 will be described in detail later.

The write head unit further includes a gap film 22 formed of an insulating material, the gap film 22 lying on the cladding layer 18 and surrounding the plasmon generator 20 and the insulating film 21. As shown in FIG. 1 to FIG. 3, the gap film 22 includes a first portion 22A, a second portion 22B and a third portion 22C. The first portion 22A and the second portion 22B are located on opposite sides of the plasmon generator 20 in the track width direction (the X direction). The third portion 22C is located farther from the medium facing surface 80 than is the plasmon generator 20. In FIG. 3, the boundary between the third portion 22C and the first and second portions 22A, 22B is indicated in a dotted line. The gap film 22 is formed of alumina, for example.

The write head unit further includes a surrounding layer 23 lying on a portion of the gap film 22 in the vicinity of the medium facing surface 80, and a first heat sink 24 lying on another portion of the gap film 22 apart from the medium facing surface 80. As shown in FIG. 1, the gap film 22 separates the plasmon generator 20 from the surrounding layer 23. Further, as shown in FIG. 1, FIG. 4 and FIG. 6, the surrounding layer 23 includes a first side portion 23A and a second side portion 23B. The first side portion 23A lies on the first portion 22A of the gap film 22. The second side portion 23B lies on the second portion 22B of the gap film 22. The surrounding layer 23 is formed of a nonmagnetic metal material. The nonmagnetic metal material for use to form the surrounding layer 23 may be Ni, Cr, Ta, Ru, Rh or Rd, for example. The first heat sink 24 is formed of Au or Cu, for example.

The write head unit further includes a second heat sink 25 located away from the medium facing surface 80 and lying on the plasmon generator 20 and the first heat sink 24. The second heat sink 25 is formed of the same material as the first heat sink 24, for example.

The main pole 30 is located on the front side in the direction of travel of the recording medium 90 relative to the core 16. The plasmon generator 20 is located between the core 16 and the main pole 30. The write head unit further includes a separating film 26 formed of a nonmagnetic material and lying on the insulating film 21, the gap film 22, the surrounding layer 23 and the second heat sink 25. The main pole 30 lies on the separating film 26. As shown in FIG. 1 and FIG. 6, the separating film 26 separates the main pole 30 from the surrounding layer 23. As shown in FIG. 1, FIG. 2, FIG. 5 and FIG. 6, the separating film 26 is a single continuous film, and at least part of the separating film 26 is interposed between the main pole 30 and the plasmon generator 20, between the main pole 30 and the surrounding layer 23, and between the main pole 30 and the gap film 22. As shown in FIG. 1 and FIG. 2, the insulating film 21 is interposed between the separating film 26 and the plasmon generator 20 in the vicinity of the medium facing surface 80. As shown in FIG. 2, the separating film 26 also includes a portion interposed between the main pole 30 and the second heat sink 25.

The nonmagnetic material used to form the separating film 26 may be an insulating material or a nonmagnetic metal material. An example of an insulating material that can be used to form the separating film 26 is alumina or silicon oxide. An example of a nonmagnetic metal material that can be used to form the separating film 26 is Ru or Rh. In the present embodiment, the separating film 26 is formed of a nonmagnetic metal material, in particular.

The main pole 30 includes a first portion 31 and a second portion 32. Part of the first portion 31 is located between the first side portion 23A and the second side portion 23B of the surrounding layer 23. The second portion 32 is located on the front side in the Z direction or the direction of travel of the recording medium 90 relative to the first portion 31. In FIG. 1 and FIG. 2, the boundary between the first portion 31 and the second portion 32 is indicated by a dotted line. Part of the second portion 32 lies over the surrounding layer 23 with the separating film 26 interposed between the part of the second portion 32 and the surrounding layer 23.

The write head unit further includes a third heat sink 34 and a nonmagnetic metal film 33. The third heat sink 34 is disposed to extend along the top surfaces of the surrounding layer 23 and the second heat sink 25 and the side surfaces of the second portion 32 of the main pole 30. As shown in FIG. 1, the nonmagnetic metal film 33 is interposed between the third heat sink 34 and the second portion 32, and between the third heat sink 34 and the surrounding layer 23. FIG. 5 and FIG. 6 omit the illustration of the nonmagnetic metal film 33. Although not illustrated, the nonmagnetic metal film 33 is interposed also between the third heat sink 34 and the second heat sink 25. As shown in FIG. 1, the separating film 26 is interposed between the nonmagnetic metal film 33 and the surrounding layer 23. Although not illustrated, the separating film 26 is interposed also between the nonmagnetic metal film 33 and the second heat sink 25.

The third heat sink 34 is formed of the same material as the first heat sink 24, for example. The first, second and third heat sinks 24, 25 and 34 and the surrounding layer 23 have the function of dissipating heat generated by the plasmon generator 20 outward from the plasmon generator 20 and the main pole 30. The separating film 26 includes a portion interposed between the main pole 30 and the plasmon generator 20. The separating film 26 is in contact with the second heat sink 25 and the surrounding layer 23 and connected to the third heat sink 34 via the nonmagnetic metal film 33. Thus, where the separating film 26 is formed of a high thermal conductivity material such as nonmagnetic metal, the heat generated by the plasmon generator 20 can be transferred to the second and third heat sinks 25 and 34 and the surrounding layer 23 by the separating film 26. This allows the above-described effect of the first, second and third heat sinks 24, 25 and 34 and the surrounding layer 23 to be markedly exerted.

The nonmagnetic metal film 33 has the function of preventing the material of the third heat sink 34 from diffusing into the main pole 30. The nonmagnetic metal film 33 is formed of Ru, Cr, Zr, Ti or Ta, for example. Even when the nonmagnetic metal film 33 and the surrounding layer 23 are formed of the same material, the nonmagnetic metal film 33 and the surrounding layer 23 have different properties because they are formed by different methods.

The write head unit further includes a dielectric layer 35 provided around the surrounding layer 23 and the first, second and third heat sinks 24, 25 and 34. The dielectric layer 35 is formed of the same material as the cladding layers 15, 17 and 18, for example.

The third layers of the coupling sections 13A and 13B are embedded in the cladding layer 18, the gap film 22 and the dielectric layer 35. The coupling layer 37 lies on the third layers of the coupling sections 13A and 13B and the dielectric layer 35.

The coupling layer 36 lies on the main pole 30, the third heat sink 34 and the dielectric layer 35. The coupling layer 36 has an end face located in the medium facing surface 80. The coupling layer 36 may include a narrow portion and a wide portion as shown in FIG. 7, the narrow portion having the aforementioned end face of the coupling layer 36 and an end opposite thereto, the wide portion being connected to the end of the narrow portion. The wide portion is greater than the narrow portion in width in the track width direction (the X direction). The width of the narrow portion in the track width direction is substantially constant regardless of distance from the medium facing surface 80. The width of the wide portion in the track width direction is equal to that of the narrow portion at the boundary between the narrow portion and the wide portion, and gradually increases with increasing distance from the medium facing surface 80, then becoming constant. The write head unit further includes a non-illustrated nonmagnetic metal film interposed between the third heat sink 34 and the coupling layer 36, and a dielectric layer 38 disposed around the coupling layer 36 and the coupling layer 37. The non-illustrated nonmagnetic metal film has the function of preventing the material of the third heat sink 34 from diffusing into the coupling layer 36. The non-illustrated nonmagnetic metal film is formed of the same material as the nonmagnetic metal film 33, for example. The dielectric layer 38 is formed of the same material as the cladding layers 15, 17 and 18, for example.

The coupling layer 43 lies on the coupling layer 36. The coupling layer 43 has an end face facing toward the medium facing surface 80 and located at a distance from the medium facing surface 80. The coupling layer 44 lies on the coupling layer 37.

The coil 40 includes a first layer 41 and a second layer 42. As shown in FIG. 7, the first layer 41 is wound around the coupling layer 44. The write head unit further includes an insulating film 45, an insulating layer 46 and an insulating layer 47. The insulating film 45 is interposed between the first layer 41 and each of the coupling layers 43 and 44 and the dielectric layer 38. The insulating layer 46 is disposed around the first layer 41 and the coupling layer 43 and in the space between adjacent turns of the first layer 41. The insulating layer 47 lies on the first layer 41, the insulating film 45 and the insulating layer 46. The insulating film 45 and the insulating layers 46 and 47 are formed of alumina, for example.

The coupling layer 48 lies on the coupling layer 43. The coupling layer 48 has an end face facing toward the medium facing surface 80 and located at a distance from the medium facing surface 80. The coupling layer 49 lies on the coupling layer 44.

The second layer 42 of the coil 40 lies above the first layer 41. As shown in FIG. 8, the second layer 42 is wound around the coupling layer 49. The write head unit further includes an insulating film 50, an insulating layer 51 and an insulating layer 52. The insulating film 50 is interposed between the second layer 42 and each of the coupling layers 48 and 49 and the insulating layer 47. The insulating layer 51 is disposed around the second layer 42 and the coupling layer 48 and in the space between adjacent turns of the second layer 42. The insulating layer 52 lies on the second layer 42, the insulating film 50 and the insulating layer 51. The insulating film 50 and the insulating layers 51 and 52 are formed of alumina, for example.

The yoke layer 53 lies on the coupling layers 48 and 49 and the insulating layer 52. The yoke layer 53 has an end face facing toward the medium facing surface 80 and located at a distance from the medium facing surface 80. The write head unit further includes an insulating layer 54 disposed around the yoke layer 53. The insulating layer 54 is formed of alumina, for example.

As shown in FIG. 5 and FIG. 6, the thermally-assisted magnetic recording head further includes a protective layer 55 disposed to cover the write head unit. The protective layer 55 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 40, the main pole 30, the waveguide, the plasmon generator 20, the surrounding layer 23, the gap film 22, and the separating film 26. The waveguide includes the core 16 and the cladding. The cladding includes the cladding layers 15, 17 and 18.

The write head unit further includes the shield 12 and the return path section R. The shield 12 captures a disturbance magnetic field applied to the thermally-assisted magnetic recording head from the outside thereof. This makes it possible to prevent the disturbance magnetic field from being intensively captured into the main pole 30 and thereby causing erroneous writing on the recording medium 90. The side shield 12 also has the function of capturing a magnetic flux that is produced from the front end face 30a of the main pole 30 and spreads in directions other than the direction perpendicular to the plane of the recording medium 90, and thereby preventing the magnetic flux from reaching the recording medium 90. It is thereby possible to increase the gradient of strength of the write magnetic field. Further, the shield 12 and the return path section R have the function of allowing a magnetic flux that has been produced from the front end face 30a of the main pole 30 and has magnetized a portion of the recording medium 90 to flow back to the main pole 30.

The shape and location of the coil 40 will now be described in detail with reference to FIG. 7 and FIG. 8. As shown in FIG. 7, the first layer 41 of the coil 40 is wound approximately three times around the coupling layer 44. The first layer 41 includes a portion extending to pass through between the coupling layer 43 and the coupling layer 44. The first layer 41 has a coil connection 41E electrically connected to the second layer 42 of the coil 40.

As shown in FIG. 8, the second layer 42 is wound approximately three times around the coupling layer 49. The second layer 42 includes a portion extending to pass through between the coupling layer 48 and the coupling layer 49. The second layer 42 has a coil connection 42S electrically connected to the coil connection 41E of the first layer 41. The coil connection 42S penetrates the insulating layer 47 and the insulating film 50 (see FIG. 5) and is electrically connected to the coil connection 41E. In the example shown in FIG. 7 and FIG. 8, the first layer 41 and the second layer 42 are connected in series.

An example of the shape of the plasmon generator 20 will now be described with reference to FIG. 1 to FIG. 3. The plasmon generator 20 has a near-field light generating surface 20a located in the medium facing surface 80, a plasmon exciting section 20b which is a bottom surface, a top surface 20c, a rear end face 20d located opposite to the near-field light generating surface 20a, and two side surfaces 20e and 20f. The plasmon exciting section 20b is located at a predetermined distance from the evanescent light generating surface 16b of the core 16 and faces the evanescent light generating surface 16b. The cladding layer 18 is interposed between the evanescent light generating surface 16b and the plasmon exciting section 20b. For example, the plasmon generator 20 is generally rectangular in cross section parallel to the medium facing surface 80. The near-field light generating surface 20a is located between the front end face 30a of the main pole 30 and the front end face 16a of the core 16. The near-field light generating surface 20a generates near-field light on the principle to be described later.

As shown in FIG. 3, the width of the plasmon generator 20 in the track width direction (the X direction) gradually increases with increasing distance from the medium facing surface 80 and then becomes constant. The width (the dimension in the track width direction (the X direction)) of the near-field light generating surface 20a is defined by the width of the plasmon generator 20 in the medium facing surface 80. The width of the near-field light generating surface 20a falls within the range of 5 to 40 nm, for example. The height (the dimension in the Z direction) of the near-field light generating surface 20a is defined by the height of the plasmon generator 20 in the medium facing surface 80. The height of the near-field light generating surface 20a falls within the range of 5 to 40 nm, for example.

The main pole 30 will now be described in detail with reference to FIG. 1, FIG. 2 and FIG. 4. As shown in FIG. 1 and FIG. 2, the front end face 30a of the main pole 30 and the near-field light generating surface 20a of the plasmon generator 20 are at locations different from each other in the direction of travel of the recording medium 90 (the Z direction). In the present embodiment, the front end face 30a is located on the trailing side, i.e., the front side in the direction of travel of the recording medium 90, relative to the near-field light generating surface 20a.

The front end face 30a of the main pole 30 includes a first end face portion 31a, and a second end face portion 32a contiguous with the first end face portion 31a. The second end face portion 32a is located farther from the near-field light generating surface 20a than is the first end face portion 31a, and has a greater width in the track width direction than the first end face portion 31a. In the present embodiment, the second end face portion 32a is located on the front side in the direction of travel of the recording medium 90 relative to the first end face portion 31a. Thus, the near-field light generating surface 20a, the first end face portion 31a and the second end face portion 32a are arranged in this order along the direction of travel of the recording medium 90.

In the present embodiment, as shown in FIG. 1, the first end face portion 31a has a first edge E1 closest to the near-field light generating surface 20a, and a second edge E2 located at the boundary between the first end face portion 31a and the second end face portion 32a. As shown in FIG. 1, the second edge E2 is longer than the first edge E1. The length of the first edge E1 is greater than the width of the near-field light generating surface 20a in the track width direction. Alternatively, the length of the first edge E1 may be smaller than or equal to the width of the near-field light generating surface 20a. The first end face portion 31a includes an upper part and a lower part, the upper part being located between the lower part and the second end face portion 32a of the front end face 30a of the main pole 30. The width of the lower part in the track width direction (the X direction) is substantially constant regardless of distance from the near-field light generating surface 20a of the plasmon generator 20. The width of the upper part in the track width direction increases with increasing distance from the near-field light generating surface 20a of the plasmon generator 20.

The main pole 30 includes the first portion 31 and the second portion 32 as mentioned previously. As shown in FIG. 1 and FIG. 2, the first portion 31 has the first end face portion 31a. As shown in FIG. 4, the width of the first portion 31 in the track width direction (the X direction) gradually increases with increasing distance from the medium facing surface 80, and then becomes constant.

As shown in FIG. 1 and FIG. 2, the second portion 32 has the second end face portion 32a. As shown in FIG. 4, the width of the second portion 32 in the track width direction (the X direction) gradually increases with increasing distance from the medium facing surface 80, and then becomes constant. In the example shown in FIG. 4, the second portion 32 includes a narrow portion located between the medium facing surface 80 and a principal part of the second portion 32. The width of the narrow portion in the track width direction is substantially constant regardless of distance from the medium facing surface 80. The widths of the principal part and the narrow portion are equal at the boundary between the principal part and the narrow portion.

Relative locations of the plasmon generator 20, the gap film 22, the surrounding layer 23 and the main pole 30 with respect to each other in the medium facing surface 80 will now be described with reference to FIG. 1. As shown in FIG. 1, the first side portion 23A of the surrounding layer 23 has a first surrounding layer end face 23Aa located in the medium facing surface 80. The second side portion 23B of the surrounding layer 23 has a second surrounding layer end face 23Ba located in the medium facing surface 80. Since the first and second side portions 23A and 23B are portions of the surrounding layer 23, the surrounding layer 23 can be said to have the first and second surrounding layer end faces 23Aa and 23Ba. The first surrounding layer end face 23Aa and the second surrounding layer end face 23Ba are located on opposite sides of at least part of the first end face portion 31a in the track width direction (the X direction) so that the at least part of the first end face portion 31a is interposed between the first and second surrounding layer end faces 23Aa and 23Ba.

As shown in FIG. 1, the first portion 22A of the gap film 22 has a first gap film end face 22Aa located in the medium facing surface 80. The second portion 22B of the gap film 22 has a second gap film end face 22Ba located in the medium facing surface 80. Since the first and second portions 22A and 22B are portions of the gap film 22, the gap film 22 can be said to have the first and second gap film end faces 22Aa and 22Ba. The first gap film end face 22Aa and the second gap film end face 22Ba are located on opposite sides of at least part of the near-field light generating surface 20a in the track width direction (the X direction) so that the at least part of the near-field light generating surface 20a is interposed between the first and second gap film end faces 22Aa and 22Ba.

The first gap film end face 22Aa has a top edge E3 located at its front-side end in the direction of travel of the recording medium 90 (the Z direction). The second gap film end face 22Ba has a top edge E4 located at its front-side end in the direction of travel of the recording medium 90. The top edges E3 and E4 are interposed between the first and second surrounding layer end faces 23Aa and 23Ba and are located on the rear side in the direction of travel of the recording medium 90 relative to the first edge E1 of the first end face portion 31a. Thus, each of the first and second gap film end faces 22Aa and 22Ba includes a portion located between the first and second surrounding layer end faces 23Aa and 23Ba, but does not include any portion interposed between the first surrounding layer end face 23Aa and the first end face portion 31a or between the second surrounding layer end face 23Ba and the first end face portion 31a.

Now, the principle of generation of near-field light in the present embodiment and the principle of thermally-assisted magnetic recording using near-field light will be described in detail. Laser light emitted from a laser diode (not illustrated) enters the core 16. As shown in FIG. 5, the laser light 60 propagates through the core 16 toward the medium facing surface 80, and reaches the vicinity of the plasmon generator 20. The evanescent light generating surface 16b of the core 16 generates evanescent light based on the laser light 60 propagating through the core 16. More specifically, the laser light 60 is totally reflected at the evanescent light generating surface 16b, and the evanescent light generating surface 16b thereby generates evanescent light that permeates into the cladding layer 18. In the plasmon generator 20, surface plasmons are excited on the plasmon exciting section 20b through coupling with the aforementioned evanescent light. The surface plasmons propagate to the near-field light generating surface 20a, and the near-field light generating surface 20a generates near-field light based on the surface plasmons.

The near-field light generated from the near-field light generating surface 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 30 for data writing.

The specific functions and effects of the thermally-assisted magnetic recording head according to the present embodiment will now be described. The thermally-assisted magnetic recording head according to the present embodiment has the following features A and B, as structural features.

[Feature A]

The front end face 30a of the main pole 30 includes the first end face portion 31a and the second end face portion 32a, the second end face portion 32a being greater than the first end face portion 31a in width in the track width direction.

[Feature B]

The surrounding layer 23 has the first and second surrounding layer end faces 23Aa and 23Ba located in the medium facing surface 80. The first surrounding layer end face 23Aa and the second surrounding layer end face 23Ba are located on opposite sides of at least part of the first end face portion 31a in the track width direction so that the at least part of the first end face portion 31a is interposed between the first and second surrounding layer end faces 23Aa and 23Ba. The gap film 22 has the first and second gap film end faces 22Aa and 22Ba located in the medium facing surface 80. The first gap film end face 22Aa and the second gap film end face 22Ba are located on opposite sides of at least part of the near-field light generating surface 20a in the track width direction so that the at least part of the near-field light generating surface 20a is interposed between the first and second gap film end faces 22Aa and 22Ba. Each of the first and second gap film end faces 22Aa and 22Ba includes a portion located between the first and second surrounding layer end faces 23Aa and 23Ba, but does not include any portion interposed between the first surrounding layer end face 23Aa and the first end face portion 31a or between the second surrounding layer end face 23Ba and the first end face portion 31a.

According to the present embodiment, the feature A makes it possible for the main pole 30 to pass a larger amount of magnetic flux when compared with the case where the front end face 30a of the main pole 30 is constituted only of the first end face portion 31a. This allows the main pole 30 to be capable of producing a write magnetic field of sufficient magnitude.

According to the present embodiment, the feature B makes it possible that the space between the first and second surrounding layer end faces 23Aa and 23Ba in which at least part of the first end face portion 31a lies can be adjusted by the width of the portion of each of the first and second gap film end faces 22Aa and 22Ba located between the first surrounding layer end face 23Aa and the second surrounding layer end face 23Ba. Further, since the space between the first and second surrounding layer end faces 23Aa and 23Ba is adjustable as mentioned above, it is possible to adjust the space between the first end face portion 31a and the first surrounding layer end face 23Aa and the space between the first end face portion 31a and the second surrounding layer end face 23Ba. The present embodiment thus allows for a desired sizing of the width of the first end face portion 31a without limitations imposed by the width of the near-field light generating surface 20a, while allowing for precise alignment of the near-field light generating surface 20a and the first end face portion 31a with each other.

In the present embodiment, a portion of the separating film 26 is interposed between the main pole 30 and the surrounding layer 23. Thus, according to the present embodiment, the space between the first end face portion 31a and the first surrounding layer end face 23Aa and the space between the first end face portion 31a and the second surrounding layer end face 23Ba are adjustable also by the thickness of the separating film 26.

A manufacturing method for the thermally-assisted magnetic recording head according to the present embodiment will now be described. The manufacturing method for the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2, the bottom shield layer 3, and the bottom shield gap film 4 in this order on the substrate 1. Then, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, a non-illustrated insulating layer is formed to cover the return pole layer 11. The non-illustrated insulating layer is then polished by, for example, chemical mechanical polishing (hereinafter referred to as CMP), until the return pole layer 11 is exposed. Next, the shield 12 and the first layers of the coupling sections 13A and 13B are formed on the return pole layer 11. Then, the insulating layer 14 is formed over the entire top surface of the stack. The insulating layer 14 is then polished by, for example, CMP, until the shield 12 and the first layers of the coupling sections 13A and 13B are exposed.

Next, the cladding layer 15 is formed over the entire top surface of the stack. The cladding layer 15 is then selectively etched to form therein two openings for exposing the top surfaces of the first layers of the coupling sections 13A and 13B. Then, the second layers of the coupling sections 13A and 13B are formed on the first layers of the coupling sections 13A and 13B, respectively. The core 16 is then formed on the cladding layer 15. The cladding layer 17 is then formed over the entire top surface of the stack. The cladding layer 17 is then polished by, for example, CMP, until the core 16 and the second layers of the coupling sections 13A and 13B are exposed. Then, the cladding layer 18 is formed over the entire top surface of the stack.

Reference is now made to FIG. 9A to FIG. 19C to describe steps to be performed after the formation of the cladding layer 18 up to the formation of the main pole 30. FIG. 9A to FIG. 19C each show a stack of layers formed in the process of manufacturing the thermally-assisted magnetic recording head. Fig. nA (n is an integer between 9 and 19 inclusive) shows a cross section of the stack taken at the location at which the medium facing surface 80 is to be formed. Fig. nB shows a cross section that intersects the front end face 30a of the main pole 30 and that is perpendicular to the medium facing surface 80 and to the top surface 1a of the substrate 1. Fig. nA and Fig. nB omit the illustration of portions located below the core 16 and the cladding layer 17. Fig. nC shows the top surface of part of the stack. In Fig. nC, the symbol "ABS" indicates the location at which the medium facing surface 80 is to be formed.

Figure 9A:
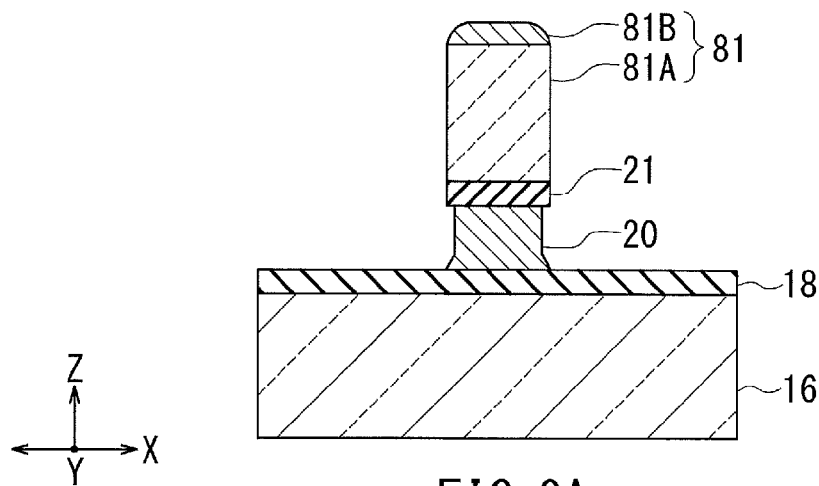
FIG. 9A to FIG. 9C are explanatory diagrams showing a step of a manufacturing method for the thermally-assisted magnetic recording head according to the first embodiment of the invention.
Figure 9B:
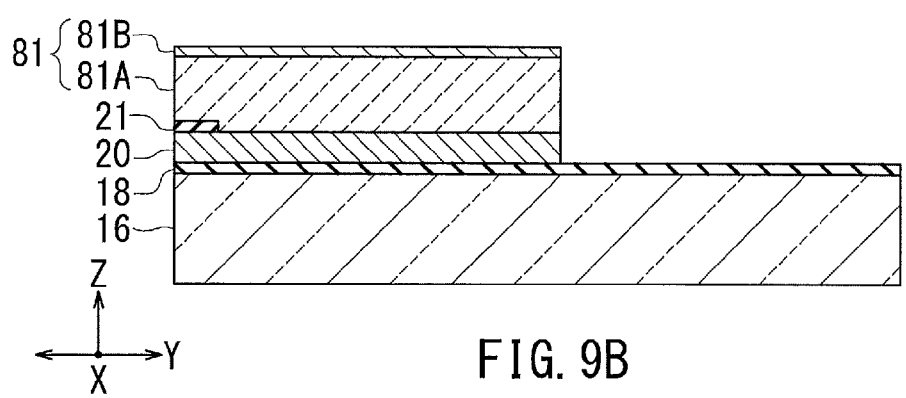
Figure 9C:
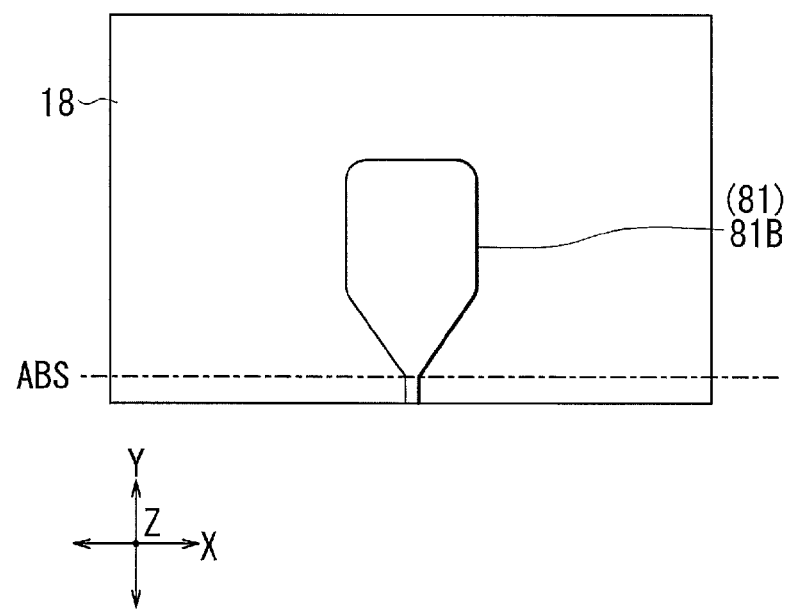

FIG. 9A to FIG. 9C show a step that follows the formation of the cladding layer 18. In this step, first, an initial plasmon generator is formed on the cladding layer 18. Then, the insulating film 21 is formed selectively on a portion of the top surface of the initial plasmon generator, the portion being at and around the location ABS at which the medium facing surface 80 is to be formed. The insulating film 21 may be formed by a lift-off process. Alternatively, an initial insulating film may be first formed over the entire top surface of the initial plasmon generator and then the initial insulating film may be patterned into the insulating film 21 by ion beam etching (hereinafter referred to as IBE), for example.

Next, an etching mask 81 for use to pattern the initial plasmon generator is formed on the initial plasmon generator and the insulating film 21. The planar shape (the shape as viewed from above) of the etching mask 81 corresponds to that of the plasmon generator 20. FIG. 9A to FIG. 9C show an example in which the etching mask 81 includes a first mask layer 81A as its main portion, and a second mask layer 81B lying on the first mask layer 81A. The first mask layer 81A is formed of carbon, alumina, silicon oxide or a photoresist, for example. The second mask layer 81B is formed of Ru, Ta, W, Ni, Ti, Cr or Zr, for example. Alternatively, the entire etching mask 81 may be formed of a photoresist.

The etching mask 81 is formed in the following manner, for example. First, a mask material layer is formed on the initial plasmon generator and the insulating film 21. Then, the second mask layer 81B, whose planar shape corresponds to that of the plasmon generator 20, is formed on the mask material layer. The mask material layer is then etched by, for example, IBE, using the second mask layer 81B as an etching mask. This makes the mask material layer into the first mask layer 81A.

In the step shown in FIG. 9A to FIG. 9C, the initial plasmon generator and the insulating film 21 are then etched by, for example, IBE, using the etching mask 81. This makes the initial plasmon generator into the plasmon generator 20.

Figure 10A:
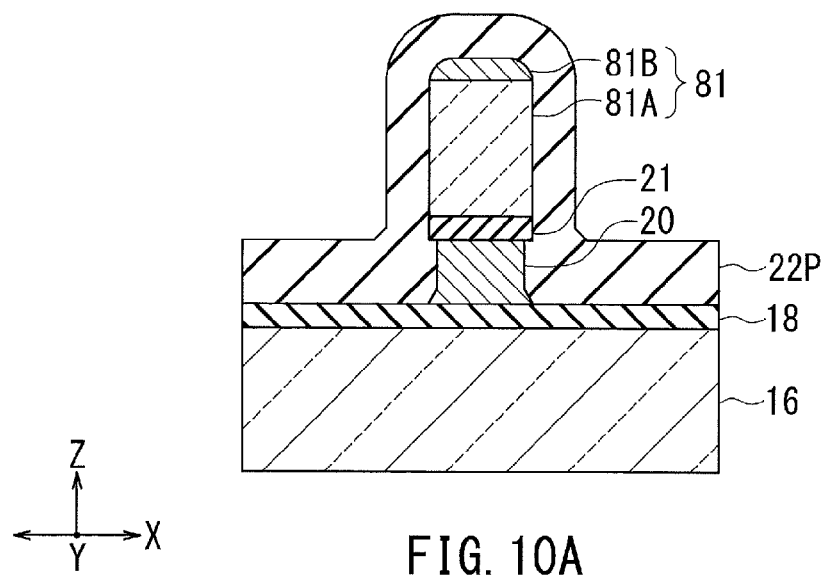
FIG. 10A to FIG. 10C are explanatory diagrams showing a step that follows the step shown in FIG. 9A to FIG. 9C.
Figure 10B:
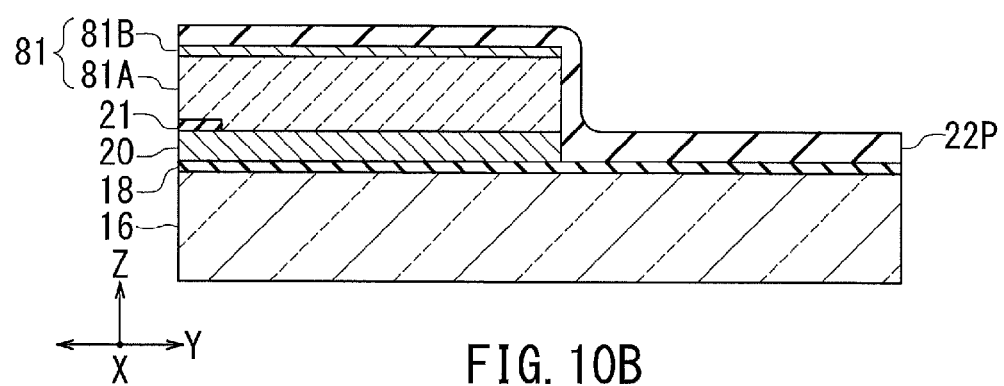
Figure 10C:
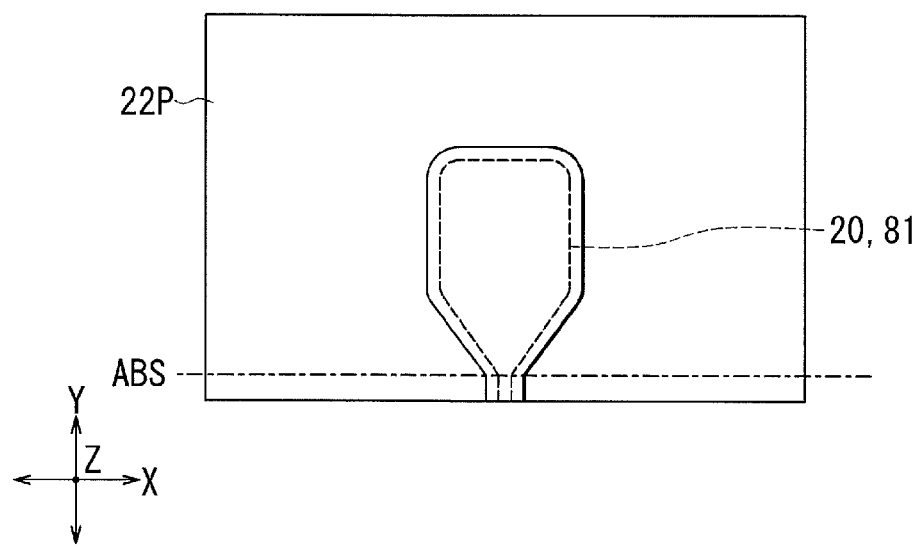

FIG. 10A to FIG. 10C show the next step. In this step, an initial gap film 22P is formed over the entire top surface of the stack by atomic layer deposition, for example. The initial gap film 22P is formed to cover the plasmon generator 20 and the etching mask 81.

Figure 11A:
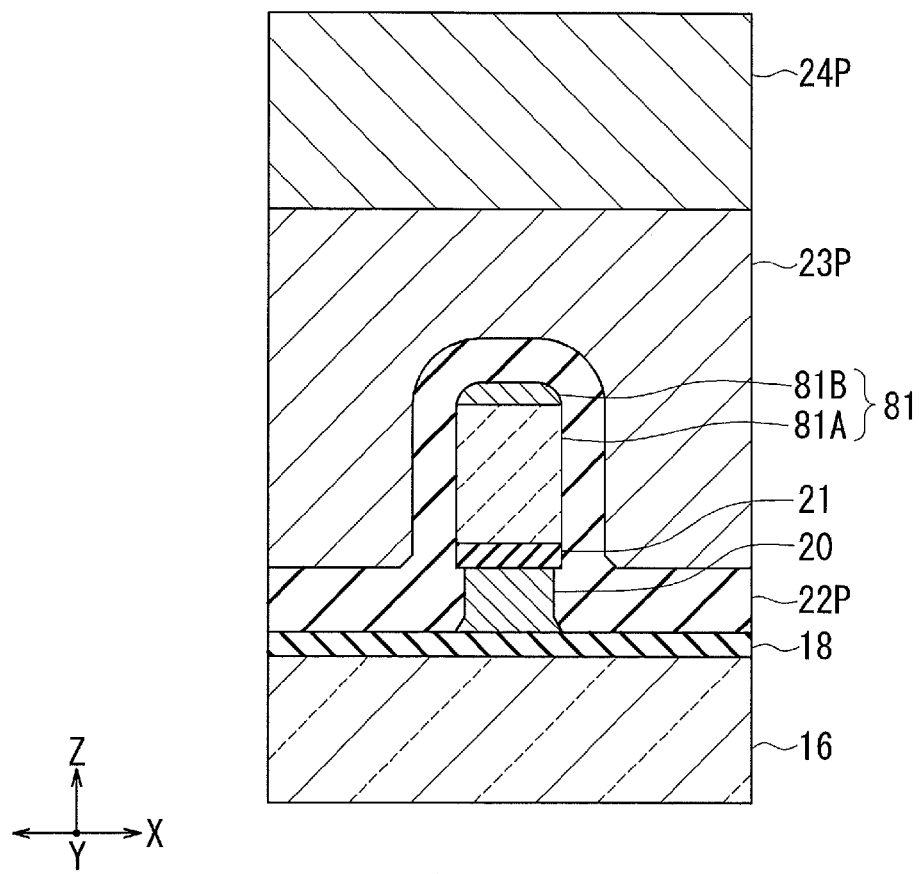
FIG. 11A to FIG. 11C are explanatory diagrams showing a step that follows the step shown in FIG. 10A to FIG. 10C.
Figure 11B:
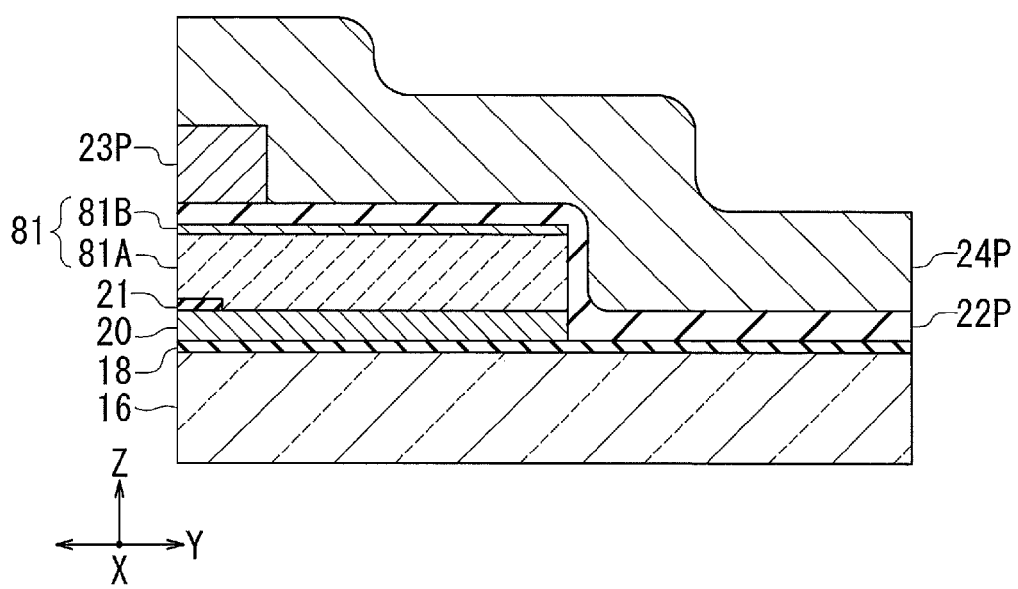
Figure 11C:
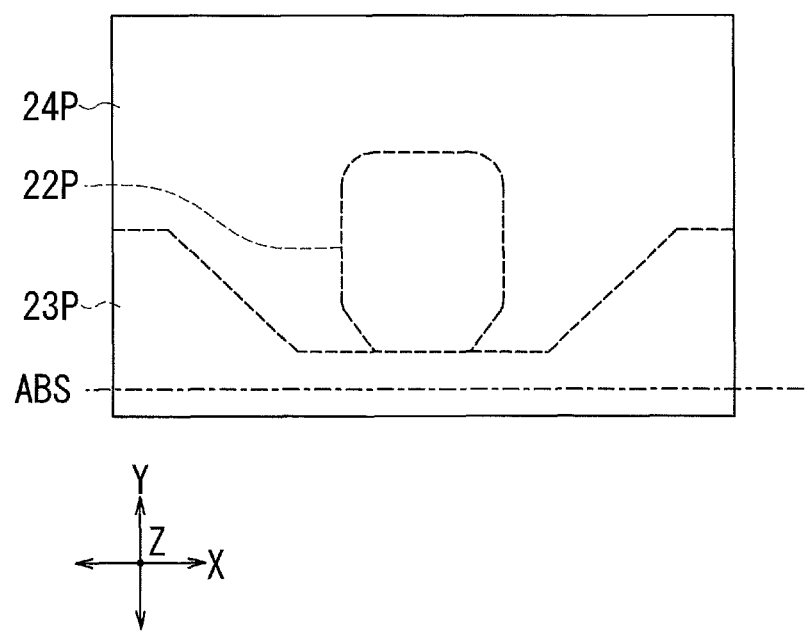

FIG. 11A to FIG. 11C show the next step. In this step, first, an initial surrounding layer 23P is formed on the initial gap film 22P. The initial surrounding layer 23P is formed to cover a portion of the initial gap film 22P located at and around the location ABS at which the medium facing surface 80 is to be formed. Then, a first initial heat sink 24P is formed over the initial gap film 22P and the initial surrounding layer 23P.

Figure 12A:
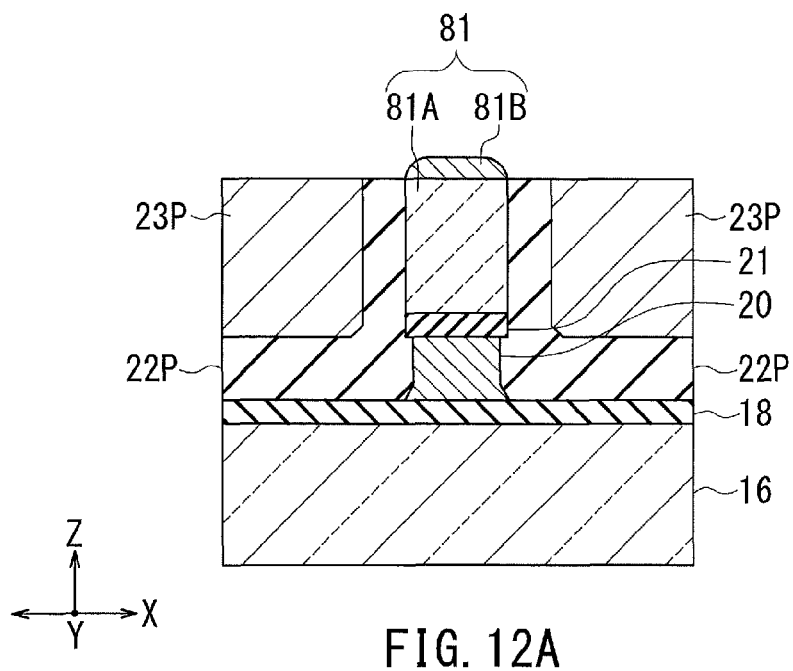
FIG. 12A to FIG. 12C are explanatory diagrams showing a step that follows the step shown in FIG. 11A to FIG. 11C.
Figure 12B:
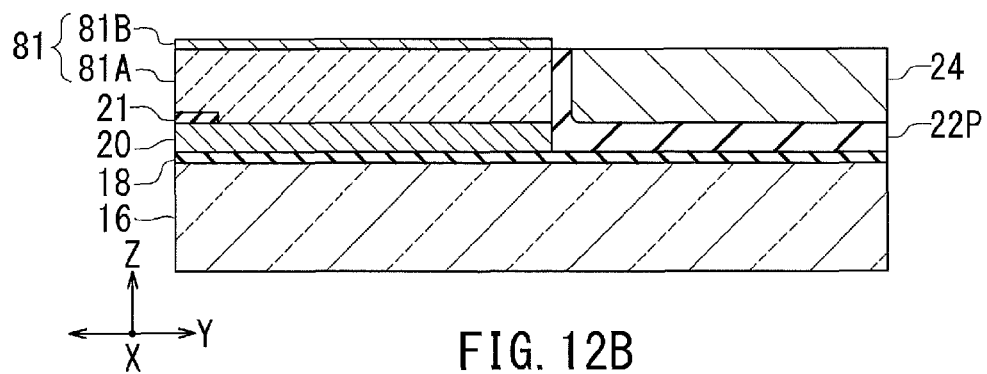
Figure 12C:
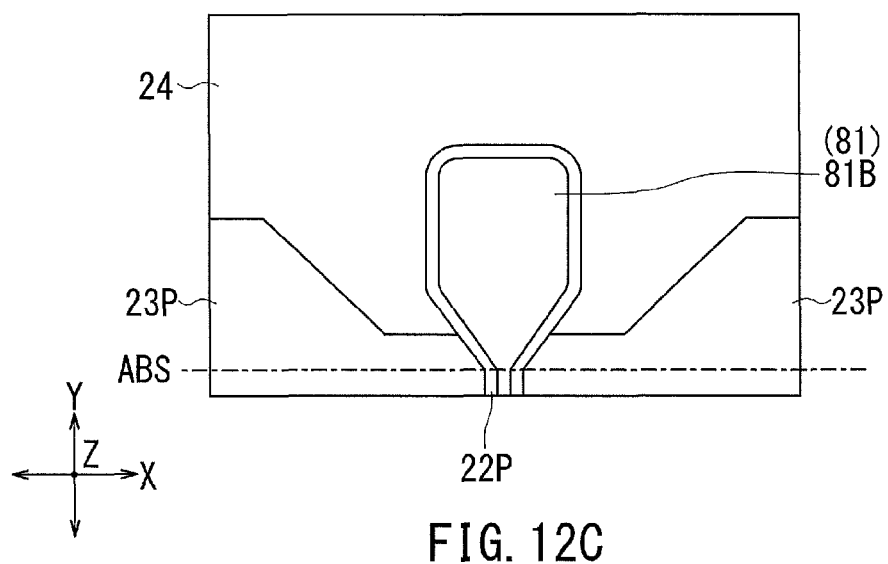

FIG. 12A to FIG. 12C show the next step. In this step, the initial gap film 22P, the initial surrounding layer 23P and the first initial heat sink 24P are polished by, for example, CMP, until the etching mask 81 is exposed. This makes the first initial heat sink 24P into the first heat sink 24.

Figure 13A:
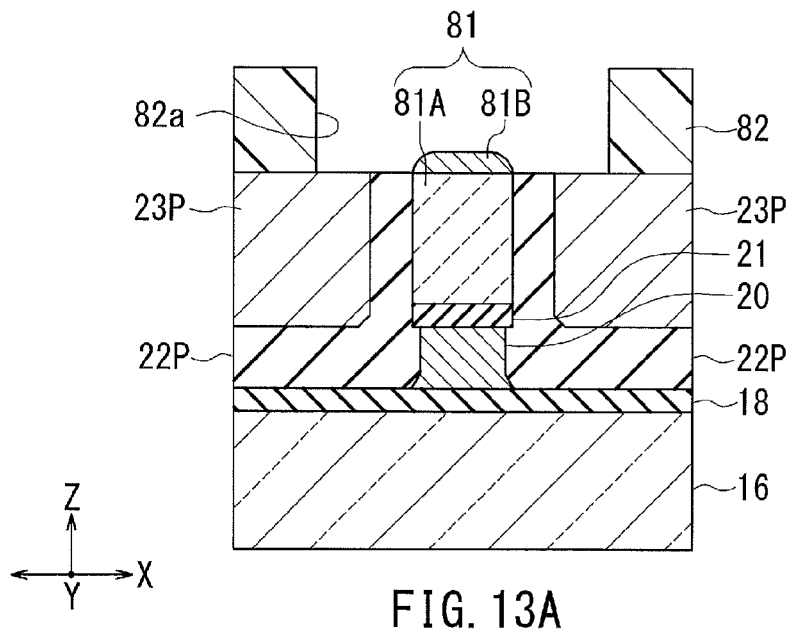
FIG. 13A to FIG. 13C are explanatory diagrams showing a step that follows the step shown in FIG. 12A to FIG. 12C.
Figure 13B:
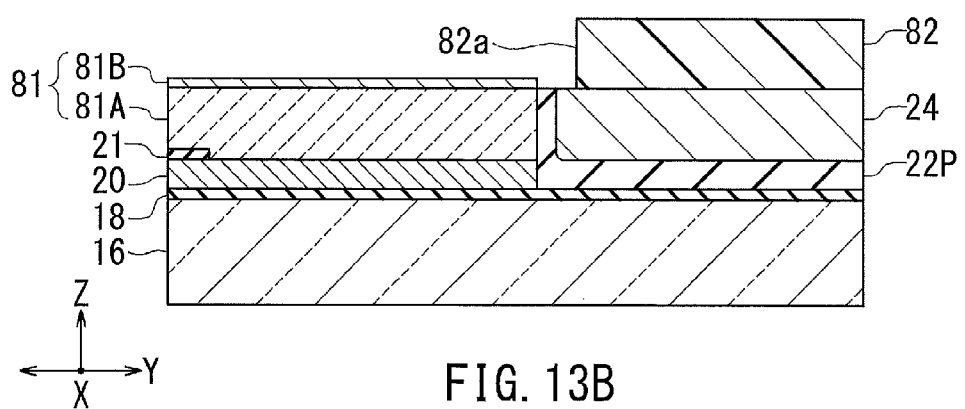
Figure 13C:
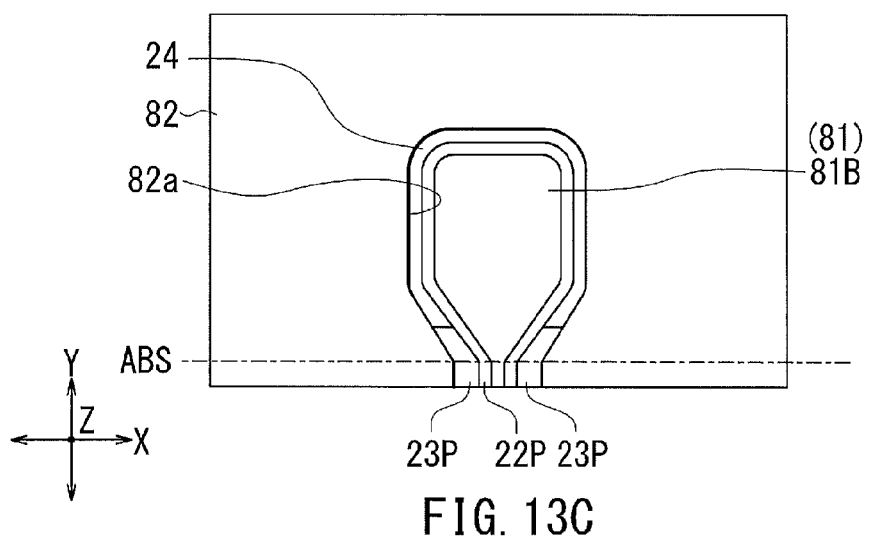

FIG. 13A to FIG. 13C show the next step. In this step, a photoresist mask 82 is formed on the initial surrounding layer 23P and the first heat sink 24. The photoresist mask 82 is formed by patterning a photoresist layer by photolithography. Other photoresist masks to be used in later steps will be formed in the same manner as the photoresist mask 82. The photoresist mask 82 has an opening 82a shaped to correspond to the planar shape of the plasmon generator 20. The opening 82a is larger in planar shape than the plasmon generator 20.

Figure 14A:
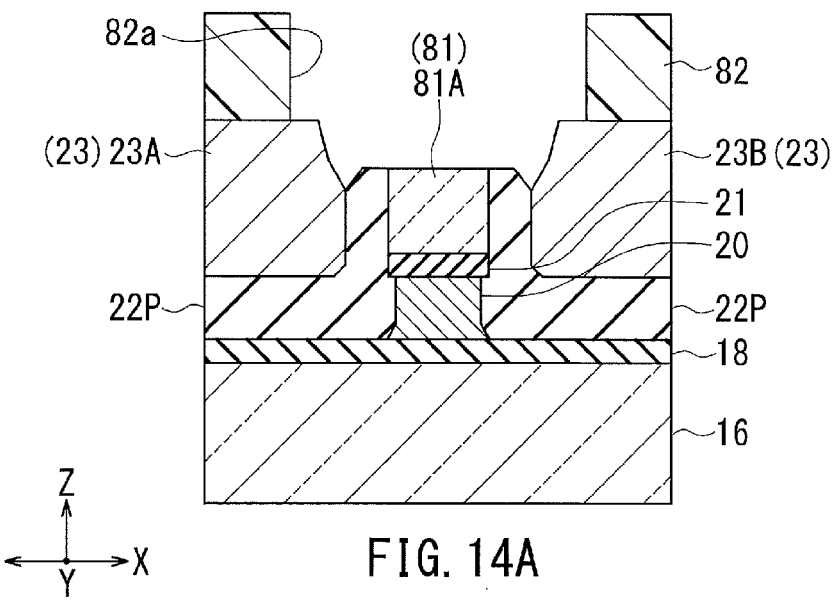
FIG. 14A to FIG. 14C are explanatory diagrams showing a step that follows the step shown in FIG. 13A to FIG. 13C.
Figure 14B:
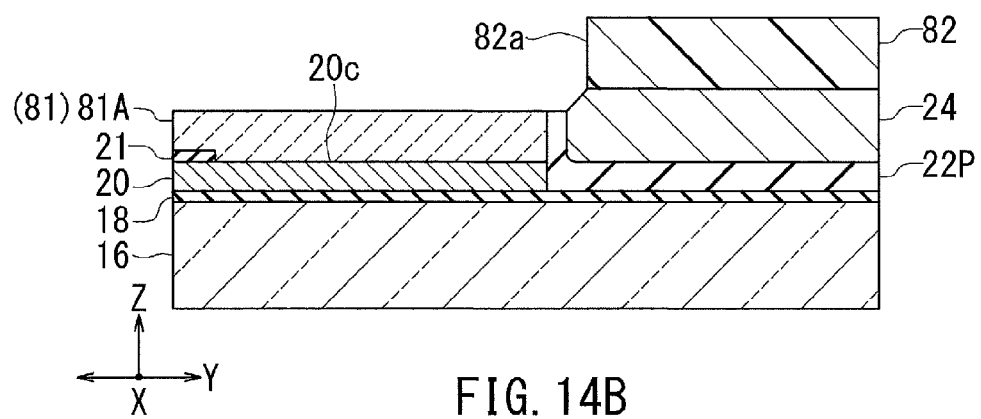
Figure 14C:
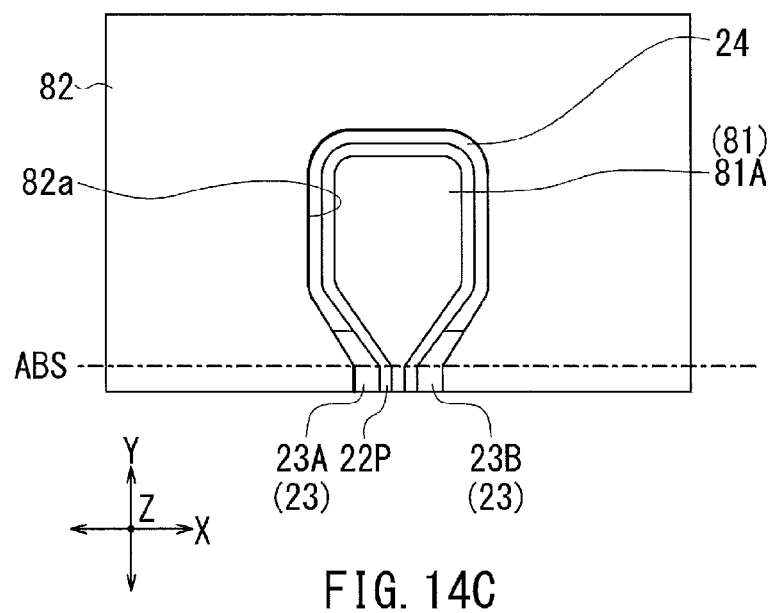

FIG. 14A to FIG. 14C show the next step. In this step, part of each of the initial gap film 22P, the initial surrounding layer 23P and the first heat sink 24 and at least part of the etching mask 81 are etched by, for example, IBE, using the photoresist mask 82 as an etching mask. This makes the initial surrounding layer 23P into the surrounding layer 23. In the present embodiment, the etching mask 81 is etched in part so that the whole of the second mask layer 81B is removed whereas a portion of the first mask layer 81A remains on the plasmon generator 20 and the insulating film 21. This makes it possible to prevent the top surface 20c of the plasmon generator 20 from being damaged by etching.

Figure 15A:
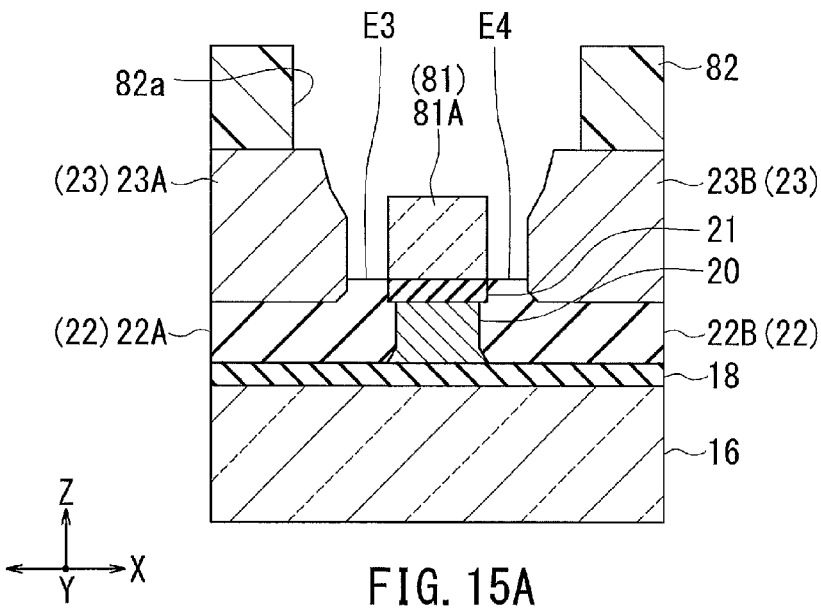
FIG. 15A to FIG. 15C are explanatory diagrams showing a step that follows the step shown in FIG. 14A to FIG. 14C.
Figure 15B:
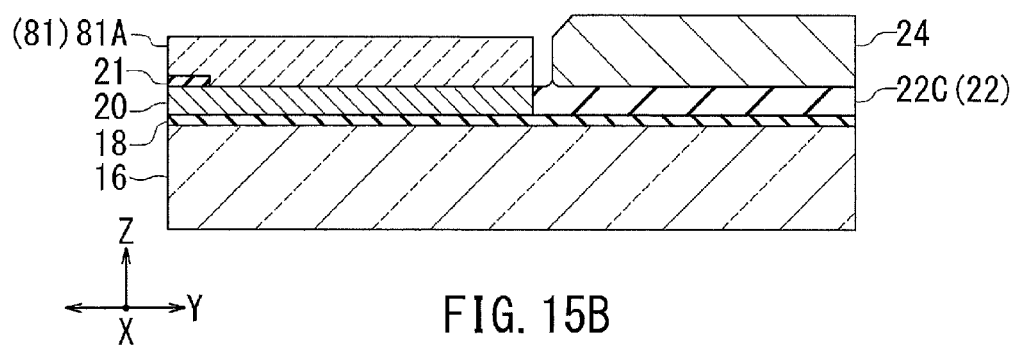
Figure 15C:
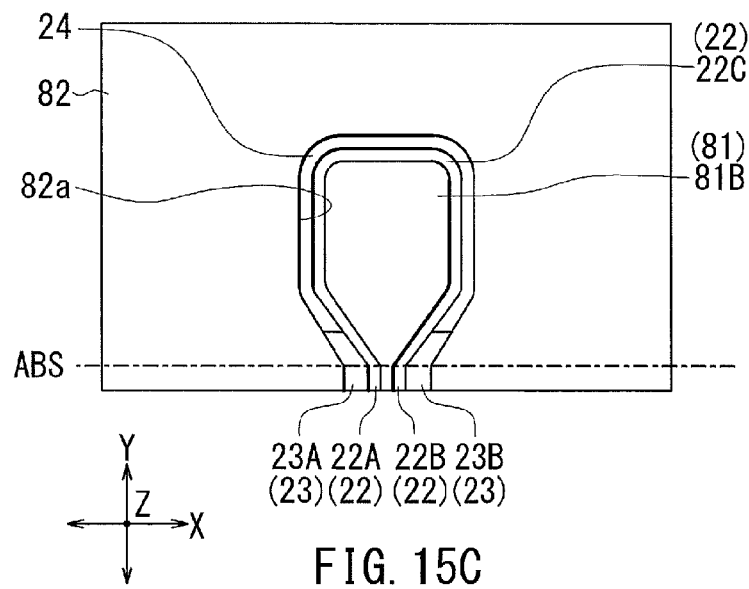

FIG. 15A to FIG. 15C show the next step. In this step, a portion of the initial gap film 22P is removed by etching so that the initial gap film 22P is provided with the top edges E3 and E4. This makes the initial gap film 22P into the gap film 22. The etching of the initial gap film 22P is effected by, for example, wet etching using an alkaline developing solution.

Figure 16A:
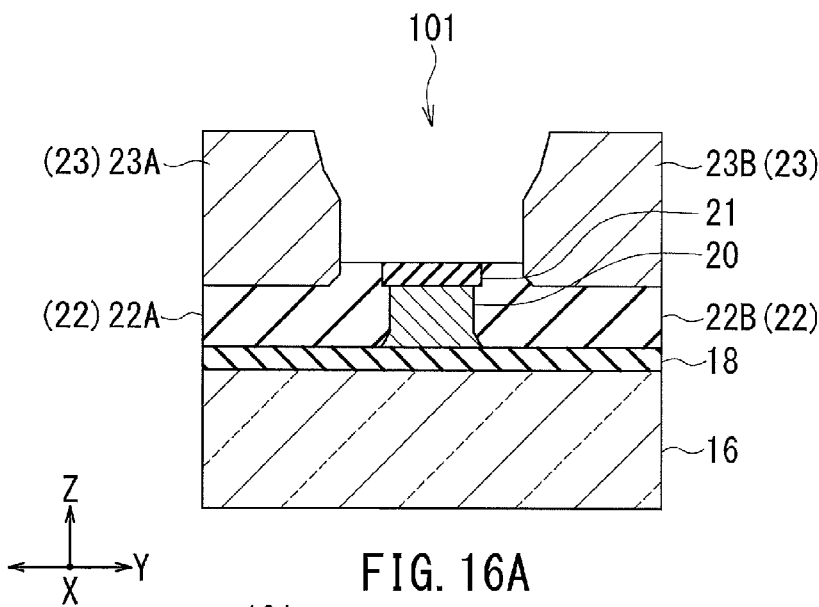
FIG. 16A to FIG. 16C are explanatory diagrams showing a step that follows the step shown in FIG. 15A to FIG. 15C.
Figure 16B:
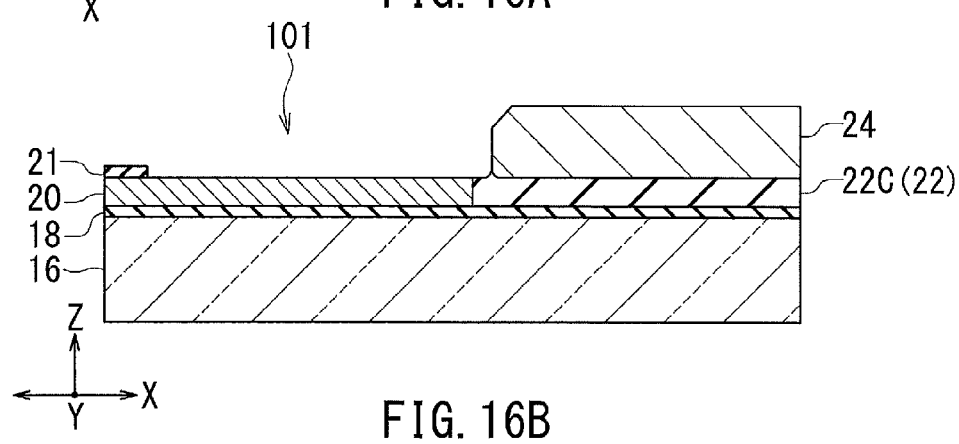
Figure 16C:
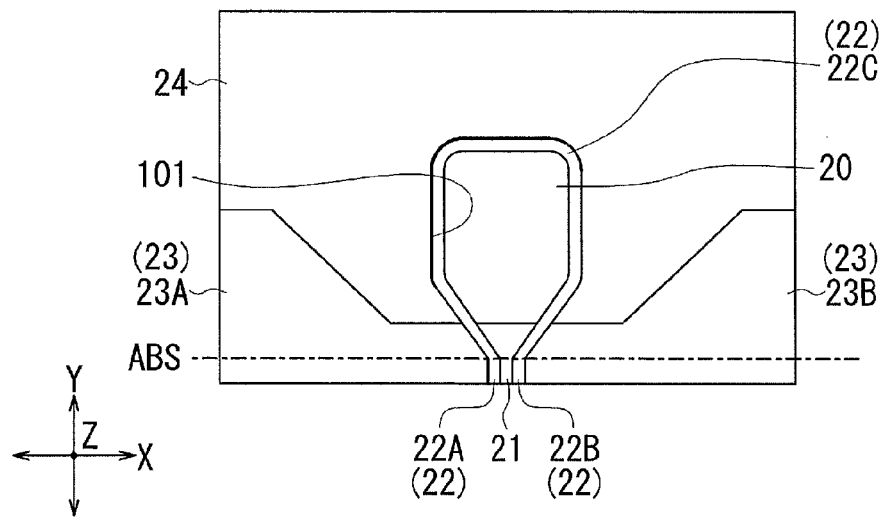

FIG. 16A to FIG. 16C show the next step. In this step, the remainder of the etching mask 81 remaining after the step of FIG. 15A to FIG. 15C, i.e., a portion of the first mask layer 81A, and the photoresist mask 82 are removed. Where the first mask layer 81A is formed of carbon or a photoresist, removal of the first mask layer 81A is effected by ashing, for example.

A series of steps from the step shown in FIGS. 14A-14C to the step shown in FIGS. 16A-16C corresponds to the removal step of the present invention. As shown in FIG. 16A to FIG. 16C, the removal step results in the formation of a structure having a recess 101, the structure including the plasmon generator 20, the surrounding layer 23 and the gap film 22. The step of removing a portion of the initial gap film 22P and the step of removing the etching mask 81 in the foregoing series of steps may be performed in the reverse order to that described above.

Figure 17A:
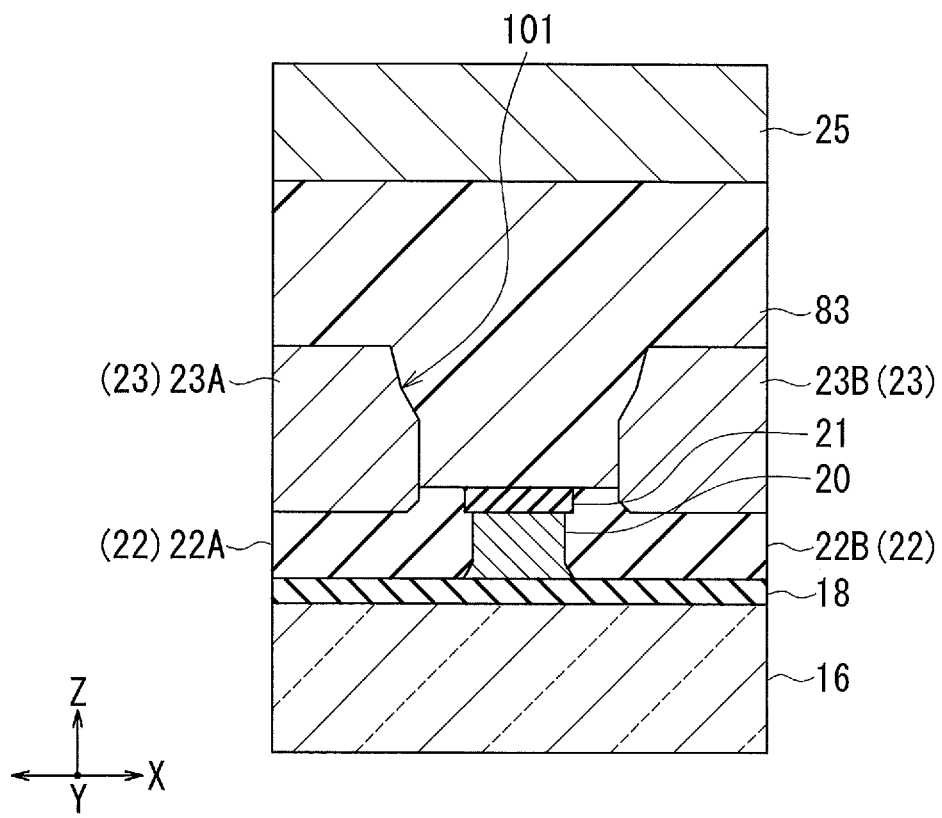
FIG. 17A to FIG. 17C are explanatory diagrams showing a step that follows the step shown in FIG. 16A to FIG. 16C.
Figure 17B:
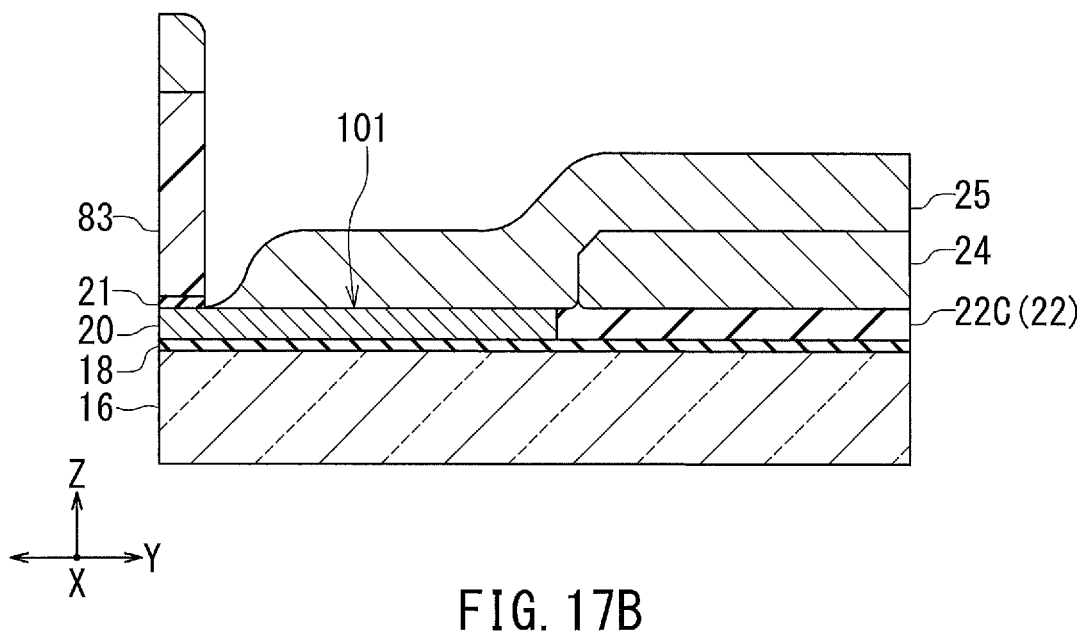
Figure 17C:
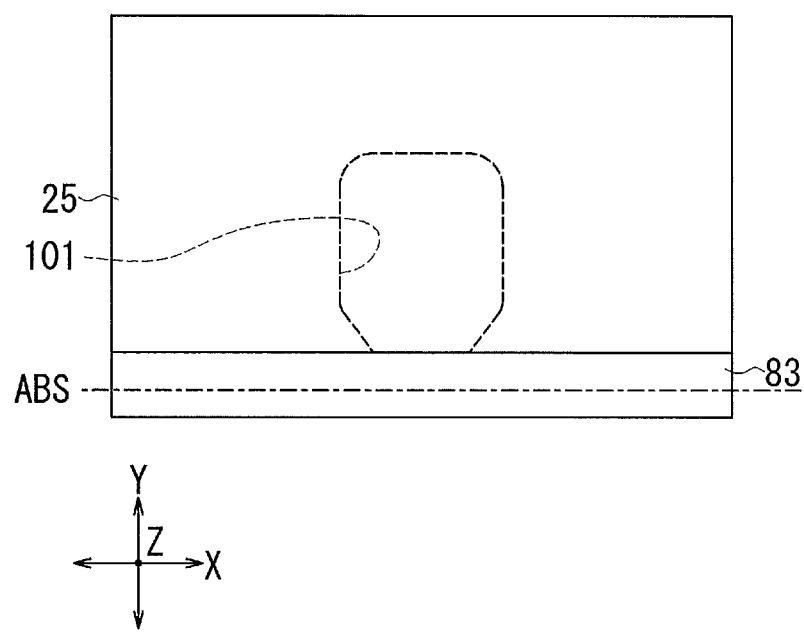

FIG. 17A to FIG. 17C show the next step. In this step, first, a photoresist mask 83 is formed on the stack. The photoresist mask 83 covers a portion of the recess 101 that is located at and around the location ABS at which the medium facing surface 80 is to be formed. Then, a metal film is formed over the entire top surface of the stack by ion beam deposition, for example. A portion of the metal film lying over the plasmon generator 20, the surrounding layer 23 and the first heat sink 24 makes the second heat sink 25. FIG. 17C omits the illustration of a portion of the metal film located on the photoresist mask 83. The photoresist mask 83 is then lifted off.

Figure 18A:
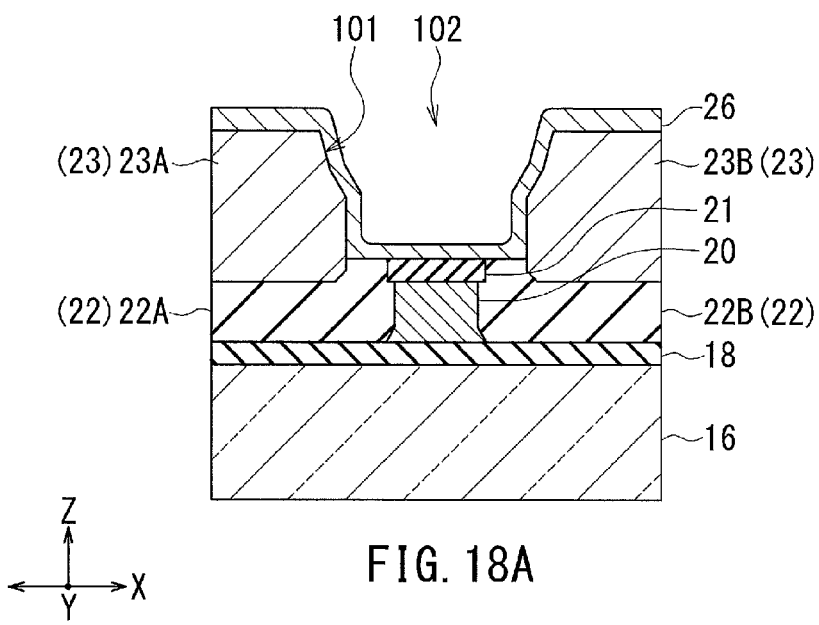
FIG. 18A to FIG. 18C are explanatory diagrams showing a step that follows the step shown in FIG. 17A to FIG. 17C.
Figure 18B:
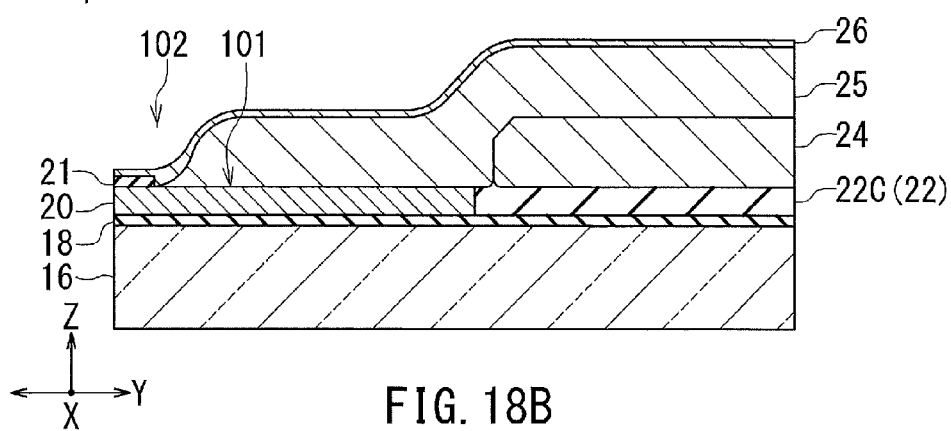
Figure 18C:
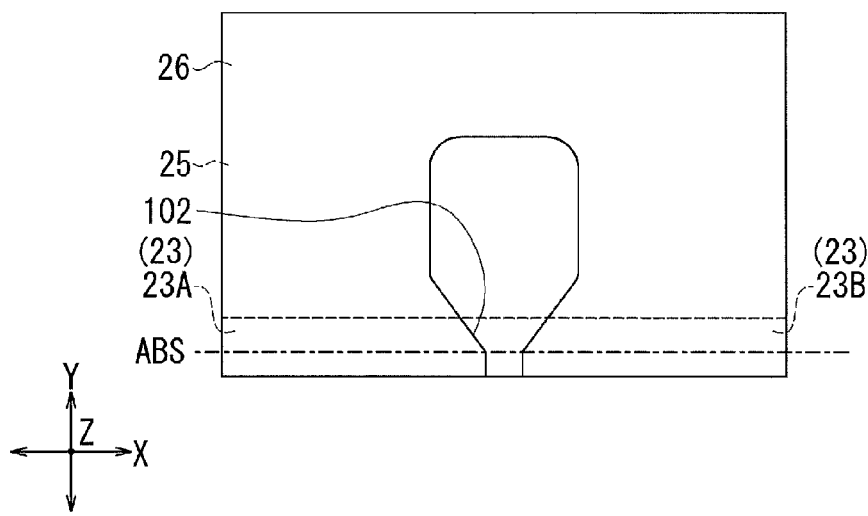

FIG. 18A to FIG. 18C show the next step. In this step, the separating film 26 is formed on the aforementioned structure by atomic layer deposition, for example. The separating film 26 forms a receiving section 102 shaped to correspond to the recess 101.

Figure 19A:
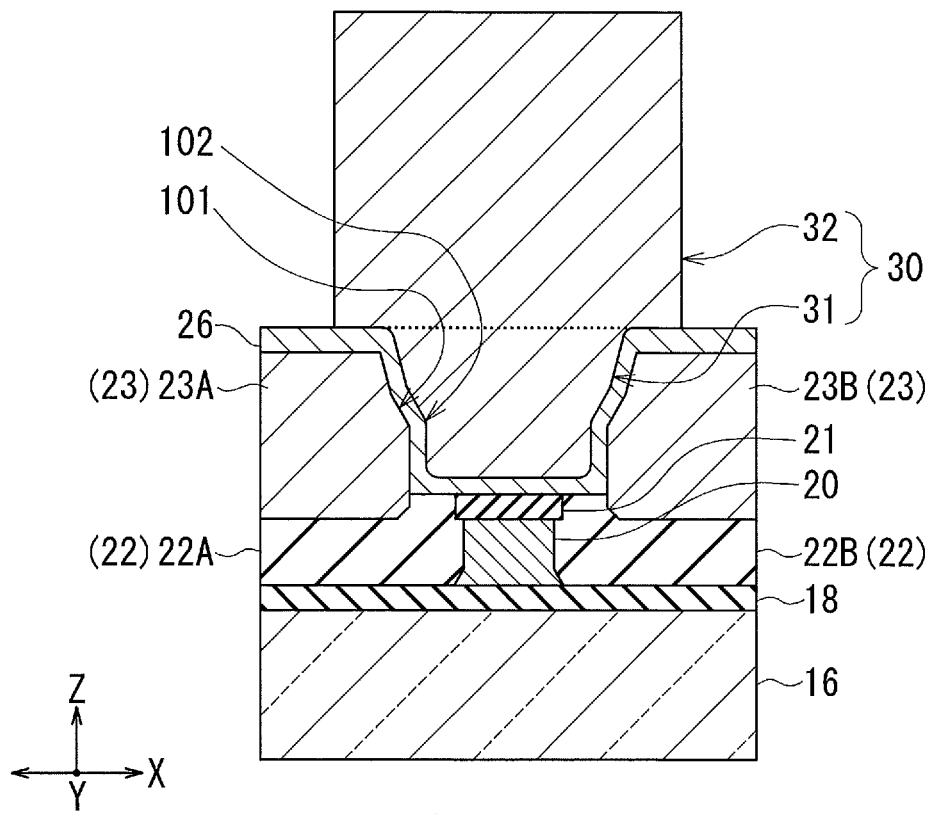
FIG. 19A to FIG. 19C are explanatory diagrams showing a step that follows the step shown in FIG. 18A to FIG. 18C.
Figure 19B:
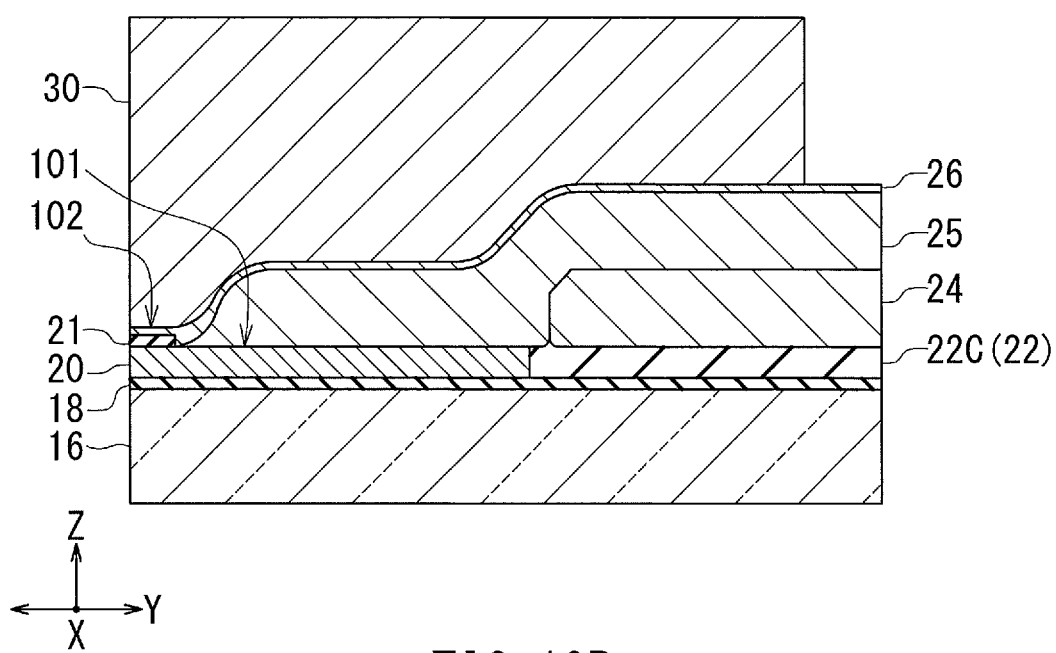
Figure 19C:
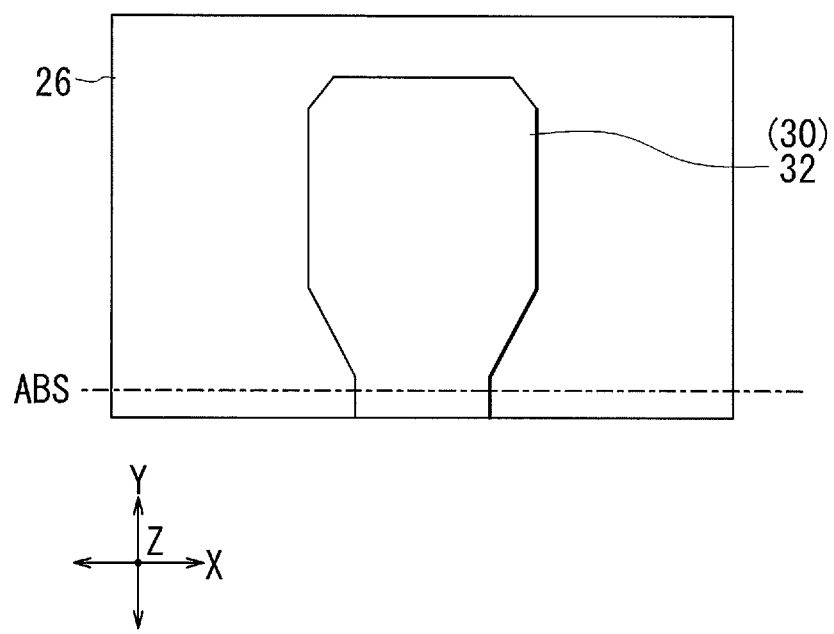

FIG. 19A to FIG. 19C show the next step. In this step, first, a seed layer (not illustrated) is formed on the separating film 26. Then, the main pole 30 is formed by plating, using the seed layer as an electrode and a seed. In the present embodiment, the main pole 30 is formed on the separating film 26 such that the first portion 31 is received in the receiving section 102. As a result, at least part of the first portion 31 is received in the recess 101. Then, a portion of the seed layer that is not covered with the main pole 30 is removed by, for example, IBE, using the main pole 30 as an etching mask.

Now, steps to follow the step shown in FIG. 19A to FIG. 19C will be described with reference to FIG. 5 and FIG. 6. In this step, first, the nonmagnetic metal film 33 is formed to cover the main pole 30 and the separating film 26 by sputtering, for example. Then, the third heat sink 34 is formed on the nonmagnetic metal film 33 by frame plating or lift-off process, for example. Next, the cladding layer 18 and the gap film 22 are selectively etched to form therein two openings for exposing the top surfaces of the second layers of the coupling sections 13A and 13B. Then, the third layers of the coupling sections 13A and 13B are formed on the second layers of the coupling sections 13A and 13B, respectively. Next, the dielectric layer 35 is formed over the entire top surface of the stack. The main pole 30, the third layers of the coupling sections 13A and 13B, the third heat sink 34, the nonmagnetic metal film 33 and the dielectric layer 35 are then polished by CMP, for example.

Next, a non-illustrated nonmagnetic metal film is formed on the third heat sink 34. Then, the coupling layer 36 is formed over the main pole 30, the dielectric layer 35 and the non-illustrated nonmagnetic metal film, and the coupling layer 37 is formed over the third layers of the coupling sections 13A and 13B and the dielectric layer 35. Next, the dielectric layer 38 is formed over the entire top surface of the stack. The dielectric layer 38 is then polished by, for example, CMP, until the coupling layer 36 and the coupling layer 37 are exposed.

Next, the coupling layer 43 is formed on the coupling layer 36, and the coupling layer 44 is formed on the coupling layer 37. The insulating film 45 is then formed over the entire top surface of the stack. The first layer 41 of the coil 40 is then formed on the insulating film 45. Next, the insulating layer 46 is formed over the entire top surface of the stack. The insulating film 45 and the insulating layer 46 are then polished by, for example, CMP, until the coupling layers 43 and 44 and the first layer 41 are exposed.

Next, the insulating layer 47 is formed on the first layer 41 of the coil 40 and the insulating layer 46. Then, the coupling layer 48 is formed on the coupling layer 43, and the coupling layer 49 is formed on the coupling layer 44. Next, the insulating film 50 is formed over the entire top surface of the stack. The insulating layer 47 and the insulating film 50 are then selectively etched to form therein openings for exposing the coil connection 41E (see FIG. 7) of the first layer 41 of the coil 40. Then, the second layer 42 of the coil 40 is formed on the insulating film 50 and the coil connection 41E. Next, the insulating layer 51 is formed over the entire top surface of the stack. The insulating film 50 and insulating layer 51 are then polished by, for example, CMP, until the coupling layers 48 and 49 and the second layer 42 are exposed.

Next, the insulating layer 52 is formed on the second layer 42 of the coil 40 and the insulating layer 51. The yoke layer 53 is then formed over the coupling layers 48 and 49 and the insulating layer 52. Next, the insulating layer 54 is formed over the entire top surface of the stack. The insulating layer 54 is then polished by, for example, CMP, until the yoke layer 53 is exposed. Then, the protective layer 55 is formed to cover the yoke layer 53 and the insulating layer 54. Wiring, terminals, and other components are then formed on the top surface of the protective layer 55. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

The effects of the manufacturing method for the thermally-assisted magnetic recording head according to the present embodiment will now be described. In the manufacturing method for the thermally-assisted magnetic recording head according to the present embodiment, the initial gap film 22P is formed to cover the plasmon generator 20 and the etching mask 81 after the step of etching the initial plasmon generator, and the surrounding layer 23 is formed after the formation of the initial gap film 22P. The surrounding layer 23 is thus formed in a self-aligned manner to be in precise alignment with the plasmon generator 20. This brings the first and second surrounding layer end faces 23Aa and 23Ba into precise alignment with the near-field light generating surface 20a.

Further, according to the present embodiment, the removal step of removing a portion of the initial gap film 22P and at least a portion of the etching mask 81 is performed after the formation of the surrounding layer 23. The removal step makes the initial gap film 22P into the gap film 22 and results in the formation of a structure having the recess 101, the structure including the plasmon generator 20, the surrounding layer 23 and the gap film 22. The main pole 30 is formed such that at least part of the first portion 31 is received in the recess 101. The main pole 30 is thus formed in a self-aligned manner to be in precise alignment with the plasmon generator 20. This brings the first end face portion 31a into precise alignment with the near-field light generating surface 20a.

Further, the present embodiment makes it possible to adjust the space between the first and second surrounding layer end faces 23Aa and 23Ba by the width of the portion of each of the first and second gap film end faces 22Aa and 22Ba located between the first and second surrounding layer end faces 23Aa and 23Ba. The width of the portion of each of the first and second gap film end faces 22Aa and 22Ba can be adjusted by the thickness of the initial gap film 22P. The present embodiment thus allows for a desired sizing of the width of the first end face portion 31a without limitations imposed by the width of the near-field light generating surface 20a. Further, according to the present embodiment, since the space between the first and second surrounding layer end faces 23Aa and 23Ba is adjustable, it is possible to adjust the space between the first end face portion 31a and the first surrounding layer end face 23Aa and the space between the first end face portion 31a and the second surrounding layer end face 23Ba.

Second Embodiment

Figure 20:
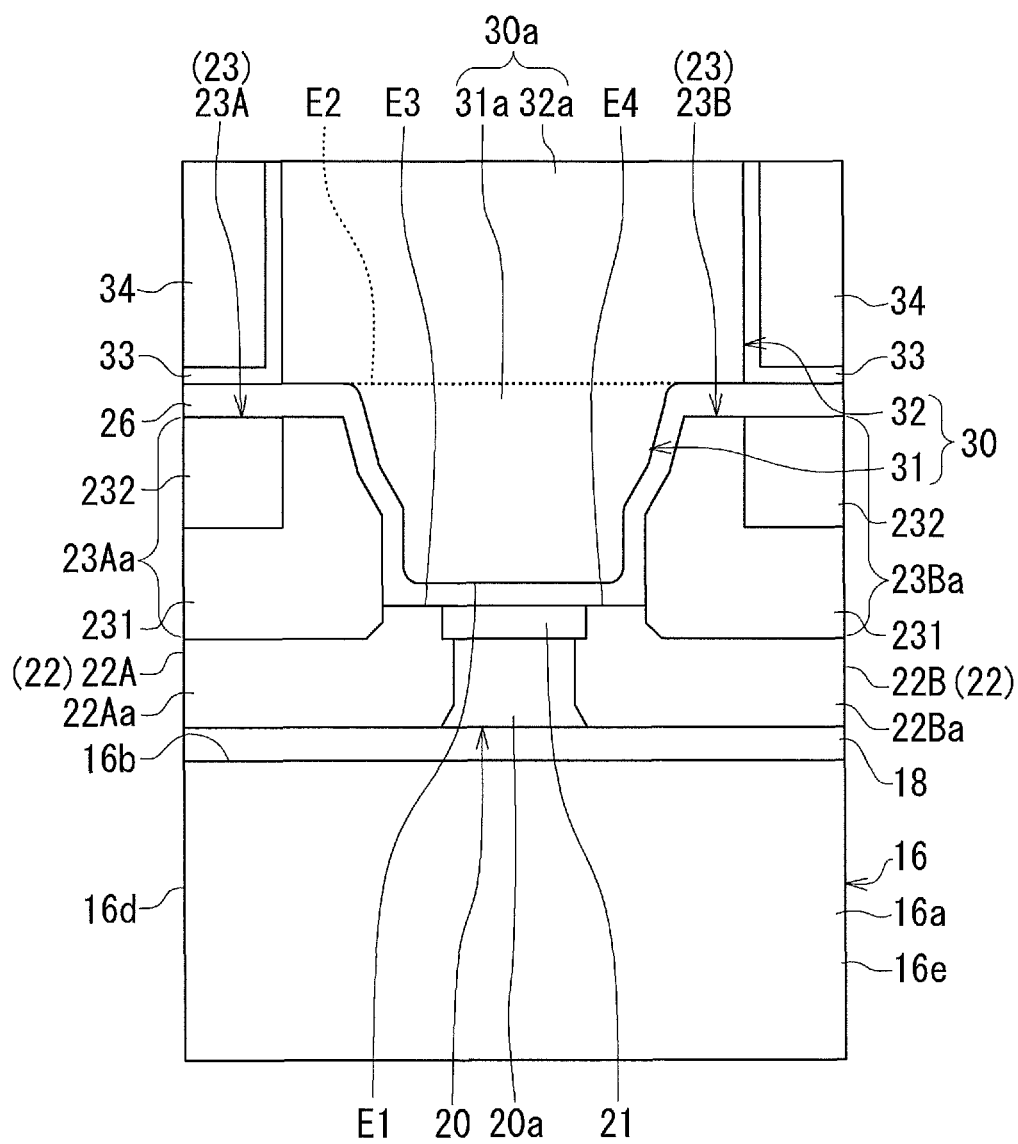
FIG. 20 is a front view showing the main part of a thermally-assisted magnetic recording head according to a second embodiment of the invention.

A thermally-assisted magnetic recording head according to a second embodiment of the invention will now be described with reference to FIG. 20. FIG. 20 is a front view showing the main part of the thermally-assisted magnetic recording head according to the present embodiment. In the present embodiment, the surrounding layer 23 is configured differently than in the first embodiment. More specifically, in the present embodiment the surrounding layer 23 includes a first layer 231 and a second layer 232 stacked. The first side portion 23A of the surrounding layer 23 is constituted by a portion of the first layer 231 and a portion of the second layer 232. The second side portion 23B of the surrounding layer 23 is constituted by another portion of the first layer 231 and another portion of the second layer 232.

The first layer 231 and the second layer 232 are formed of different nonmagnetic metal materials. The nonmagnetic metal material used to form the first layer 231 is Au or Cu, for example. The nonmagnetic metal material used to form the second layer 232 is one of Ni, Cr, Ta, Ru and Rd, for example.

A manufacturing method for the thermally-assisted magnetic recording head according to the present embodiment will now be described with reference to FIG. 21A to FIG. 23B. FIG. 21A to FIG. 23B each show a stack of layers formed in the process of manufacturing the thermally-assisted magnetic recording head. Fig. nA (n is an integer between 21 and 23 inclusive) shows a cross section of the stack taken at the location at which the medium facing surface 80 is to be formed. Fig. nB shows a cross section that intersects the front end face 30a of the main pole 30 and that is perpendicular to the medium facing surface 80 and to the top surface 1a of the substrate 1. Fig. nA and Fig. nB omit the illustration of portions located below the core 16 and the cladding layer 17.

Figure 21A:
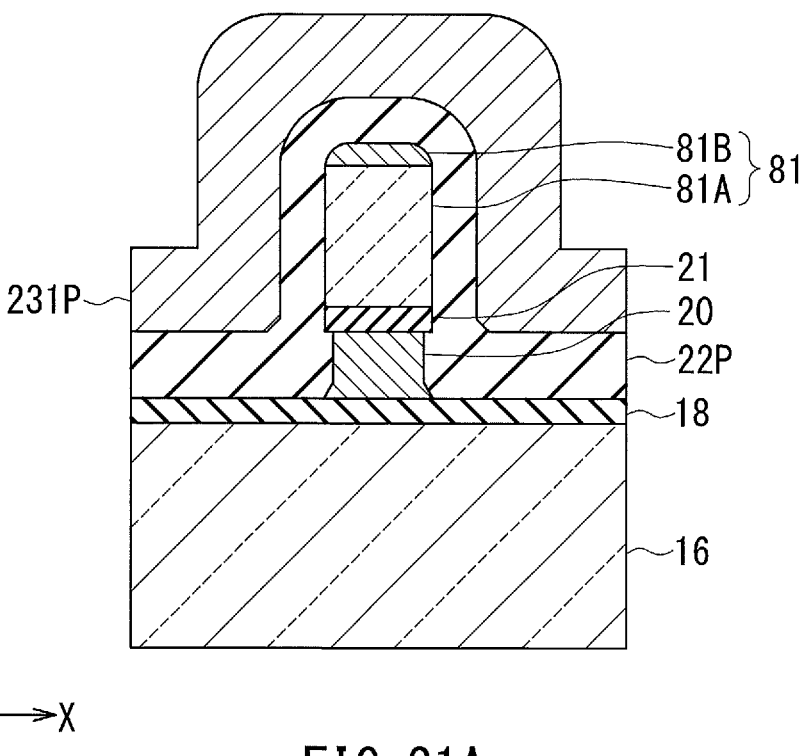
FIG. 21A and FIG. 21B are cross-sectional views showing a step of a manufacturing method for the thermally-assisted magnetic recording head according to the second embodiment of the invention.
Figure 21B:
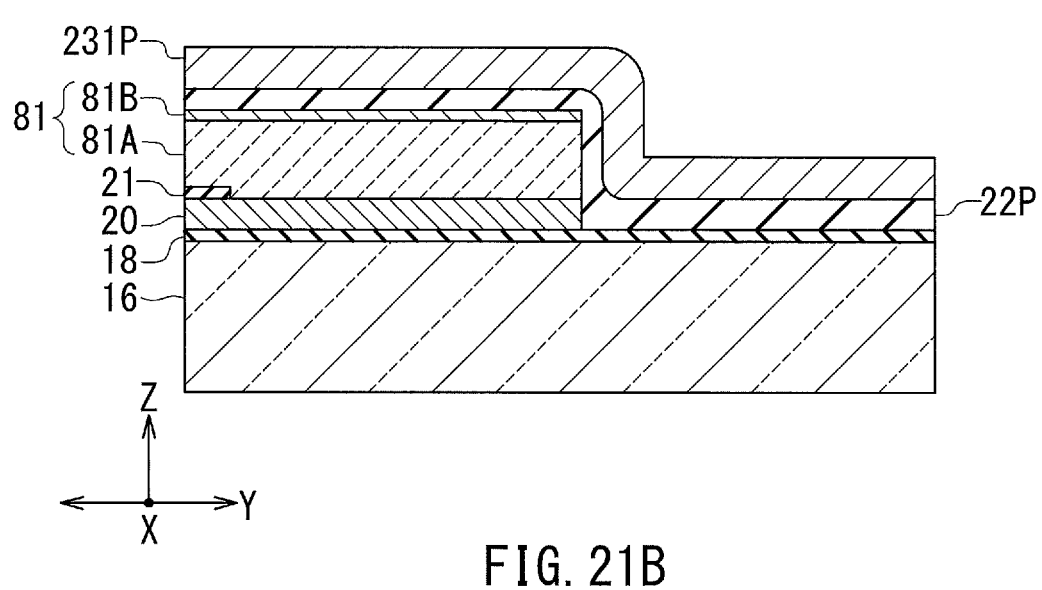

The manufacturing method for the thermally-assisted magnetic recording head according to the present embodiment is the same as the method according to the first embodiment up to the step of forming the plasmon generator 20 (see FIG. 9A to FIG. 9C). FIG. 21A and FIG. 21B show the next step. In this step, first, the initial gap film 22P is formed in the same manner as in the step of FIG. 10A to FIG. 10C in the first embodiment. Then, an initial first layer 231P is formed over the entire top surface of the stack.

Figure 22A:
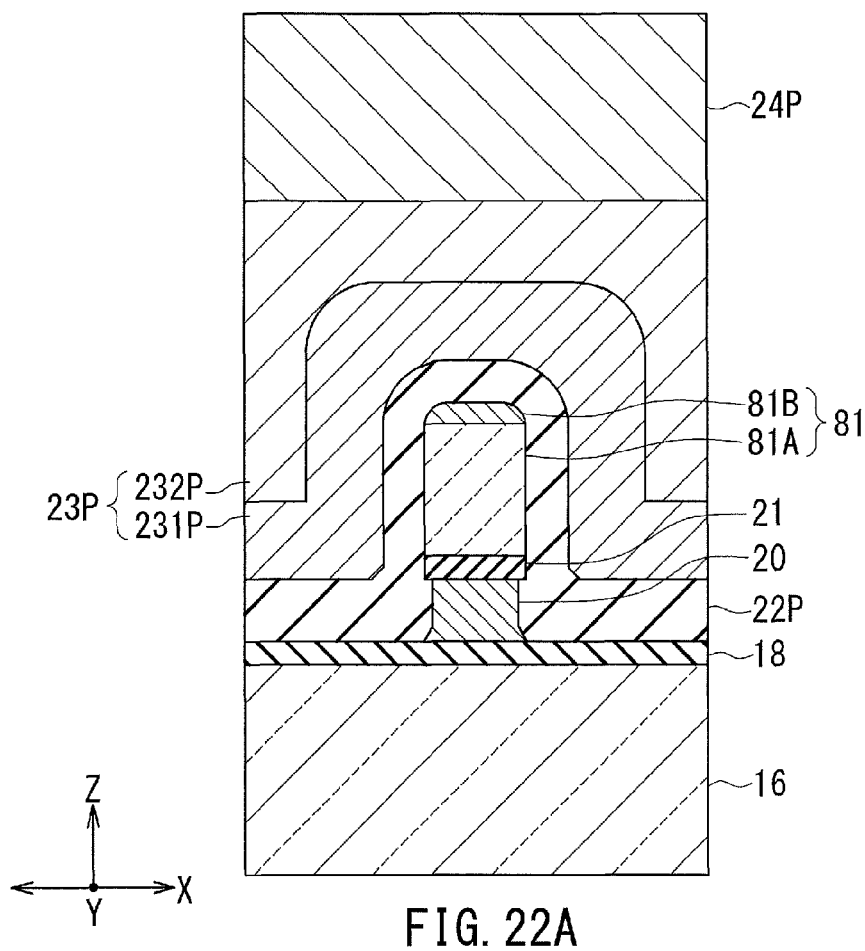
FIG. 22A and FIG. 22B are cross-sectional views showing a step that follows the step shown in FIG. 21A and FIG. 21B.
Figure 22B:
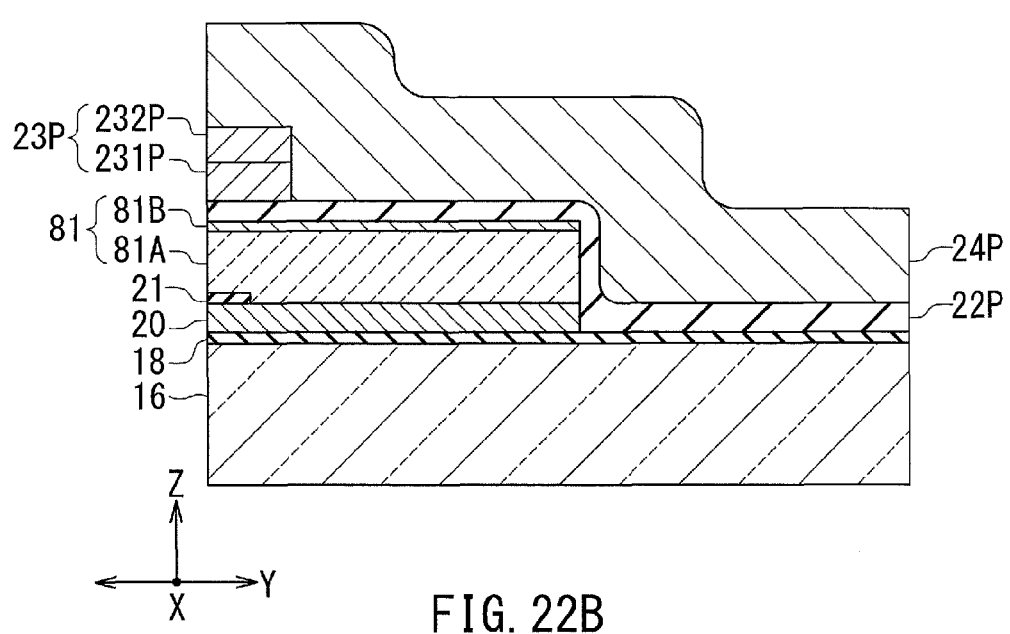

FIG. 22A and FIG. 22B show the next step. In this step, first, an initial second layer 232P is formed on the initial first layer 231P. The initial second layer 232P is formed to cover a portion of the initial first layer 231P located at and around the location ABS at which the medium facing surface 80 is to be formed. The initial surrounding layer 23P of the present embodiment is constituted by the initial first layer 231P and the initial second layer 232P. Then, a portion of the initial first layer 231P that is not covered with the initial second layer 232P is removed by, for example, IBE or reactive ion etching (hereinafter referred to as RIE), using the initial second layer 232P as an etching mask. The first initial heat sink 24P is then formed over the initial gap film 22P and the initial second layer 232P.

Figure 23A:
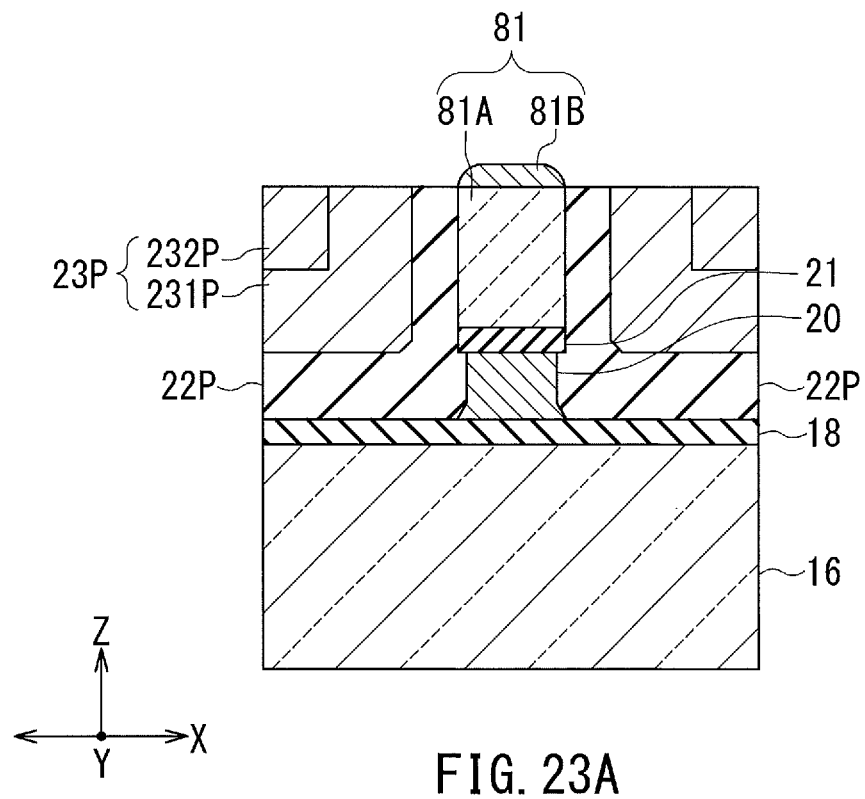
FIG. 23A and FIG. 23B are cross-sectional views showing a step that follows the step shown in FIG. 22A and FIG. 22B.
Figure 23B:
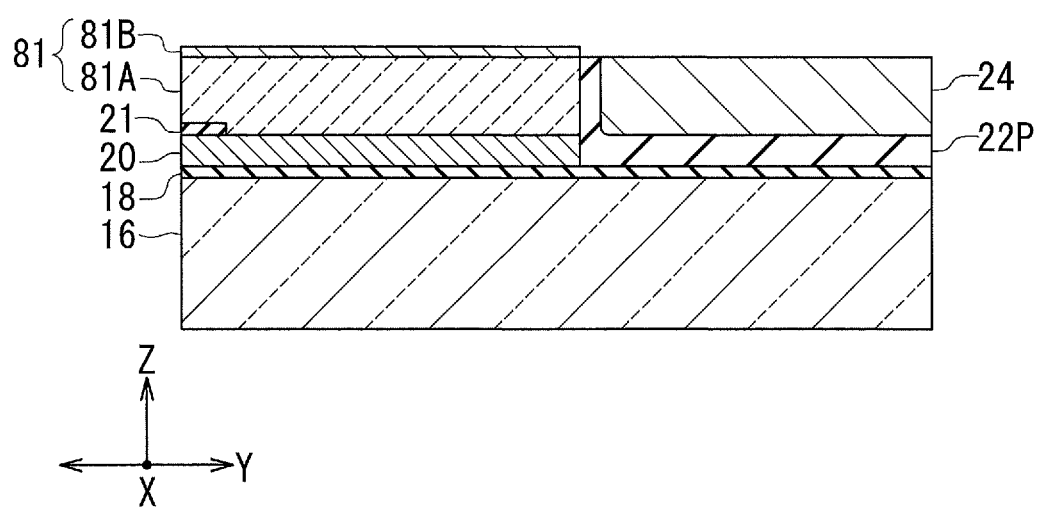

FIG. 23A and FIG. 23B show the next step. In this step, the initial gap film 22P, the initial surrounding layer 23P (the initial first layer 231P and the initial second layer 232P) and the first initial heat sink 24P are polished by, for example, CMP, until the etching mask 81 is exposed. This makes the first initial heat sink 24P into the first heat sink 24. The subsequent steps are the same as those of the first embodiment.

The remainder of configuration, function and effects of the present embodiment are similar to those of the first embodiment.

Third Embodiment

Figure 24:
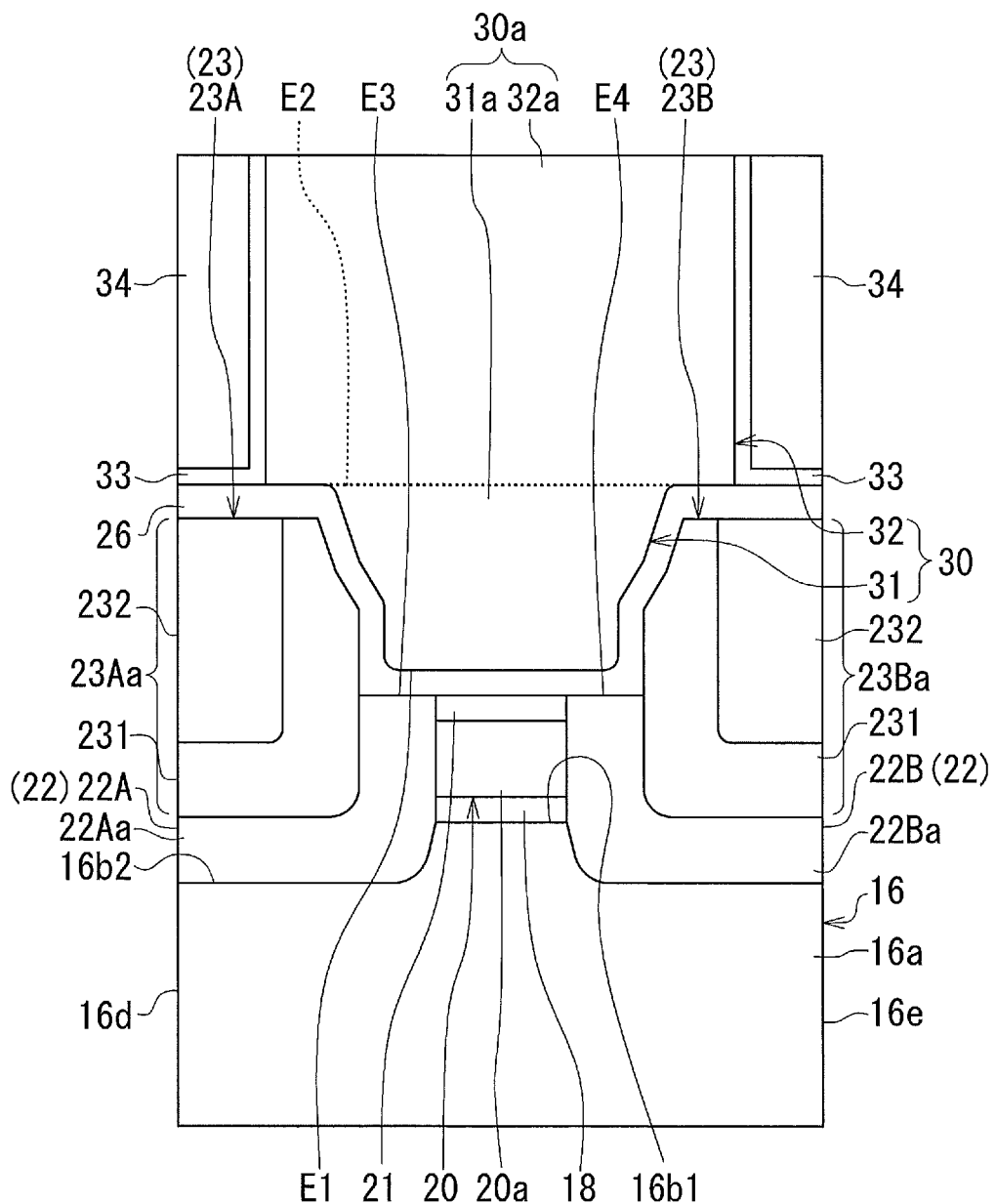
FIG. 24 is a front view showing the main part of a thermally-assisted magnetic recording head according to a third embodiment of the invention.

A thermally-assisted magnetic recording head according to a third embodiment of the invention will now be described with reference to FIG. 24. FIG. 24 is a front view showing the main part of the thermally-assisted magnetic recording head according to the present embodiment.

The thermally-assisted magnetic recording head according to the present embodiment is configured differently than in the second embodiment in the following ways. In the present embodiment, the top surface of the core 16 includes an evanescent light generating surface 16b1 located below the plasmon generator 20, and a surrounding portion 16b2 located around the evanescent light generating surface 16b1. The evanescent light generating surface 16b1 protrudes forward in the direction of travel of the recording medium 90 (the Z direction) relative to the surrounding portion 16b2. The planar shape of the evanescent light generating surface 16b1 approximates the planar shape of the plasmon generator 20.

In the present embodiment, the cladding layer 18 is located only between the plasmon generator 20 and the evanescent light generating surface 16b1. The gap film 22 lies over the surrounding portion 16b2 and the top surface of the cladding layer 17.

In the present embodiment, the first surrounding layer end face 23Aa and the second surrounding layer end face 23Ba of the surrounding layer 23 are located on opposite sides of the near-field light generating surface 20a and at least part of the first end face portion 31a in the track width direction (the X direction) so that the near-field light generating surface 20a and the at least part of the first end face portion 31a are interposed between the first and second surrounding layer end faces 23Aa and 23Ba. Thus, in the present embodiment, the first and second surrounding layer end faces 23Aa and 23Ba of the surrounding layer 23 formed of a nonmagnetic metal material are present on opposite sides of the near-field light generating surface 20a in the track width direction with the gap film 22 interposed between the near-field light generating surface 20a and the first and second surrounding layer end faces 23Aa and 23Ba. The first and second surrounding layer end faces 23Aa and 23Ba have the function of suppressing the spread of the near-field light generated from the near-field light generating surface 20a. The present embodiment thus makes it possible to enhance the efficiency of generation of near-field light and to reduce the light spot size.

Figure 25:
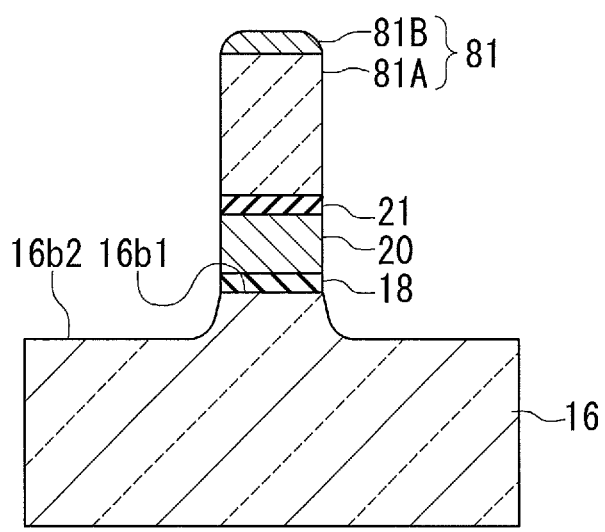
FIG. 25 is a cross-sectional view showing a step of a manufacturing method for the thermally-assisted magnetic recording head according to the third embodiment of the invention.
Figure 25:
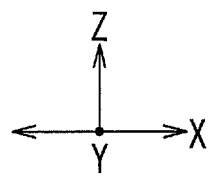

A manufacturing method for the thermally-assisted magnetic recording head according to the present embodiment will now be described with reference to FIG. 25. FIG. 25 illustrates a stack of layers formed in the process of manufacturing the thermally-assisted magnetic recording head. FIG. 25 shows a cross section of the stack taken at the location at which the medium facing surface 80 is to be formed. FIG. 25 omits the illustration of portions located below the core 16 and the cladding layer 17.

The manufacturing method for the thermally-assisted magnetic recording head according to the present embodiment is the same as the method according to the second embodiment (the first embodiment) up to the step of forming the etching mask 81 (see FIG. 9A to FIG. 9C). FIG. 25 shows the next step. In this step, the initial plasmon generator and the insulating film 21 are etched by, for example, IBE, using the etching mask 81. This makes the initial plasmon generator into the plasmon generator 20. Subsequently, the core 16 and the cladding layer 18 are etched using the plasmon generator 20 as an etching mask. This etching removes a portion of the cladding layer 18 that is not covered with the plasmon generator 20. Further, this etching etches a portion of the top surface of the core 16 unetched, the portion being not covered with the plasmon generator 20. The evanescent light generating surface 16b1 and the surrounding portion 16b2 are thereby formed in the top surface of the core 16. The subsequent steps are the same as those of the second embodiment.

The remainder of configuration, function and effects of the present embodiment are similar to those of the second embodiment.

Fourth Embodiment

Figure 26:
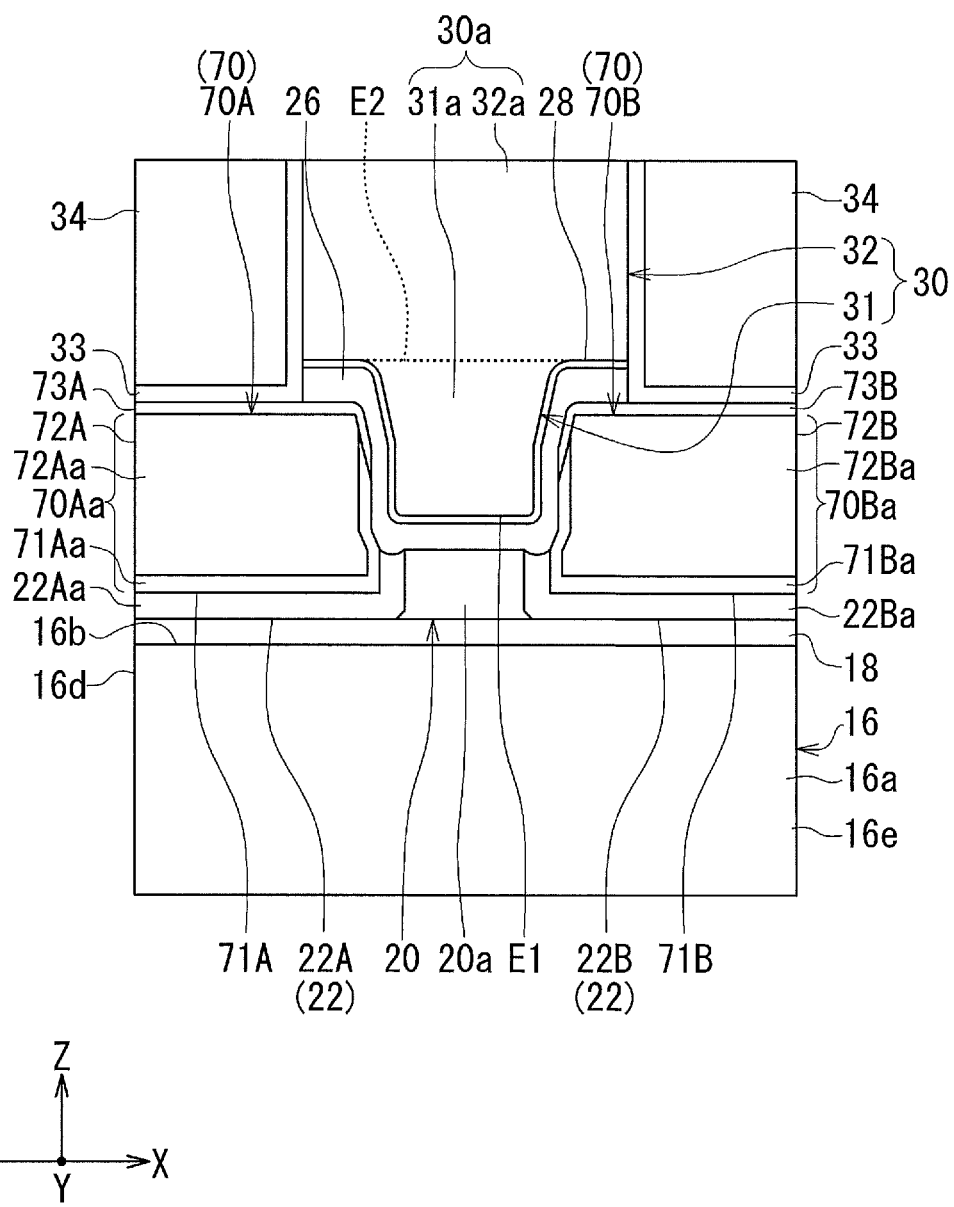
FIG. 26 is a front view showing the main part of a thermally-assisted magnetic recording head according to a fourth embodiment of the invention.
Figure 27:
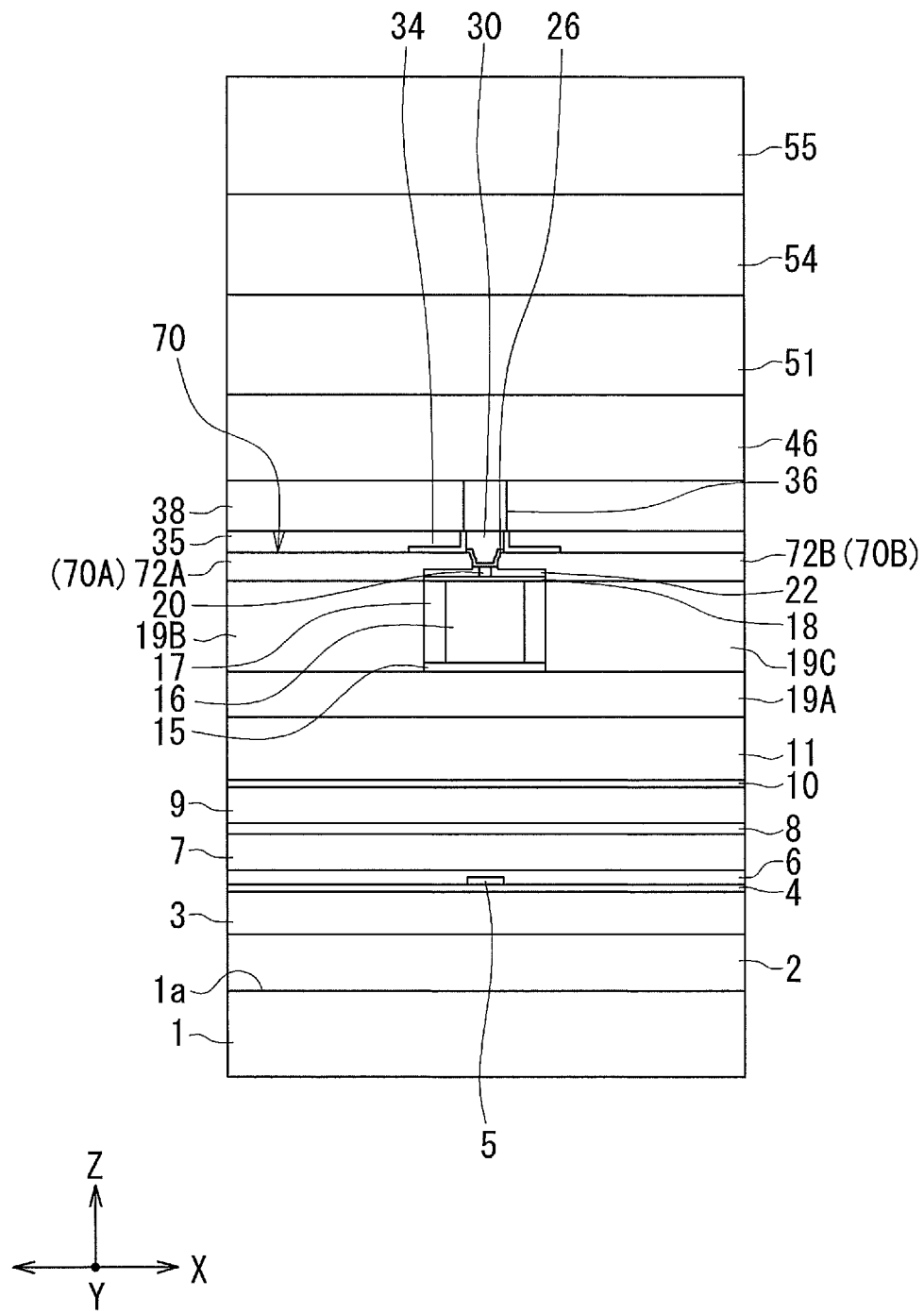
FIG. 27 is a front view showing the medium facing surface of the thermally-assisted magnetic recording head according to the fourth embodiment of the invention.

A thermally-assisted magnetic recording head according to a fourth embodiment of the invention will now be described with reference to FIG. 26 and FIG. 27. FIG. 26 is a front view showing the main part of the thermally-assisted magnetic recording head according to the present embodiment. FIG. 27 is a front view showing the medium facing surface of the thermally-assisted magnetic recording head according to the present embodiment.

The thermally-assisted magnetic recording head according to the present embodiment is configured differently than in the first embodiment in the following ways. The thermally-assisted magnetic recording head according to the present embodiment includes a surrounding layer 70 in place of the surrounding layer 23 of the first embodiment. The shape and location of the surrounding layer 70 are the same as those of the surrounding layer 23. More specifically, the surrounding layer 70 includes a first side portion 70A and a second side portion 70B. The first side portion 70A lies on the first portion 22A of the gap film 22. The second side portion 70B lies on the second portion 22B of the gap film 22. The first side portion 70A has a first surrounding layer end face 70Aa located in the medium facing surface 80. The second side portion 70B has a second surrounding layer end face 70Ba located in the medium facing surface 80. Since the first and second side portions 70A and 70B are portions of the surrounding layer 70, the surrounding layer 70 can be said to have the first and second surrounding layer end faces 70Aa and 70Ba.

The first surrounding layer end face 70Aa and the second surrounding layer end face 70Ba are located on opposite sides of at least part of the first end face portion 31a of the front end face 30a of the main pole 30 in the track width direction (the X direction) so that the at least part of the first end face portion 31a is interposed between the first and second surrounding layer end faces 70Aa and 70Ba. Each of the first and second gap film end faces 22Aa and 22Ba of the gap film 22 includes a portion located between the first and second surrounding layer end faces 70Aa and 70Ba, but does not include any portion interposed between the first surrounding layer end face 70Aa and the first end face portion 31a or between the second surrounding layer end face 70Ba and the first end face portion 31a.

The surrounding layer 70 includes a first side shield 72A and a second side shield 72B each formed of a magnetic material. The first side shield 72A is the principal part of the first side portion 70A. The second side shield 72B is the principal part of the second side portion 70B. The first side shield 72A has a first side shield end face 72Aa constituting at least part of the first surrounding layer end face 70Aa. The second side shield 72B has a second side shield end face 72Ba constituting at least part of the second surrounding layer end face 70Ba.

In the present embodiment, the surrounding layer 70 further includes a first nonmagnetic film 71A and a second nonmagnetic film 71B each formed of a nonmagnetic material. FIG. 27 omits the illustration of the first and second nonmagnetic films 71A and 71B. The first side portion 70A is constituted by the first side shield 72A and the first nonmagnetic film 71A. The second side portion 70B is constituted by the second side shield 72B and the second nonmagnetic film 71B. The first nonmagnetic film 71A has a first nonmagnetic film end face 71Aa located in the medium facing surface 80. The second nonmagnetic film 71B has a second nonmagnetic film end face 71Ba located in the medium facing surface 80. The first surrounding layer end face 70Aa is constituted by the first side shield end face 72Aa and the first nonmagnetic film end face 71Aa. The second surrounding layer end face 70Ba is constituted by the second side shield end face 72Ba and the second nonmagnetic film end face 71Ba. An example of a nonmagnetic material that can be used to form the first and second nonmagnetic films 71A and 71B is Ru or Rh.

The shield 12 of the first embodiment is not provided in the present embodiment. Instead, the return path section R of the present embodiment includes a coupling layer 19A and two coupling sections 19B and 19C. The shape and location of the coupling layer 19A are the same as those of the shield 12. As shown in FIG. 27, the two coupling sections 19B and 19c are embedded in the cladding layers 15 and 17. The coupling section 19B and the coupling section 19C are located on opposite sides of the core 16 in the track width direction (the X direction) and spaced from the core 16. Each of the two coupling sections 19B and 19C has an end face located in the medium facing surface 80, a top surface, and a bottom surface. The bottom surface of each of the two coupling sections 19B and 19C is in contact with the coupling layer 19A.

The first nonmagnetic film 71A lies on the first portion 22A of the gap film 22. The first portion 22A and the first nonmagnetic film 71A have their respective openings for exposing the top surface of the coupling section 19B. The first side shield 72A lies on the first nonmagnetic film 71A and contacts the top surface of the coupling section 19B through the openings of the first portion 22A and the first nonmagnetic film 71A.

The second nonmagnetic film 71B lies on the second portion 22B of the gap film 22. The second portion 22B and the second nonmagnetic film 71B have their respective openings for exposing the top surface of the coupling section 19C. The second side shield 72B lies on the second nonmagnetic film 71B and contacts the top surface of the coupling section 19C through the openings of the second portion 22B and the second nonmagnetic film 71B.

The return path section R of the present embodiment connects the main pole 30 to the first and second side shields 72A and 72B. The first and second side shields 72A and 72B have the same functions as those of the shield 12 described in the first embodiment section. In the present embodiment, in particular, the first and second side shields 72A and 72B are able to capture a magnetic flux that is produced from the first end face portion 31a of the front end face 30a of the main pole 30, and to thereby prevent such a magnetic flux from reaching the recording medium 90. As a result, it becomes possible to sharpen the distribution of strength of the write magnetic field in the track width direction. This in turn makes it possible to reduce the track width and thereby increase the track density. Further, the sharpened distribution of strength of the write magnetic field in the track width direction allows for the formation of a magnetization transition region into a shape approximating a rectilinear shape, rather than a curved shape, on the recording medium 90. It is thereby possible to achieve higher linear recording density.

If the distance between the first end face portion 31a and the first side shield end face 72Aa and the distance between the first end face portion 31a and the second side shield end face 72Ba are excessively small, there arises the problem that the write magnetic field produced from the first end face portion 31a is small in magnitude. According to the present embodiment, it is possible to adjust the aforementioned distances by the width of the portion of each of the first and second gap film end faces 22Aa and 22Ba located between the first surrounding layer end face 23Aa and the second surrounding layer end face 23Ba. The present embodiment allows for the prevention of the aforementioned problem by appropriate sizing of the aforementioned distances.

In the present embodiment, the insulating film 21 of the first embodiment is not provided. Thus, the distance between the near-field light generating surface 20a of the plasmon generator 20 and the first end face portion 31a of the front end face 30a of the main pole 30 in the medium facing surface 80 is smaller than that in the first embodiment.

The thermally-assisted magnetic recording head according to the present embodiment further includes a third nonmagnetic film 73A and a fourth nonmagnetic film 73B each formed of a nonmagnetic material. The third nonmagnetic film 73A lies on the first side shield 72A and the first nonmagnetic film 71A to cover the first side shield 72A. The fourth nonmagnetic film 73B lies on the second side shield 72B and the second nonmagnetic film 71B to cover the second side shield 72B. FIG. 27 omits the illustration of the third and fourth nonmagnetic films 73A and 73B. The nonmagnetic material used to form the third and fourth nonmagnetic films 73A and 73B may be an insulating material or a nonmagnetic metal material. An example of an insulating material that can be used to form the third and fourth nonmagnetic films 73A and 73B is alumina or silicon oxide. An example of a nonmagnetic metal material that can be used to form the third and fourth nonmagnetic films 73A and 73B is Ru or Rh.

The thermally-assisted magnetic recording head further includes a nonmagnetic film 27 formed of a nonmagnetic material and interposed between the first heat sink 24 and each of the first and second side shields 72A and 72B. The nonmagnetic film 27 is shown in, for example, FIG. 29A and FIG. 29B to be described later. The nonmagnetic film 27 has the function of preventing the material of the first heat sink 24 from diffusing into the first and second side shields 72A and 72B. The nonmagnetic film 27 is formed of alumina or Ru, for example.

The thermally-assisted magnetic recording head further includes a nonmagnetic metal film 28 formed of a nonmagnetic metal material and interposed between the main pole 30 and each of the plasmon generator 20, the separating film 26 and the second heat sink 25. FIG. 27 omits the illustration of the nonmagnetic metal film 28. The nonmagnetic metal film 28 has the function of preventing the materials of the plasmon generator 20 and the second heat sink 25 from diffusing into the main pole 30. The nonmagnetic metal film 28 is formed of Ru, Cr, Zr, Ti or Ta, for example.

In the present embodiment, the separating film 26 is formed of an insulating material. At least a portion of the separating film 26 is interposed between the main pole 30 and the plasmon generator 20, between the main pole 30 and the surrounding layer 70, and between the main pole 30 and the gap film 22. In the present embodiment, the separating film 26 is not interposed between the main pole 30 and the second heat sink 25 or between the nonmagnetic metal film 33 and the surrounding layer 70.

A manufacturing method for the thermally-assisted magnetic recording head according to the present embodiment will now be described with reference to FIG. 28A to FIG. 37C. FIG. 28A to FIG. 37C each show a stack of layers formed in the process of manufacturing the thermally-assisted magnetic recording head. Fig. nA (n is an integer between 28 and 37 inclusive) shows a cross section of the stack taken at the location at which the medium facing surface 80 is to be formed. Fig. nB shows a cross section that intersects the front end face 30a of the main pole 30 and that is perpendicular to the medium facing surface 80 and to the top surface 1a of the substrate 1. Fig. nA and Fig. nB omit the illustration of portions located below the core 16 and the cladding layer 17. Fig. nC shows the top surface of part of the stack. In Fig. nC, the symbol "ABS" indicates the location at which the medium facing surface 80 is to be formed.

Figure 28A:
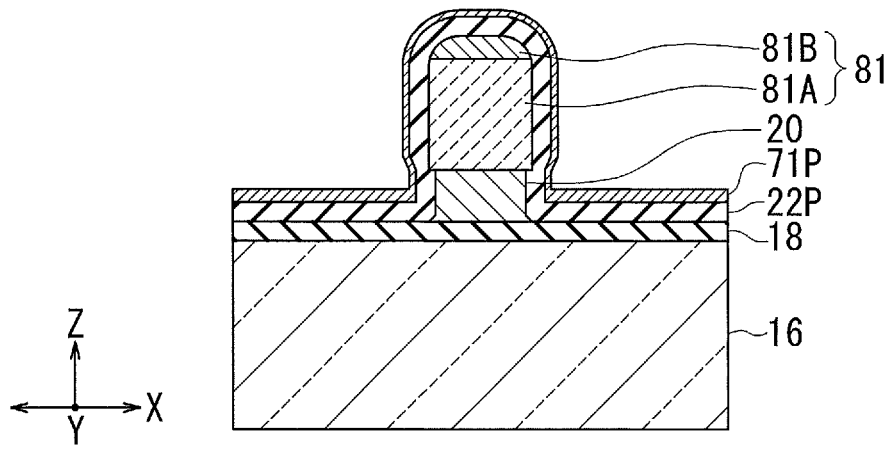
FIG. 28A to FIG. 28C are explanatory diagrams showing a step of a manufacturing method for the thermally-assisted magnetic recording head according to the fourth embodiment of the invention.
Figure 28B:
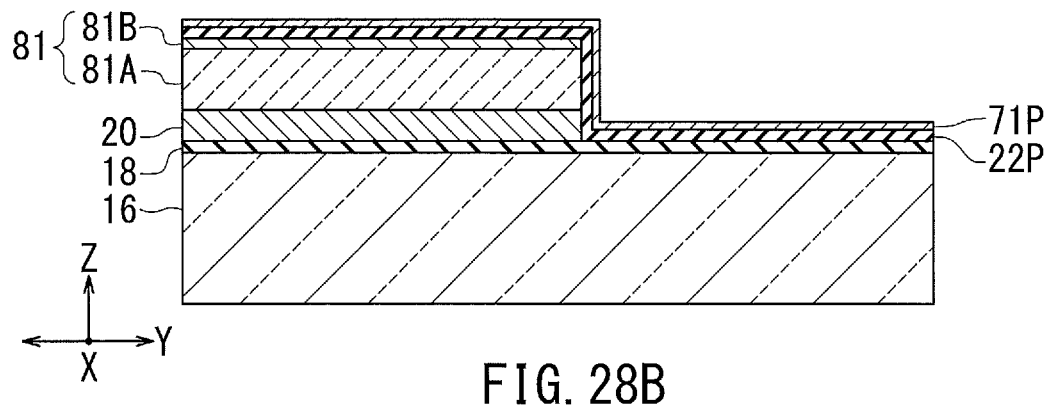
Figure 28C:
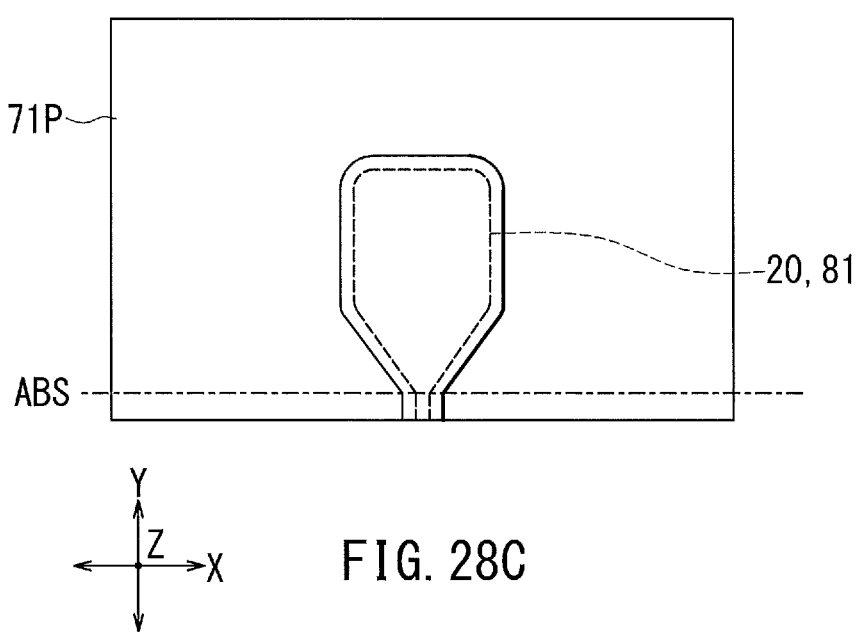

The manufacturing method for the thermally-assisted magnetic recording head according to the present embodiment is the same as the method according to the first embodiment up to the step of forming the plasmon generator 20 (see FIG. 9A to FIG. 9C). The present embodiment omits the formation of the insulating film 21 before forming the etching mask 81 and the plasmon generator 20. FIG. 28A to FIG. 28C show the next step. In this step, first, the initial gap film 22P is formed in the same manner as in the step of FIG. 10A to FIG. 10C in the first embodiment. Then, a nonmagnetic film 71P, which will later become the first and second nonmagnetic films 71A and 71B of the surrounding layer 70, is formed over the entire top surface of the stack.

Figure 29A:
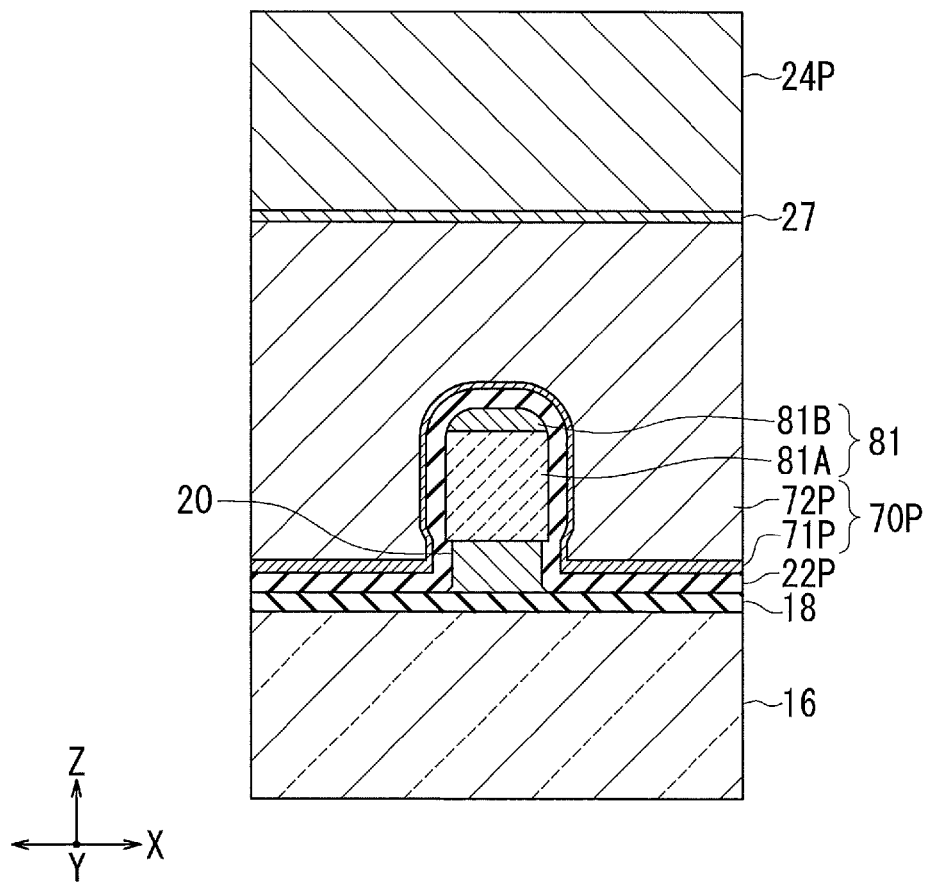
FIG. 29A to FIG. 29C are explanatory diagrams showing a step that follows the step shown in FIG. 28A to FIG. 28C.
Figure 29B:
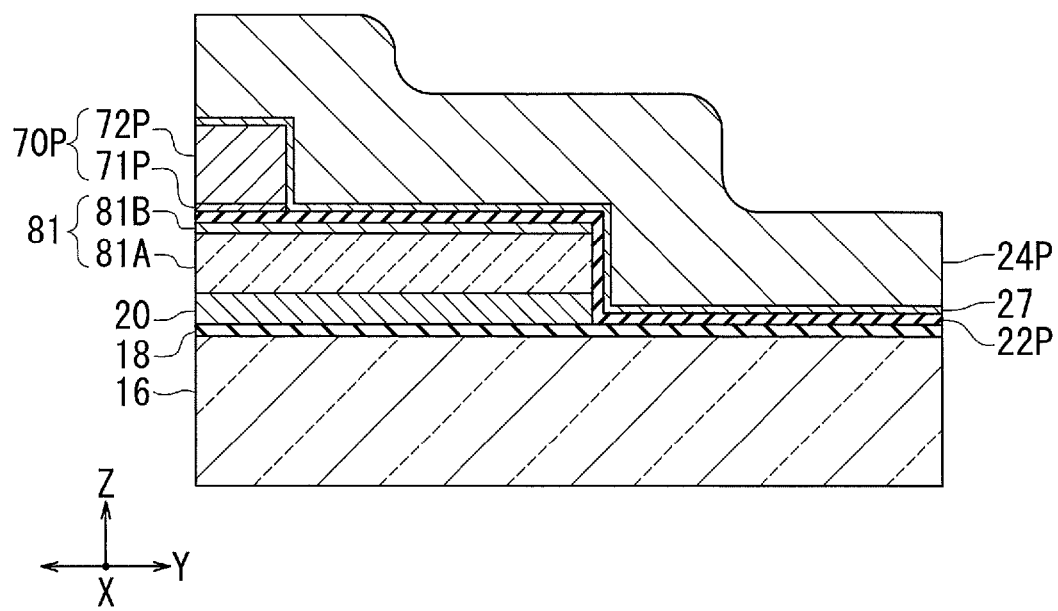
Figure 29C:
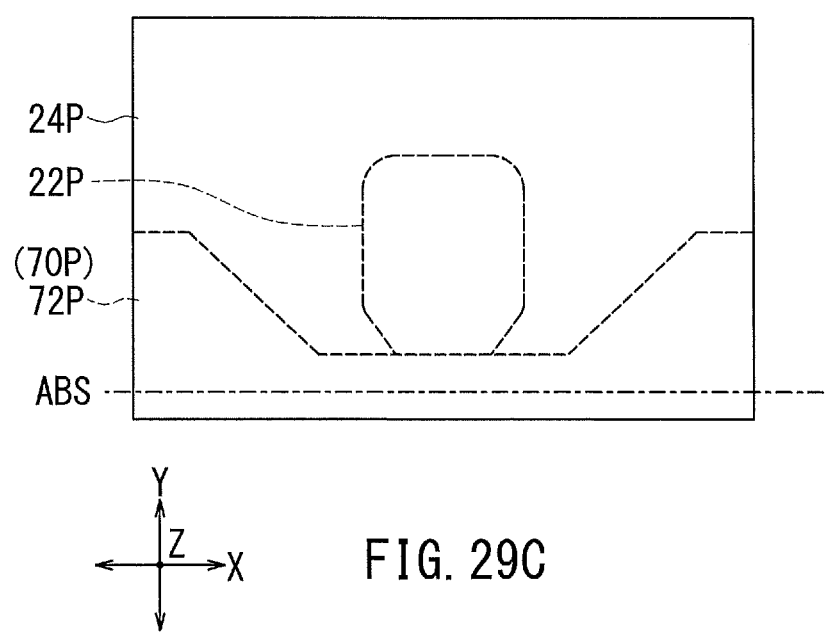

FIG. 29A to FIG. 29C show the next step. In this step, first, a magnetic layer 72P, which will later become the first and second side shields 72A and 72B of the surrounding layer 70, is formed on the nonmagnetic film 71P. The magnetic layer 72P is formed to cover at least a portion of the nonmagnetic film 71P located at and around the location ABS at which the medium facing surface 80 is to be formed. The nonmagnetic film 71P and the magnetic layer 72P constitute an initial surrounding layer 70P. Then, a portion of the nonmagnetic film 71P that is not covered with the magnetic layer 72P is removed by, for example, IBE, using the magnetic layer 72P as an etching mask. Next, the nonmagnetic film 27 is formed over the entire top surface of the stack. The first initial heat sink 24P is then formed on the nonmagnetic film 27.

Figure 30A:
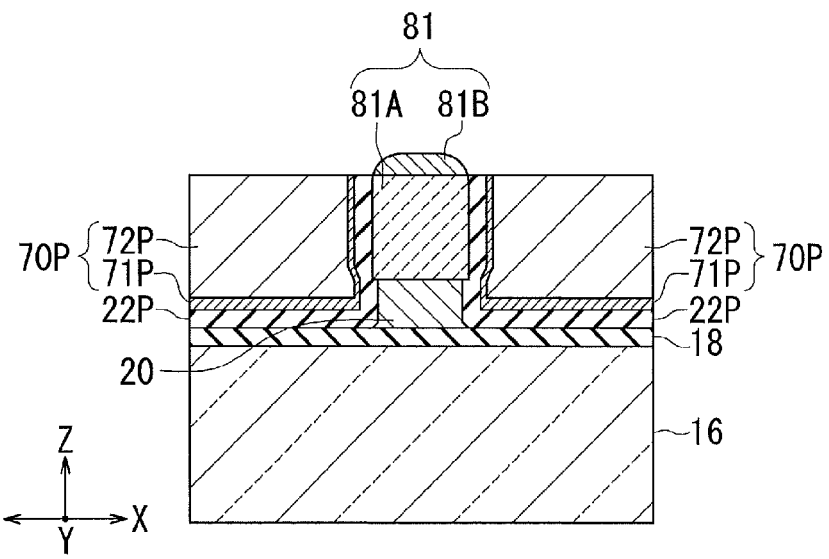
FIG. 30A to FIG. 30C are explanatory diagrams showing a step that follows the step shown in FIG. 29A to FIG. 29C.
Figure 30B:
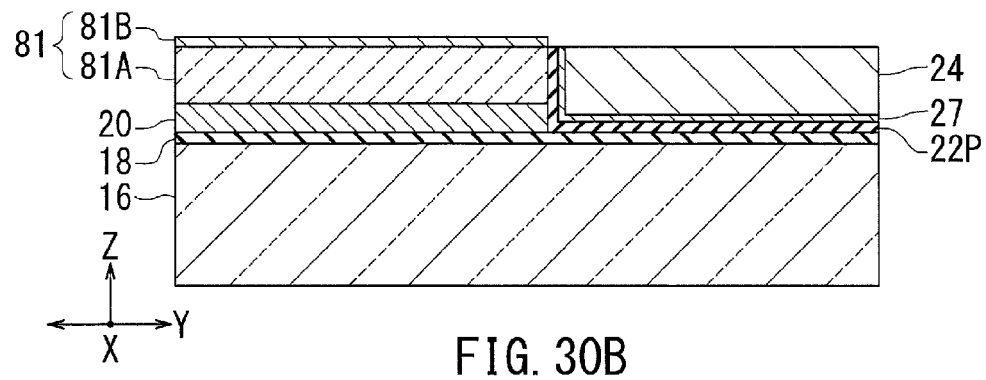
Figure 30C:
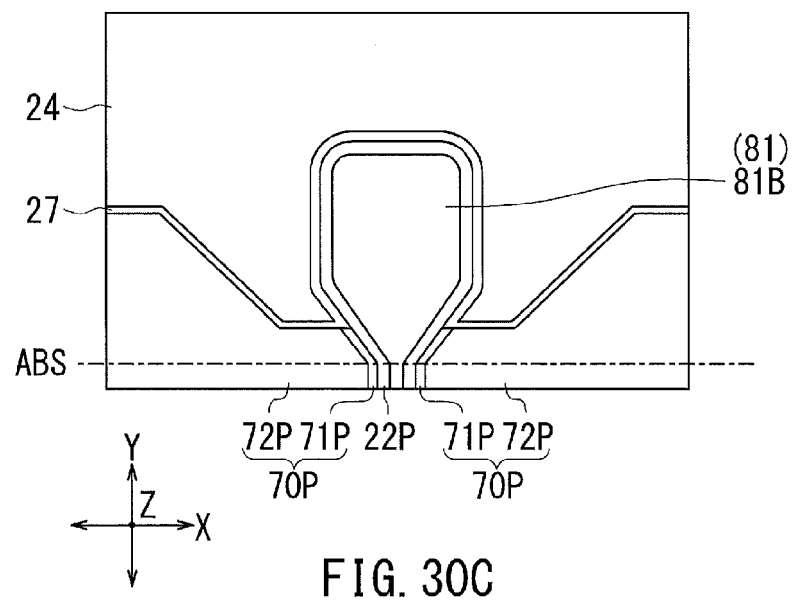

FIG. 30A to FIG. 30C show the next step. In this step, the initial gap film 22P, the nonmagnetic films 27 and 71P, the magnetic layer 72P and the first initial heat sink 24P are polished by, for example, CMP, until the etching mask 81 is exposed. This makes the first initial heat sink 24P into the first heat sink 24.

Figure 31A:
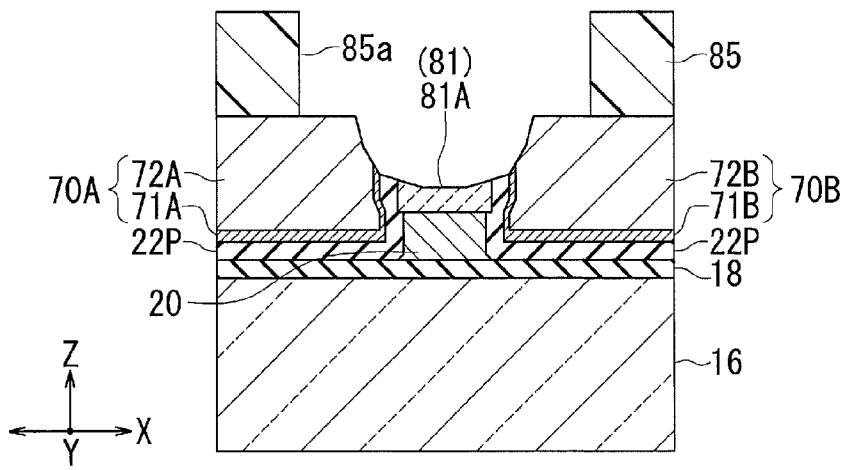
FIG. 31A to FIG. 31C are explanatory diagrams showing a step that follows the step shown in FIG. 30A to FIG. 30C.
Figure 31B:
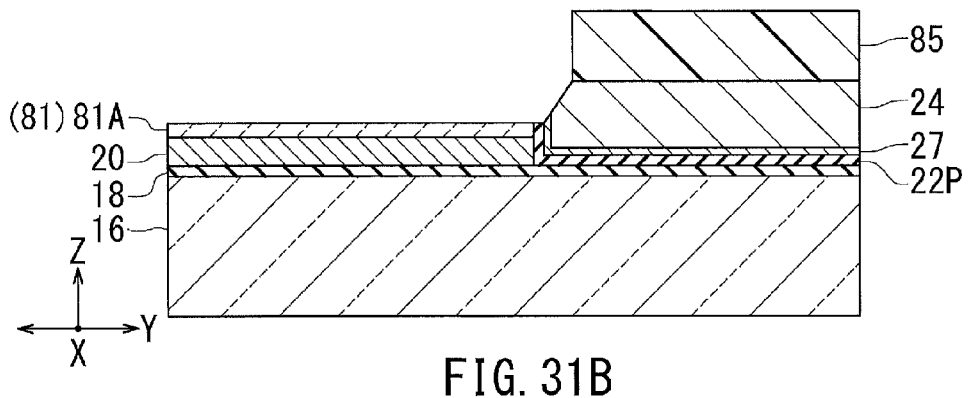
Figure 31C:
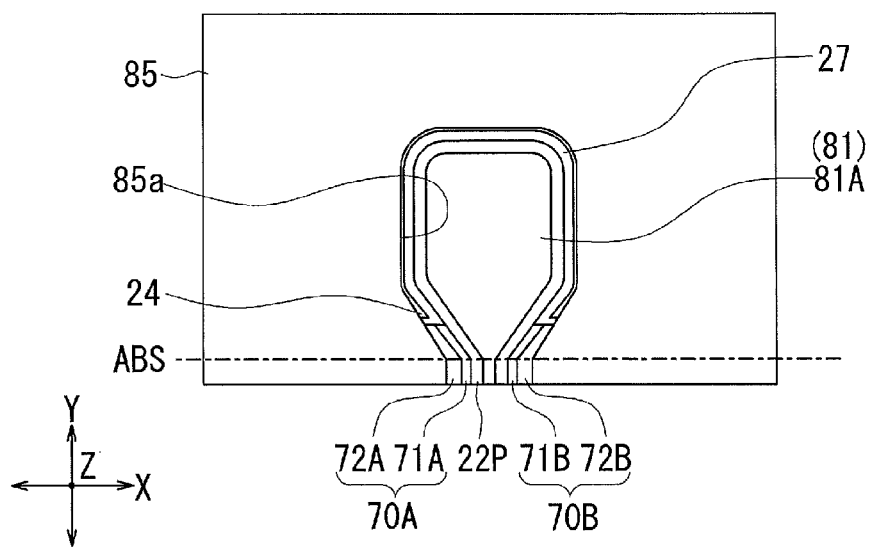

FIG. 31A to FIG. 31C show the next step. In this step, first, a photoresist mask 85 is formed on the initial surrounding layer 70P (the nonmagnetic film 71P and the magnetic layer 72P) and the first heat sink 24. The photoresist mask 85 is formed by patterning a photoresist layer by photolithography. Other photoresist masks to be used in later steps will be formed in the same manner as the photoresist mask 85. The photoresist mask 85 has an opening 85a shaped to correspond to the planar shape of the plasmon generator 20. The opening 85a is larger in planar shape than the plasmon generator 20.

Then, part of each of the initial gap film 22P, the initial surrounding layer 70P (the nonmagnetic film 71P and the magnetic layer 72P) and the first heat sink 24 and at least part of the etching mask 81 are etched by, for example, IBE, using the photoresist mask 85 as an etching mask. This makes the nonmagnetic film 71P into the first and second nonmagnetic films 71A and 71B, and makes the magnetic layer 72P into the first and second side shields 72A and 72B, thereby making the initial surrounding layer 70P into the surrounding layer 70. In the present embodiment, the etching mask 81 is etched in part so that the whole of the second mask layer 81B is removed whereas a portion of the first mask layer 81A remains on the plasmon generator 20, as in the first embodiment.

Figure 32A:
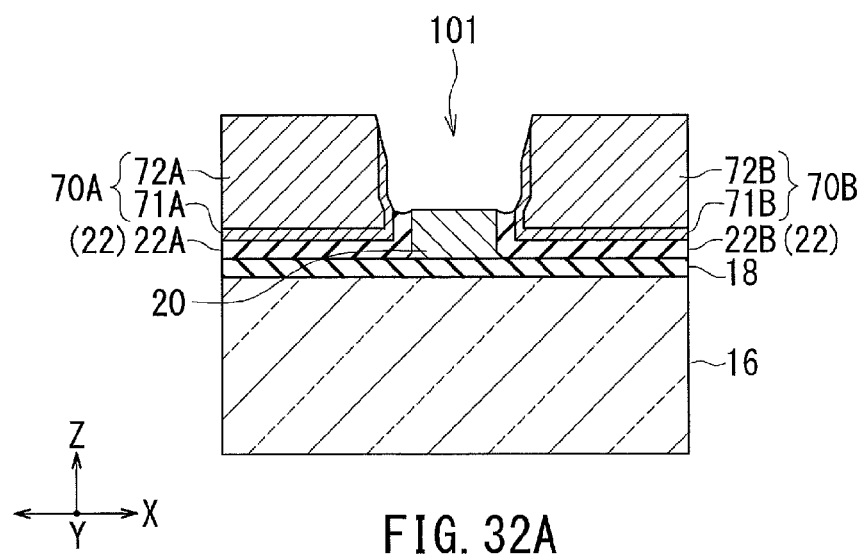
FIG. 32A to FIG. 32C are explanatory diagrams showing a step that follows the step shown in FIG. 31A to FIG. 31C.
Figure 32B:
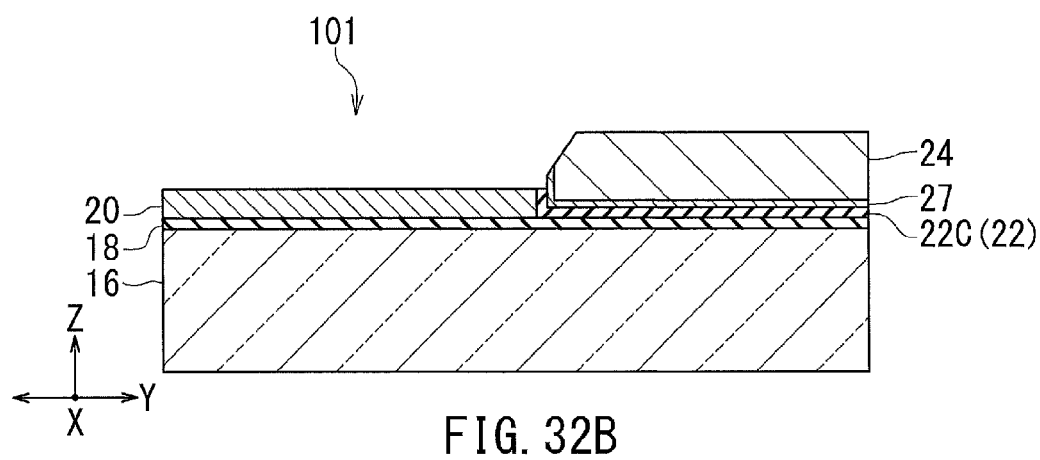
Figure 32C:
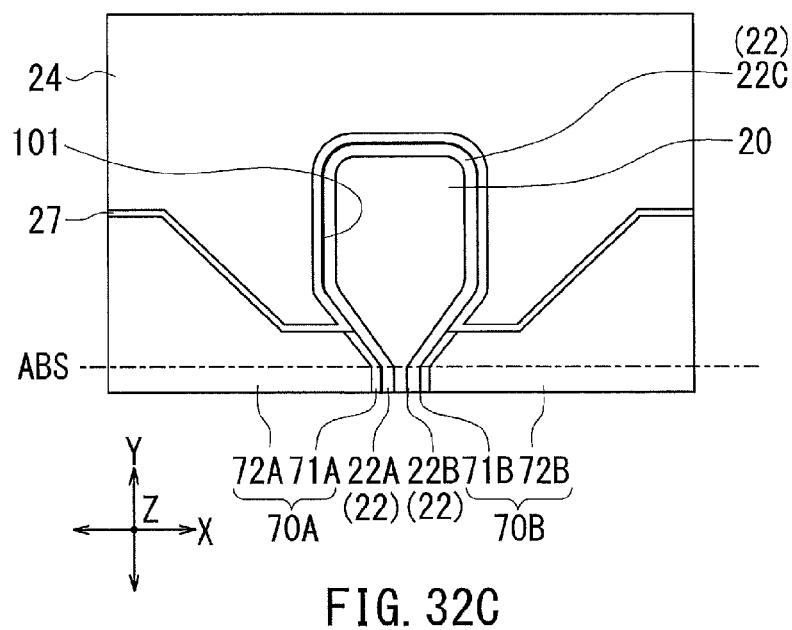

FIG. 32A to FIG. 32C show the next step. In this step, first, a portion of the initial gap film 22P is removed by etching, as in the step of FIG. 15A to FIG. 15C in the first embodiment. This makes the initial gap film 22P into the gap film 22. Then, a portion of the etching mask 81 that remains after the step of FIG. 31A to FIG. 31C, i.e., a portion of the first mask layer 81A, and the photoresist mask 85 are removed as in the step of FIG. 16A to FIG. 16C in the first embodiment.

A series of steps from the step shown in FIGS. 31A-31C to the step shown in FIGS. 32A-32C corresponds to the removal step of the present invention. As shown in FIG. 32A to FIG. 32C, the removal step results in the formation of a structure having a recess 101, the structure including the plasmon generator 20, the surrounding layer 70 and the gap film 22. The step of removing a portion of the initial gap film 22P and the step of removing the etching mask 81 in the foregoing series of steps may be performed in the reverse order to that described above.

Figure 33A:
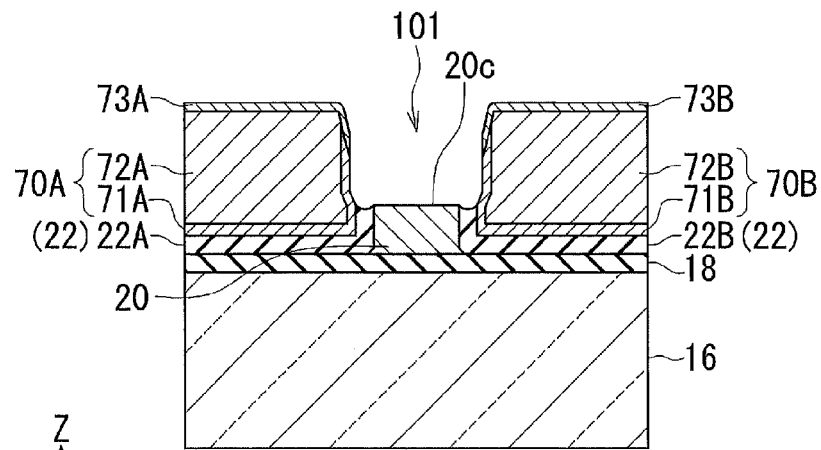
FIG. 33A to FIG. 33C are explanatory diagrams showing a step that follows the step shown in FIG. 32A to FIG. 32C.
Figure 33B:
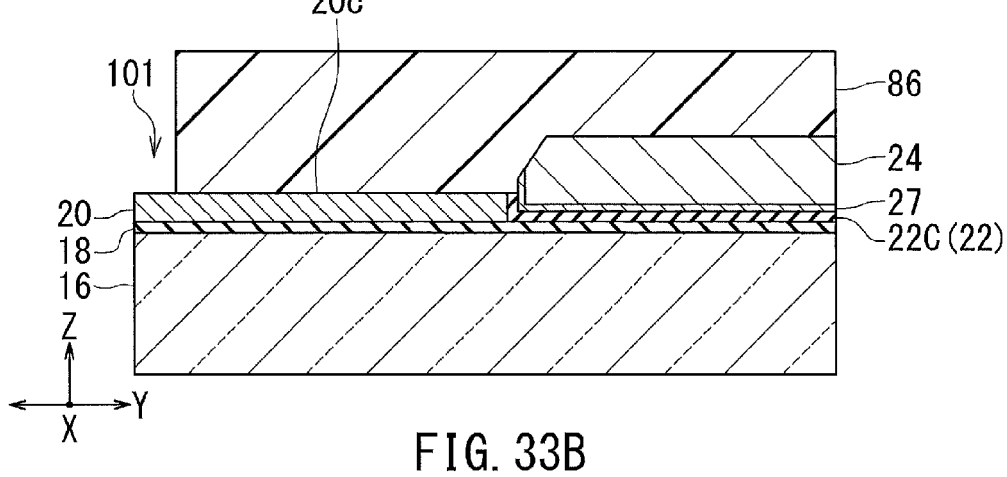
Figure 33C:
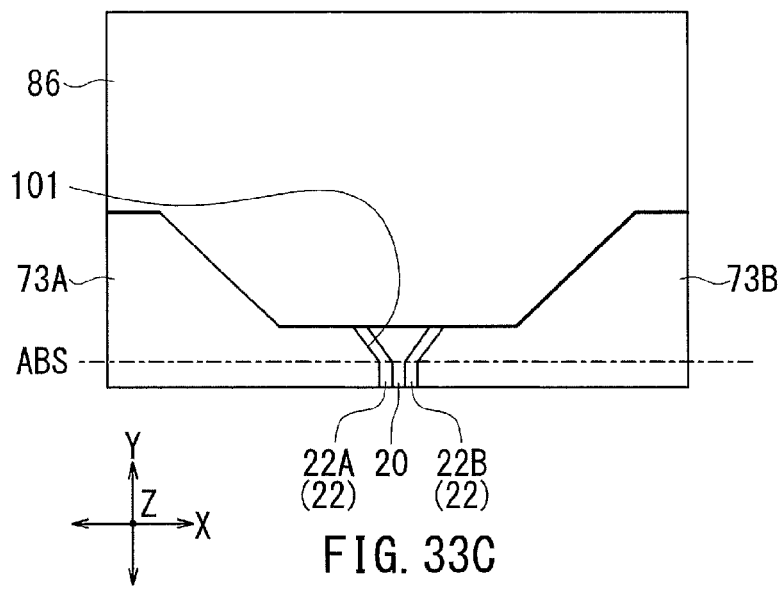

FIG. 33A to FIG. 33C show the next step. In this step, first, a photoresist mask 86 is formed on the stack. The photoresist mask 86 does not cover a portion of the recess 101 that is located at and around the location ABS at which the medium facing surface 80 is to be formed, and does not cover the first and second side shields 72A and 72B. Then, a nonmagnetic film is formed on the first and second side shields 72A and 72B by ion beam deposition, for example. A portion of the nonmagnetic film formed on the first side shield 72A will later become the third nonmagnetic film 73A, and a portion of the nonmagnetic film formed on the second side shield 72B will later become the fourth nonmagnetic film 73B.

Where ion beam deposition is employed to form the nonmagnetic film, the ion beams are allowed to travel in a direction at an angle with respect to the top surface 1a (see FIG. 27) of the substrate 1. This allows the nonmagnetic film to be selectively formed on the first and second side shields 72A and 72B, and not on the top surface 20c of the plasmon generator 20 located at the bottom of the recess 101.

Figure 34A:
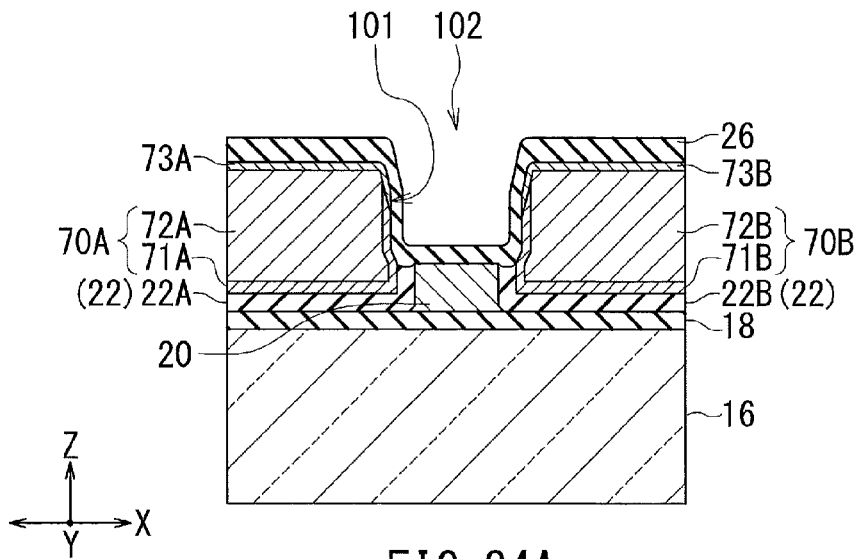
FIG. 34A to FIG. 34C are explanatory diagrams showing a step that follows the step shown in FIG. 33A to FIG. 33C.
Figure 34B:
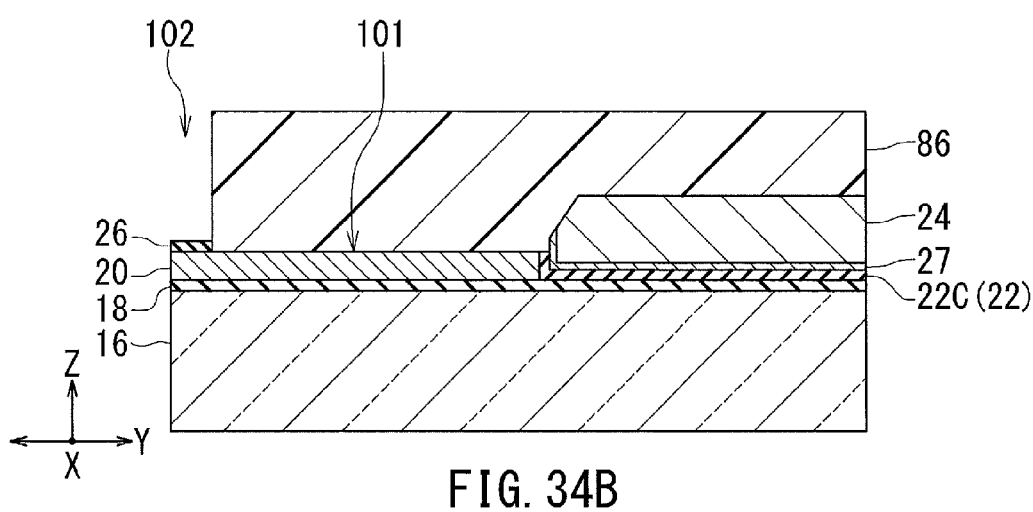
Figure 34C:
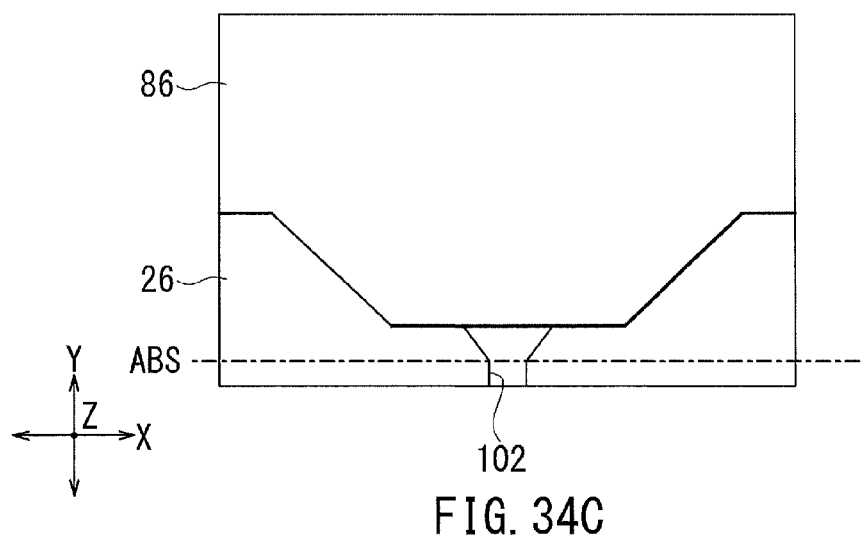

FIG. 34A to FIG. 34C show the next step. In this step, first, a nonmagnetic film is formed over the entire top surface of the stack by, for example, atomic layer deposition, in the presence of the photoresist mask 86. A portion of the nonmagnetic film formed on the aforementioned structure makes the separating film 26. The separating film 26 forms the receiving section 102 shaped to correspond to the recess 101. FIG. 34B and FIG. 34C omit the illustration of a portion of the nonmagnetic film formed on the photoresist mask 86. The photoresist mask 86 is then lifted off. The separating film 26 may be formed in the following manner. First, the photoresist mask 86 is lifted off. Then, a nonmagnetic film is formed over the entire top surface of the stack by atomic layer deposition, for example. The nonmagnetic film is then etched into the separating film 26 by IBE or RIE, for example.

Figure 35A:
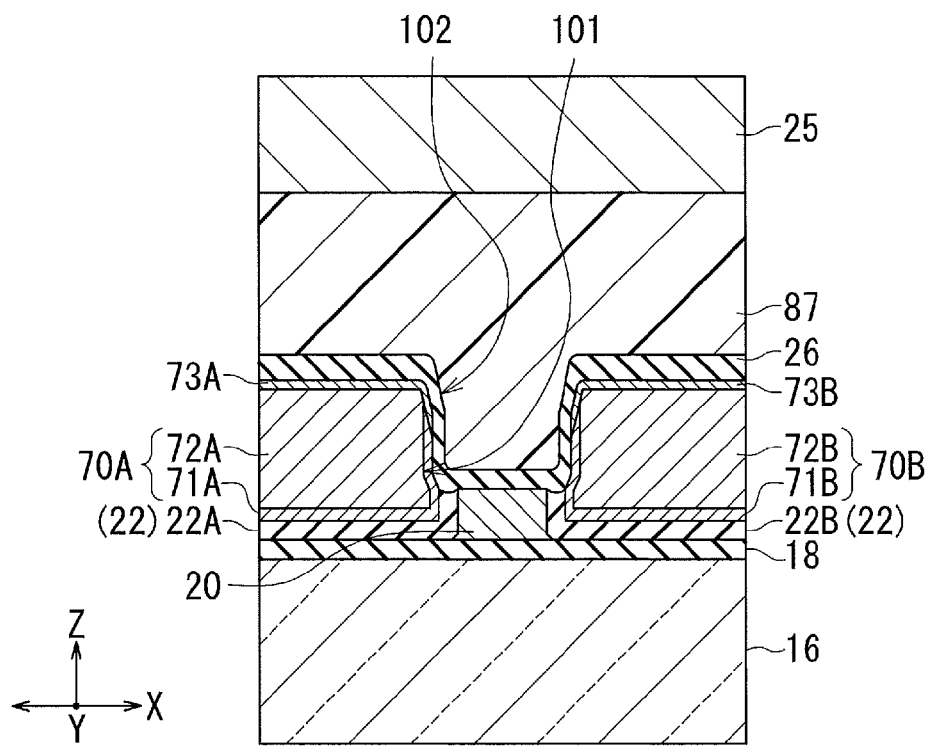
FIG. 35A to FIG. 35C are explanatory diagrams showing a step that follows the step shown in FIG. 34A to FIG. 34C.
Figure 35B:
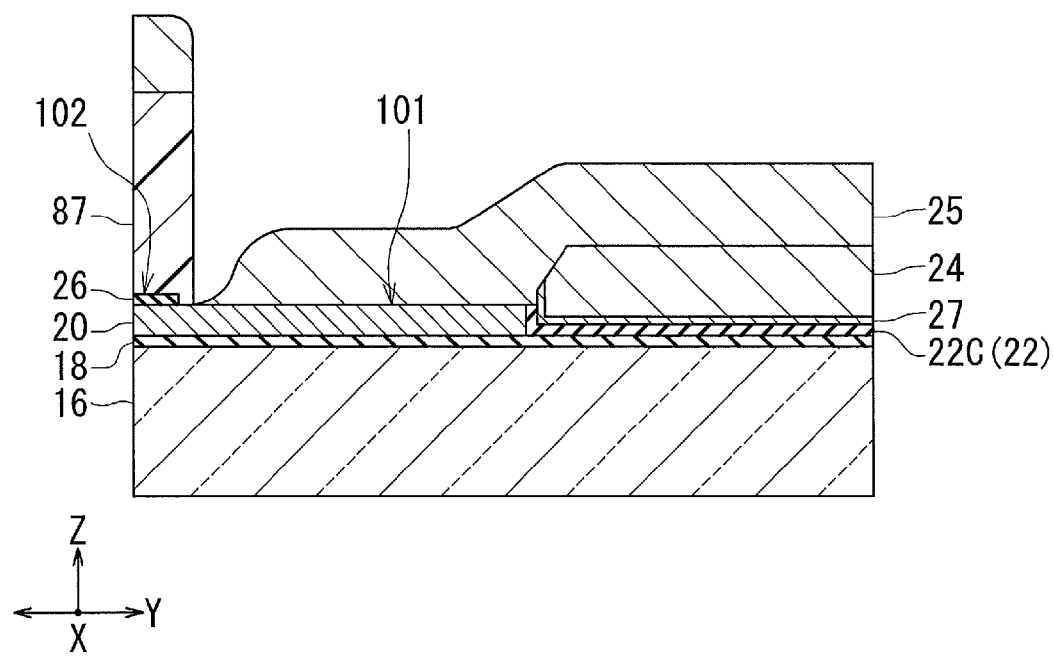
Figure 35C:
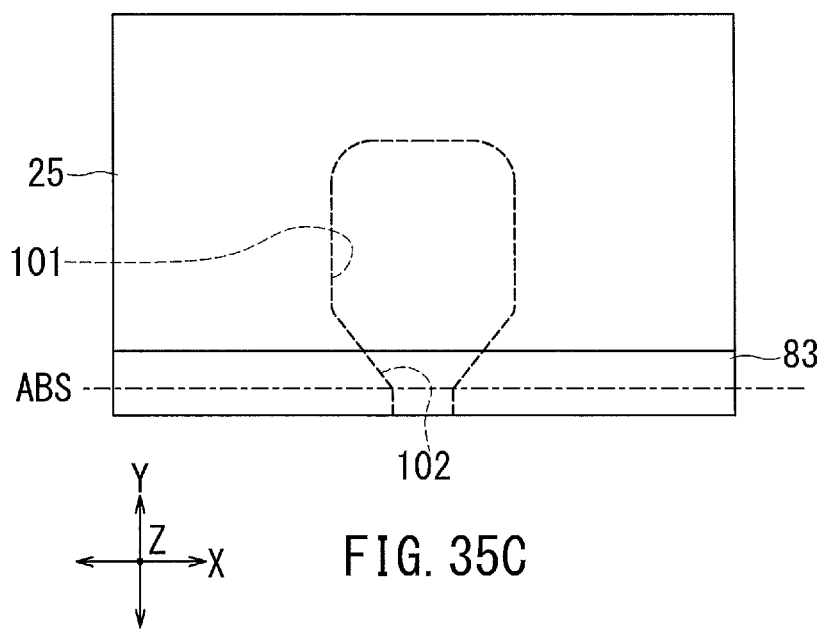

FIG. 35A to FIG. 35C show the next step. In this step, first, a photoresist mask 87 is formed on the stack. The photoresist mask 87 covers a portion of the receiving section 102 that is located at and around the location ABS at which the medium facing surface 80 is to be formed. Then, a metal film is formed over the entire top surface of the stack by ion beam deposition, for example. A portion of the metal film lying over the plasmon generator 20, the first heat sink 24 and the separating film 26 makes the second heat sink 25. FIG. 35C omits the illustration of a portion of the metal film located on the photoresist mask 87. The photoresist mask 87 is then lifted off.

Figure 36A:
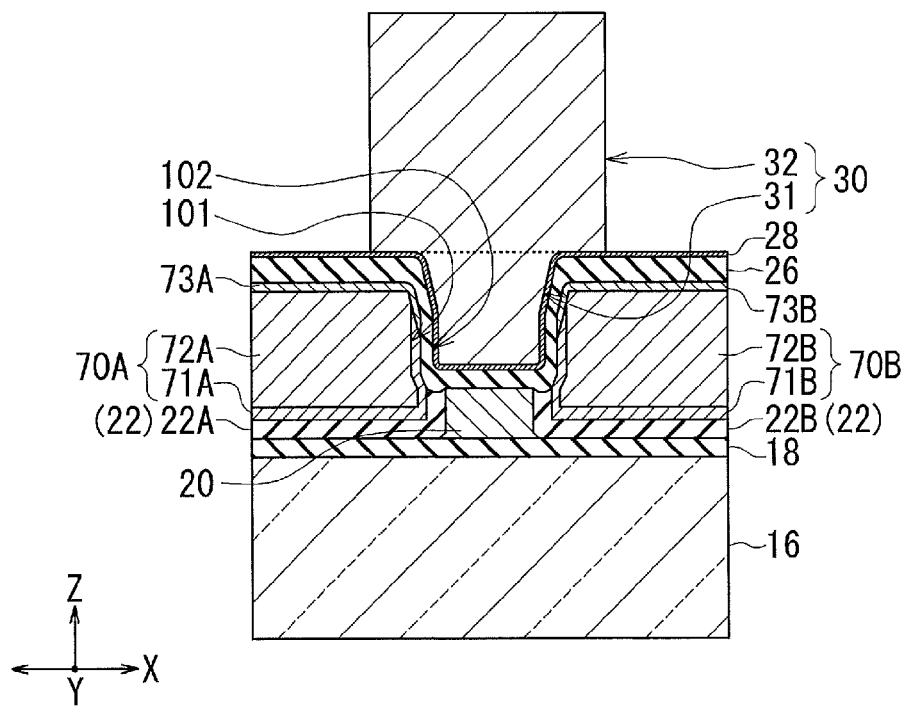
FIG. 36A to FIG. 36C are explanatory diagrams showing a step that follows the step shown in FIG. 35A to FIG. 35C.
Figure 36B:
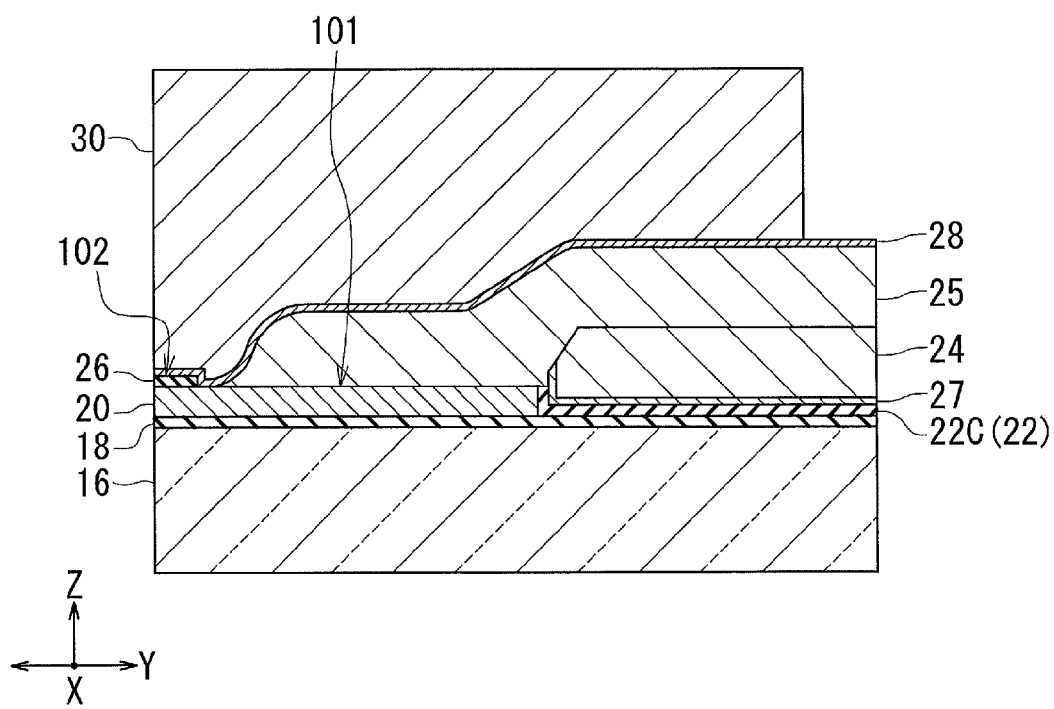
Figure 36C:
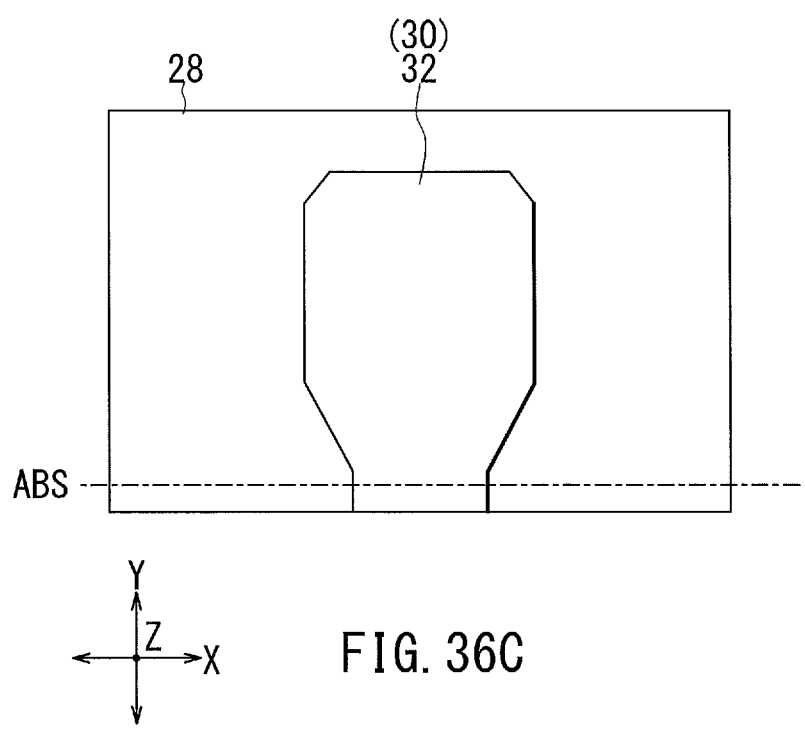

FIG. 36A to FIG. 36C show the next step. In this step, first, the nonmagnetic metal film 28 is formed over the entire top surface of the stack. The main pole 30 is then formed on the nonmagnetic metal film 28. The main pole 30 is formed in the same manner as in the first embodiment.

Figure 37A:
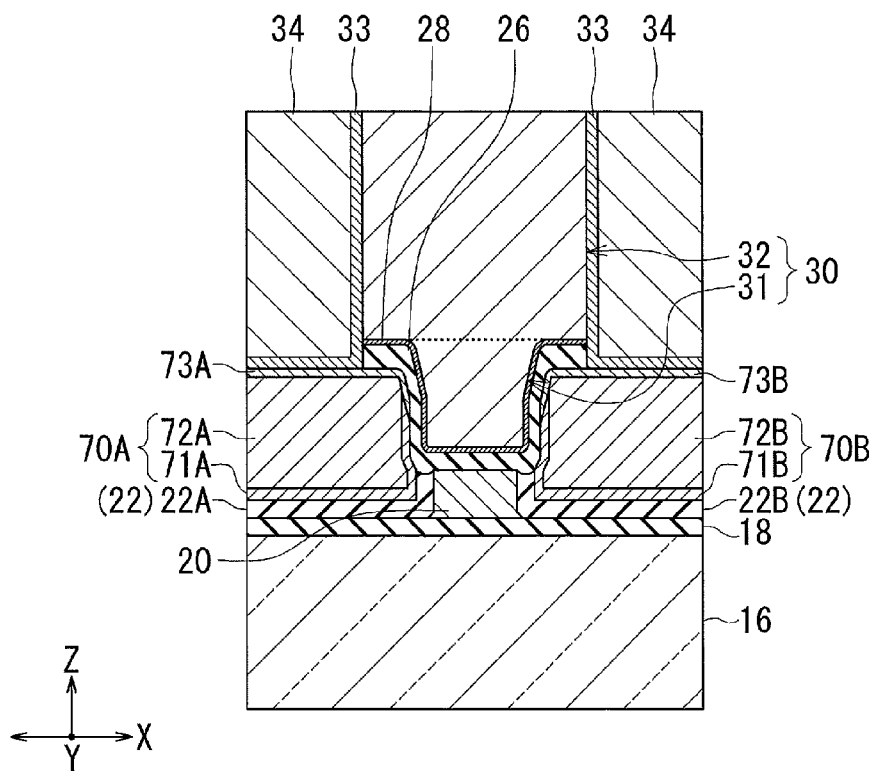
FIG. 37A to FIG. 37C are explanatory diagrams showing a step that follows the step shown in FIG. 36A to FIG. 36C.
Figure 37B:
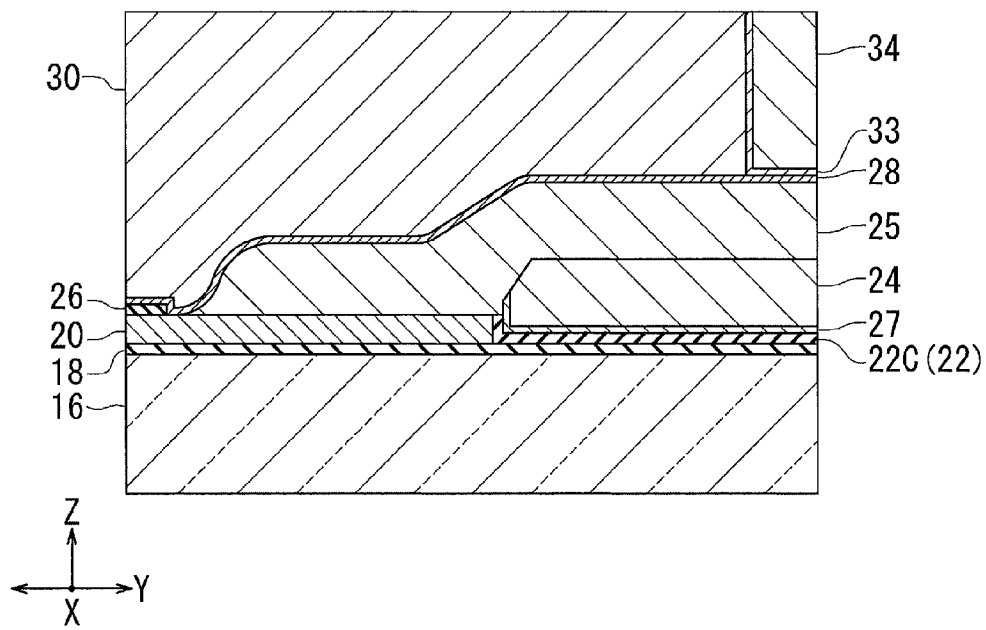
Figure 37C:
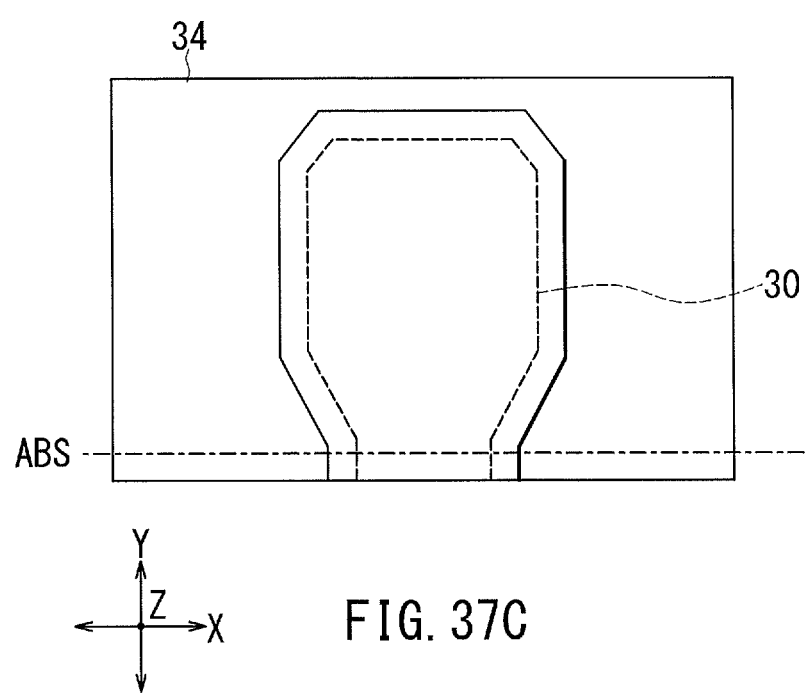

FIG. 37A to FIG. 37C show the next step. In this step, first, portions of the separating film 26 and the nonmagnetic metal film 28 that are not covered with the main pole 30 are removed by, for example, IBE, using the main pole 30 as an etching mask. Then, the nonmagnetic metal film 33 is formed to cover the main pole 30 and the third and fourth nonmagnetic films 73A and 73B by sputtering, for example. The third heat sink 34 is then formed on the nonmagnetic metal film 33 by frame plating or lift-off process, for example. The subsequent steps are the same as those of the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the main pole 30, the plasmon generator 20, the surrounding layer 23 or 70, the gap film 22 and the separating film 26 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
   a medium facing surface configured to face a recording medium;
   a coil for producing a magnetic field corresponding to data to be written on the recording medium;
   a main pole having a front end face located in the medium facing surface;
   a waveguide including a core and a cladding, the core allowing light to propagate therethrough, the cladding being provided around the core;
   a plasmon generator having a near-field light generating surface located in the medium facing surface;
   a surrounding layer; and
   a gap film for separating the plasmon generator from the surrounding layer, wherein
   the main pole is configured to pass a magnetic flux corresponding to the magnetic field produced by the coil, and to produce from the front end face a write magnetic field for use to write the data on the recording medium,
   the plasmon generator is configured to excite a surface plasmon on the plasmon generator based on the light propagating through the core, and to generate near-field light from the near-field light generating surface based on the surface plasmon,
   the front end face of the main pole includes a first end face portion, and a second end face portion contiguous with the first end face portion,
   the second end face portion is greater than the first end face portion in width in a track width direction,
   the near-field light generating surface, the first end face portion and the second end face portion are arranged in this order along a direction of travel of the recording medium,
   the main pole includes a first portion and a second portion, the first portion including the first end face portion, the second portion including the second end face portion,
   the surrounding layer has a first surrounding layer end face and a second surrounding layer end face, both located in the medium facing surface,
   the first surrounding layer end face and the second surrounding layer end face are located on opposite sides of at least part of the first end face portion in the track width direction so that the at least part of the first end face portion is interposed between the first and second surrounding layer end faces,
   the gap film has a first gap film end face and a second gap film end face, both located in the medium facing surface,
   the first gap film end face and the second gap film end face are located on opposite sides of at least part of the near-field light generating surface in the track width direction so that the at least part of the near-field light generating surface is interposed between the first and second gap film end faces,
   each of the first and second gap film end faces includes a portion located between the first and second surrounding layer end faces, but does not include any portion interposed between the first surrounding layer end face and the first end face portion or between the second surrounding layer end face and the first end face portion,
   the first end face portion has a first edge closest to the near-field light generating surface, and a second edge located at a boundary between the first end face portion and the second end face portion,
   the near-field light generating surface has a third edge closest to the first end face portion, and
   respective midpoints of the first to third edges are located collinearly with one another, and the midpoint of the first edge lies on the first edge.

2. The thermally-assisted magnetic recording head according to claim 1, further comprising a separating film for separating the main pole from the surrounding layer, wherein
   the separating film is a single continuous film, and at least part of the separating film is interposed between the main pole and the plasmon generator, between the main pole and the surrounding layer, and between the main pole and the gap film.

3. The thermally-assisted magnetic recording head according to claim 1, wherein the surrounding layer is formed of a nonmagnetic metal material.

4. The thermally-assisted magnetic recording head according to claim 1, wherein
   the surrounding layer includes a first side shield and a second side shield each formed of a magnetic material,
   the first side shield has a first side shield end face constituting at least part of the first surrounding layer end face, and
   the second side shield has a second side shield end face constituting at least part of the second surrounding layer end face.

5. The thermally-assisted magnetic recording head according to claim 1, wherein the second edge is longer than the first edge.

6. The thermally-assisted magnetic recording head according to claim 1, wherein
   the core has an evanescent light generating surface for generating evanescent light based on the light propagating through the core,
   the plasmon generator has a plasmon exciting section located at a predetermined distance from the evanescent light generating surface and facing the evanescent light generating surface, and
   in the plasmon generator, the surface plasmon is excited on the plasmon exciting section through coupling with the evanescent light generated by the evanescent light generating surface, the surface plasmon propagates to the near-field light generating surface, and the near-field light generating surface generates near-field light based on the surface plasmon.

7. The thermally-assisted magnetic recording head according to claim 1, wherein the front end face of the main pole is located on a front side in the direction of travel of the recording medium relative to the near-field light generating surface.

8. A manufacturing method for a thermally-assisted magnetic recording head, the thermally-assisted magnetic recording head comprising:
   a medium facing surface configured to face a recording medium;
   a coil for producing a magnetic field corresponding to data to be written on the recording medium;
   a main pole having a front end face located in the medium facing surface;
   a waveguide including a core and a cladding, the core allowing light to propagate therethrough, the cladding being provided around the core;
   a plasmon generator having a near-field light generating surface located in the medium facing surface;
   a surrounding layer; and
   a gap film for separating the plasmon generator from the surrounding layer, wherein
   the main pole is configured to pass a magnetic flux corresponding to the magnetic field produced by the coil, and to produce from the front end face a write magnetic field for use to write the data on the recording medium,
   the plasmon generator is configured to excite a surface plasmon on the plasmon generator based on the light propagating through the core, and to generate near-field light from the near-field light generating surface based on the surface plasmon,
   the front end face of the main pole includes a first end face portion, and a second end face portion contiguous with the first end face portion,
   the second end face portion is greater than the first end face portion in width in a track width direction,
   the near-field light generating surface, the first end face portion and the second end face portion are arranged in this order along a direction of travel of the recording medium,
   the main pole includes a first portion and a second portion, the first portion including the first end face portion, the second portion including the second end face portion,
   the surrounding layer has a first surrounding layer end face and a second surrounding layer end face, both located in the medium facing surface,
   the first surrounding layer end face and the second surrounding layer end face are located on opposite sides of at least part of the first end face portion in the track width direction so that the at least part of the first end face portion is interposed between the first and second surrounding layer end faces,
   the gap film has a first gap film end face and a second gap film end face, both located in the medium facing surface,
   the first gap film end face and the second gap film end face are located on opposite sides of at least part of the near-field light generating surface in the track width direction so that the at least part of the near-field light generating surface is interposed between the first and second gap film end faces, and
   each of the first and second gap film end faces includes a portion located between the first and second surrounding layer end faces, but does not include any portion interposed between the first surrounding layer end face and the first end face portion or between the second surrounding layer end face and the first end face portion,
   the manufacturing method comprising the steps of:
   forming the waveguide;
   forming the plasmon generator;
   forming the surrounding layer and the gap film after the plasmon generator is formed;
   forming the main pole after the surrounding layer and the gap film are formed; and
   forming the coil, wherein
   the step of forming the plasmon generator includes the steps of:
   forming an initial plasmon generator;
   forming an etching mask for use to pattern the initial plasmon generator; and
   etching the initial plasmon generator by using the etching mask so that the initial plasmon generator becomes the plasmon generator,
   the step of forming the surrounding layer and the gap film includes:
   the step of forming an initial gap film to cover the plasmon generator and the etching mask after the step of etching the initial plasmon generator;
   the step of forming the surrounding layer after the initial gap film is formed; and
   the removal step of removing a portion of the initial gap film and at least a portion of the etching mask after the surrounding layer is formed,
   the removal step makes the initial gap film into the gap film and results in the formation of a structure having a recess, the structure including the plasmon generator, the surrounding layer and the gap film, and
   the main pole is formed such that at least part of the first portion is received in the recess.

9. The manufacturing method according to claim 8, wherein
   the thermally-assisted magnetic recording head further comprise a separating film for separating the main pole from the surrounding layer, the separating film being a single continuous film, at least part of the separating film being interposed between the main pole and the plasmon generator, between the main pole and the surrounding layer, and between the main pole and the gap film, and
   the manufacturing method further comprises the step of forming the separating film on the structure after the removal step such that the separating film forms a receiving section corresponding to the recess, and
   the main pole is formed on the separating film such that the first portion is received in the receiving section after the step of forming the separating film.

10. The manufacturing method according to claim 8, wherein the removal step employs wet etching to remove the portion of the initial gap film.

11. The manufacturing method according to claim 8, wherein the step of forming the surrounding layer includes the steps of: forming an initial surrounding layer to cover the initial gap film; and polishing the initial surrounding layer until the etching mask is exposed.

12. The manufacturing method according to claim 11, wherein the step of forming the surrounding layer further includes the step of etching a portion of the initial surrounding layer after the step of polishing the initial surrounding layer.

13. The thermally-assisted magnetic recording head according to claim 3, wherein the first surrounding layer end face and the second surrounding layer end face are located on opposite sides of the near-field light generating surface and the at least part of the first end face portion in the track width direction so that the near-field light generating surface and the at least part of the first end face portion are interposed between the first and second surrounding layer end faces.

14. A thermally-assisted magnetic recording head comprising:
a medium facing surface configured to face a recording medium;
a coil for producing a magnetic field corresponding to data to be written on the recording medium;
a main pole having a front end face located in the medium facing surface;
a waveguide including a core and a cladding, the core allowing light to propagate therethrough, the cladding being provided around the core;
a plasmon generator having a near-field light generating surface located in the medium facing surface;
a surrounding layer;
a gap film for separating the plasmon generator from the surrounding layer, and
a separating film for separating the main pole from the surrounding layer, wherein
the main pole is configured to pass a magnetic flux corresponding to the magnetic field produced by the coil, and to produce from the front end face a write magnetic field for use to write the data on the recording medium,
the plasmon generator is configured to excite a surface plasmon on the plasmon generator based on the light propagating through the core, and to generate near-field light from the near-field light generating surface based on the surface plasmon,
the front end face of the main pole includes a first end face portion, and a second end face portion contiguous with the first end face portion,
the second end face portion is greater than the first end face portion in width in a track width direction,
the near-field light generating surface, the first end face portion and the second end face portion are arranged in this order along a direction of travel of the recording medium,
the main pole includes a first portion and a second portion, the first portion including the first end face portion, the second portion including the second end face portion,
the surrounding layer has a first surrounding layer end face and a second surrounding layer end face, both located in the medium facing surface,
the first surrounding layer end face and the second surrounding layer end face are located on opposite sides of at least part of the first end face portion in the track width direction so that the at least part of the first end face portion is interposed between the first and second surrounding layer end faces,
the gap film has a first gap film end face and a second gap film end face, both located in the medium facing surface,
the first gap film end face and the second gap film end face are located on opposite sides of at least part of the near-field light generating surface in the track width direction so that the at least part of the near-field light generating surface is interposed between the first and second gap film end faces, each of the first and second gap film end faces includes a portion located between the first and second surrounding layer end faces, but does not include any portion interposed between the first surrounding layer end face and the first end face portion or between the second surrounding layer end face and the first end face portion, and
the separating film is a single continuous film, and at least part of the separating film is interposed between the main pole and the plasmon generator, between the main pole and the surrounding layer, and between the main pole and the gap film.

15. A thermally-assisted magnetic recording head comprising:
a medium facing surface configured to face a recording medium;
a coil for producing a magnetic field corresponding to data to be written on the recording medium;
a main pole having a front end face located in the medium facing surface;
a waveguide including a core and a cladding, the core allowing light to propagate therethrough, the cladding being provided around the core;
a plasmon generator having a near-field light generating surface located in the medium facing surface;
a surrounding layer; and
a gap film for separating the plasmon generator from the surrounding layer, wherein
the main pole is configured to pass a magnetic flux corresponding to the magnetic field produced by the coil, and to produce from the front end face a write magnetic field for use to write the data on the recording medium,
the plasmon generator is configured to excite a surface plasmon on the plasmon generator based on the light propagating through the core, and to generate near-field light from the near-field light generating surface based on the surface plasmon,
the front end face of the main pole includes a first end face portion, and a second end face portion contiguous with the first end face portion,
the second end face portion is greater than the first end face portion in width in a track width direction,
the near-field light generating surface, the first end face portion and the second end face portion are arranged in this order along a direction of travel of the recording medium,
the main pole includes a first portion and a second portion, the first portion including the first end face portion, the second portion including the second end face portion,
the surrounding layer has a first surrounding layer end face and a second surrounding layer end face, both located in the medium facing surface,
the first surrounding layer end face and the second surrounding layer end face are located on opposite sides of at least part of the first end face portion in the track width direction so that the at least part of the first end face portion is interposed between the first and second surrounding layer end faces,
the gap film has a first gap film end face and a second gap film end face, both located in the medium facing surface,
the first gap film end face and the second gap film end face are located on opposite sides of at least part of the near-field light generating surface in the track width direction so that the at least part of the near-field light generating surface is interposed between the first and second gap film end faces, and each of the first and second gap film end faces includes a portion located between the first and second surrounding layer end faces, but does not include any portion interposed between the first surrounding layer end face and the first end face portion or between the second surrounding layer end face and the first end face portion, the surrounding layer includes a first side shield and a second side shield each formed of a magnetic material, the first side shield has a first side shield end face constituting at least part of the first surrounding layer end face, and the second side shield has a second side shield end face constituting at least part of the second surrounding layer end face.

* * * * *